United States Patent
Hosaka et al.

(10) Patent No.: US 10,647,816 B2
(45) Date of Patent: May 12, 2020

(54) LIQUID CRYSTAL DISPLAY DEVICE

(71) Applicant: NISSAN CHEMICAL INDUSTRIES, LTD., Chiyoda-ku (JP)

(72) Inventors: Kazuyoshi Hosaka, Funabashi (JP); Noritoshi Miki, Funabashi (JP); Hiroyuki Omura, Funabashi (JP); Jun Hashimoto, Funabashi (JP)

(73) Assignee: NISSAN CHEMICAL INDUSTRIES, LTD., Chiyoda-ku (JP)

( * ) Notice: Subject to any disclaimer, the term of this patent is extended or adjusted under 35 U.S.C. 154(b) by 73 days.

(21) Appl. No.: 15/514,315

(22) PCT Filed: Sep. 25, 2015

(86) PCT No.: PCT/JP2015/077170
§ 371 (c)(1),
(2) Date: Mar. 24, 2017

(87) PCT Pub. No.: WO2016/047771
PCT Pub. Date: Mar. 31, 2016

(65) Prior Publication Data
US 2017/0247513 A1    Aug. 31, 2017

(30) Foreign Application Priority Data
Sep. 25, 2014  (JP) ................................ 2014-195640

(51) Int. Cl.
| | |
|---|---|
| *C08G 73/10* | (2006.01) |
| *G02F 1/1334* | (2006.01) |
| *G02F 1/1337* | (2006.01) |
| *C09K 19/54* | (2006.01) |
| *C09K 19/30* | (2006.01) |
| *C09K 19/56* | (2006.01) |
| *C09K 19/04* | (2006.01) |

(52) U.S. Cl.
CPC ......... *C08G 73/1078* (2013.01); *C08G 73/10* (2013.01); *C09K 19/3003* (2013.01); *C09K 19/54* (2013.01); *C09K 19/56* (2013.01); *G02F 1/1334* (2013.01); *G02F 1/1337* (2013.01); *G02F 1/133723* (2013.01); *C09K 2019/0448* (2013.01); *C09K 2019/301* (2013.01); *C09K 2019/3009* (2013.01); *G02F 2001/13345* (2013.01); *G02F 2001/133742* (2013.01); *Y10T 428/10* (2015.01); *Y10T 428/1005* (2015.01)

(58) Field of Classification Search
CPC ............ G02F 1/133723; G02F 1/1334; G02F 2001/133742; G02F 2001/133302; G02F 2202/023; C09K 19/56; C08G 73/1007; C08G 73/1042; C08G 73/12; Y10T 428/10; Y10T 428/1005; Y10T 428/1023
USPC ........ 428/1.1, 1.2, 1.25, 1.26; 349/123, 127, 349/130
See application file for complete search history.

(56) References Cited

U.S. PATENT DOCUMENTS

| | | | | |
|---|---|---|---|---|
| 2004/0188653 | A1* | 9/2004 | Kataoka ................. | C09K 19/14 252/299.01 |
| 2007/0218216 | A1* | 9/2007 | Kato ................... | C09K 19/3833 428/1.1 |
| 2012/0249940 | A1* | 10/2012 | Choi ................. | G02F 1/133753 349/123 |

FOREIGN PATENT DOCUMENTS

| | | | | |
|---|---|---|---|---|
| JP | 2885116 B2 | 4/1999 | | |
| JP | 2003-255315 A | 9/2003 | | |
| JP | 2008-58374 A | 3/2008 | | |
| JP | 4132424 B2 | 8/2008 | | |
| WO | WO-2013099937 A1 * | 7/2013 | ......... | C08G 73/1007 |
| WO | WO 2014/133154 A1 | 9/2014 | | |

OTHER PUBLICATIONS

International Search Report dated Dec. 22, 2015 in PCT/JP2015/077170 (with English language translation).

* cited by examiner

*Primary Examiner* — Ruiyun Zhang
(74) *Attorney, Agent, or Firm* — Oblon, McClelland, Maier & Neustadt, L.L.P.

(57) ABSTRACT

A liquid crystal display device having excellent liquid crystal vertical alignment properties, good transparency when a voltage is applied and good scattering properties when no voltage is applied, and good adhesion with the liquid crystal layer. The liquid crystal display device has a liquid crystal layer formed by irradiating and curing with ultraviolet rays a liquid crystal composition containing a liquid crystal and a polymerizable compound disposed between a pair of substrates provided with electrodes, and at least one of the substrates is provided with a liquid crystal alignment film to vertically align a liquid crystal. The liquid crystal composition contains a compound represented by the formula [1], and the liquid crystal alignment film is obtained from a liquid crystal alignment treating agent containing a polymer having a side chain structure represented by the formula [2-1] or formula [2-2], and a side chain structure represented by the formula [3].

12 Claims, No Drawings

LIQUID CRYSTAL DISPLAY DEVICE

TECHNICAL FIELD

The present invention relates to a transmission/scattering type liquid crystal display device which is in a transparent state when no voltage is applied and in a scattering state when a voltage is applied.

BACKGROUND ART

As a liquid crystal display device employing a liquid crystal material, a TN (twisted nematic) mode liquid crystal display device is in practical use. In such a mode, light switching is carried out by utilizing the optical rotation property of a liquid crystal, and a liquid crystal display device in this mode requires use of a polarizing plate. However, use of a polarizing plate lowers light utilization efficiency.

As a liquid crystal display device which achieves high light utilization efficiency without using a polarizing plate, a liquid crystal display device in which switching is conducted between a transmission state (also called a transparent state) and a scattering state of a liquid crystal may be mentioned, and a liquid crystal display device employing a polymer dispersed liquid crystal (PDLC) or a polymer network liquid crystal (PNLC) is commonly known.

A liquid crystal display device employing such a liquid crystal is a liquid crystal display device having a liquid crystal layer between a pair of substrates provided with electrodes, formed by disposing a liquid crystal composition containing a polymerizable compound which undergoes polymerization by ultraviolet rays between the pair of substrates and curing the liquid crystal composition by irradiation with ultraviolet rays, to form the liquid crystal layer, that is, a cured product composite (for example, a polymer network) of the liquid crystal and the polymerizable compound. In such a liquid crystal display device, the transmission state and the scattering state of the liquid crystal are controlled by application of a voltage.

A conventional liquid crystal display device employing PDLC or PNLC is a liquid crystal display device (also called a normal device) which is in a cloudy (scattering) state when no voltage is applied, since liquid crystal molecules are randomly aligned, and is in a transmission state when a voltage is applied, since liquid crystal molecules are aligned in an electric field direction, whereby light is transmitted. However, in a normal device, it is necessary to always apply a voltage in order to obtain a transmission state, and accordingly when it is used for an application which is mainly used in a transparent state, for example, when used for window glass, the electrical power consumption tends to be large.

On the other hand, a liquid crystal display device employing PDLC (also called a reverse device), which is in a transmission state when no voltage is applied and is in a scattering state when a voltage is applied, has been reported (Patent Documents 1 and 2).

PRIOR ART DOCUMENTS

Patent Documents

Patent Document 1: Japanese Patent No. 2885116
Patent Document 2: Japanese Patent No. 4132424

DISCLOSURE OF INVENTION

Technical Problem

A polymerizable compound in a liquid crystal composition in the reverse device has a role to form a polymer network to obtain desired optical properties and a role as a curing agent to increase adhesion between the liquid crystal layer and the liquid crystal alignment film. In order to increase the adhesion to the liquid crystal alignment film, it is necessary to let the polymer network be more densified, but if the polymer network is densified, there will be a problem such that the vertical alignment property of the liquid crystal tends to be impaired, and the optical properties of the reverse device, i.e. the transparency when no voltage is applied and the scattering property when a voltage is applied, tend to be deteriorated. Therefore, the liquid crystal composition to be used in the reverse device is required to be one whereby the vertical alignment property of the liquid crystal at the time of forming the liquid crystal layer becomes high.

In addition, the liquid crystal alignment film used for the reverse device is a highly hydrophobic membrane in order to align the liquid crystal vertically, whereby there is a problem that adhesion between the liquid crystal layer and the liquid crystal alignment film tends to be low. Therefore, to the liquid crystal composition to be used in the reverse device, it is necessary to introduce the polymerizable compound having a role as a curing agent in a large amount. However, if the polymerizable compound is introduced in a large amount, the vertical alignment property of the liquid crystal will be impaired, and there will be a problem that the transparency when no voltage is applied and the scattering property when a voltage is applied, tend to be substantially lowered. Therefore, the liquid crystal alignment film to be used for the reverse device, is required to be one presenting a high vertical alignment property of the liquid crystal.

Further, in a case where a reverse device is prepared by using a plastic substrate or film, and it is used as affixed to a window glass of an automobile or architectural building, the device may be used for a long time under an environment of high temperature and high humidity, or under an environment exposed to irradiation with light. Therefore, it is necessary that even in such a harsh environment (condition), the vertical alignment property of the liquid crystal will not be lowered, and adhesion between the liquid crystal layer and the liquid crystal alignment film will be high.

It is an object of the present invention to provide a liquid crystal display device, whereby the vertical alignment property of a liquid crystal is high, the optical properties are good, i.e. the transparency when no voltage is applied, and the scattering property when a voltage is applied, are good, and adhesion between the liquid crystal layer and the liquid crystal alignment film is high, and further, these properties can be maintained even in an environment exposed to high temperature and high humidity, or to irradiation with light, for a long time.

Solution to Problem

The present inventors have conducted extensive studies in order to accomplish the above object and as a result, have completed the present invention. That is, the present invention provides a liquid crystal display device having a liquid crystal layer formed by irradiating and curing with ultraviolet rays a liquid crystal composition containing a liquid crystal and a polymerizable compound disposed between a pair of substrates provided with electrodes, and at least one of the substrates being provided with a liquid crystal alignment film to vertically align a liquid crystal, wherein said liquid crystal composition contains a compound represented by the following formula [1], and said liquid crystal alignment film is obtained from a liquid crystal alignment treating agent containing a polymer having a side chain structure represented by the following formula [2-1] or formula [2-2], and a side chain structure represented by the following formula [3]:

$X^1—X^2—X^3—X^4—X^5—X^6\!-\!(X^7)_p\!-\!X^8$ [1]

wherein $X^1$ is at least one selected from the group consisting of the following formula [1-a] to formula [1-g], $X^2$ is at least one bond group selected from the group consisting of a single bond, —O—, —NH—, —N(CH$_3$)—, —CH$_2$O—, —CONH—, —NHCO—, —CON(CH$_3$)—, —N(CH$_3$)CO—, —COO— and —OCO—, $X^3$ is a single bond or —(CH$_2$)$_a$— (a is an integer of from 1 to 15), $X^4$ is at least one bond group selected from the group consisting of a single bond, —O—, —OCH$_2$—, —COO— and —OCO—, $X^5$ is a benzene ring, a cyclohexane ring or a C$_{17\text{-}51}$ divalent organic group having a steroid skeleton, wherein any optional hydrogen atom on the benzene ring or the cyclohexane ring may be substituted by a C$_{1\text{-}3}$ alkyl group, a C$_{1\text{-}3}$ alkoxy group, a C$_{1\text{-}3}$ fluorinated alkyl group, a C$_{1\text{-}3}$ fluorinated alkoxy group or a fluorine atom, $X^6$ is at least one bond group selected from the group consisting of a single bond, —O—, —OCH$_2$—, —CH$_2$O—, —COO— and —OCO—, $X^7$ is a benzene ring or a cyclohexane ring, wherein any optional hydrogen atom on the cyclic group may be substituted by a C$_{1\text{-}3}$ alkyl group, a C$_{1\text{-}3}$ alkoxy group, a C$_{1\text{-}3}$ fluorinated alkyl group, a C$_{1\text{-}3}$ fluorinated alkoxy group or a fluorine atom, p is an integer of from 0 to 4, and $X^8$ is at least one selected from the group consisting of a C$_{1\text{-}18}$ alkyl group, a C$_{1\text{-}18}$ fluorinated alkyl group, a C$_{1\text{-}18}$ alkoxy group and a C$_{1\text{-}18}$ fluorinated alkoxy group,

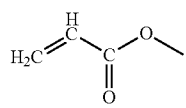
[1-a]

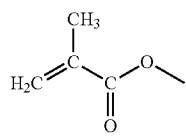
[1-b]

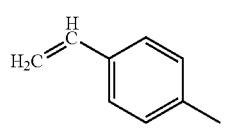
[1-c]

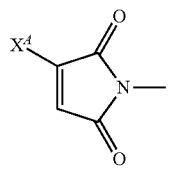
[1-d]

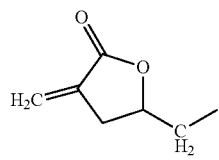
[1-e]

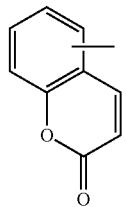
[1-f]

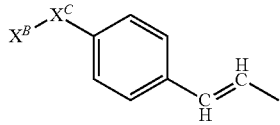
[1-g]

wherein $X^A$ is a hydrogen atom or a benzene ring, $X^B$ is at least one cyclic group selected from the group consisting of a benzene ring, a cyclohexane ring and a heterocyclic ring, and $X^C$ is at least one selected from the group consisting of a C$_{1\text{-}18}$ alkyl group, a C$_{1\text{-}18}$ fluorinated alkyl group, a C$_{1\text{-}18}$ alkoxy group and a C$_{1\text{-}18}$ fluorinated alkoxy group, $—Y^1—Y^2—Y^3—Y^4\!-\!(Y^5)_n\!-\!Y^6$ [2-1]

wherein $Y^1$ and $Y^3$ are each independently at least one bond group selected from the group consisting of a single bond, —(CH$_2$)$_a$— (a is an integer of from 1 to 15), —O—, —CH$_2$O—, —COO— and —OCO—, $Y^2$ is a single bond or —(CH$_2$)$_b$— (b is an integer of from 1 to 15), $Y^4$ and $Y^5$ are each independently at least one divalent cyclic group selected from the group consisting of a benzene ring, a cyclohexane ring and a heterocyclic ring, or a C$_{17\text{-}51}$ divalent organic group having a steroid skeleton, wherein any optional hydrogen atom on said cyclic group may be substituted by a C$_{1\text{-}3}$ alkyl, alkoxy, fluorinated alkyl or fluorinated alkoxy group, or a fluorine atom, n is an integer of from 0 to 4, and $Y^6$ is a C$_{1\text{-}18}$ alkyl, fluorinated alkyl, alkoxy or fluorinated alkoxy group, $—Y^7—Y^8$ [2-2]

wherein $Y^7$ is at least one bond group selected from the group consisting of a single bond, —O—, —CH$_2$O—, —CONH—, —NHCO—, —CON(CH$_3$)—, —N(CH$_3$)CO—, —COO— and —OCO—, and $Y^8$ is a C$_{8\text{-}22}$ alkyl group or a C$_{6\text{-}18}$ fluorinated alkyl group, $—W^1—W^2—W^3—W^4$ [3]

wherein $W^1$ and $W^3$ are each independently at least one bond group selected from the group consisting of a single bond, —O—, —NH—, —N(CH$_3$)—, —CH$_2$O—, —CONH—, —NHCO—, —CON(CH$_3$)—, —N(CH$_3$)CO—, —COO— and —OCO—, $W^2$ is a single bond, a C$_{1\text{-}18}$ alkylene group or a C$_{6\text{-}24}$ organic group having at least one cyclic group selected from the group consisting of a benzene ring, a cyclohexane ring and a heterocyclic ring, wherein any optional hydrogen atom on the cyclic group may be substituted by a C$_{1\text{-}3}$ alkyl, alkoxy, fluorinated alkyl or fluorinated alkoxy group, and $W^4$ is at least one structure selected from the group consisting of the following formula [3-a] to formula [3-g]:

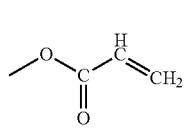
[3-a]

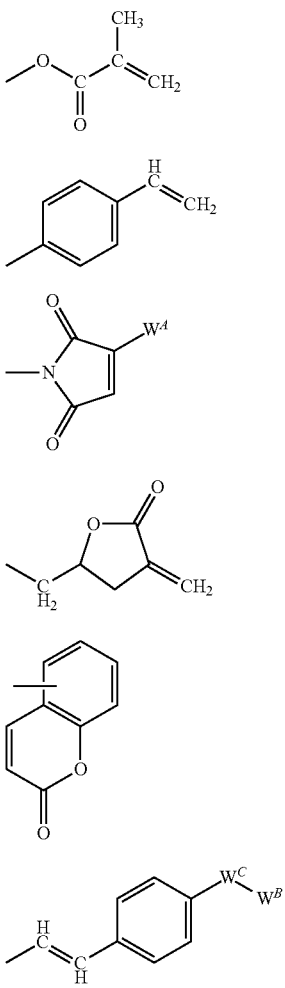

wherein $W^A$ is a hydrogen atom or a benzene ring, $W^B$ is at least one cyclic group selected from the group consisting of a benzene ring, a cyclohexane ring and a heterocyclic group, and $W^C$ is a $C_{1-18}$ alkyl, fluorinated alkyl, alkoxy or fluorinated alkoxy group.

Advantageous Effects of Invention

According to the present invention, it is possible to provide a reverse device, whereby the optical properties are good, i.e. the transparency when no voltage is applied and the scattering property when a voltage is applied, are good, and adhesion between the liquid crystal layer and the liquid crystal alignment film is high, and further, these properties can be maintained, even in an environment exposed to high temperature and high humidity, or to irradiation with light, for a long time. The mechanisms whereby a liquid crystal display device having such excellent properties is obtainable by the present invention, are not necessarily clear, but are considered to be as follows.

A compound represented by the above formula [1] contained in the liquid crystal composition used in the liquid crystal display device of the present invention, has a site of rigid structure such as a benzene ring or a cyclohexane ring, and a site for the polymerization reaction by ultraviolet rays as represented by $X^1$ in the formula [1]. Therefore, when a specific compound is introduced in the liquid crystal composition, the site of rigid structure of the specific compound enhances the vertical alignment property of the liquid crystal, and further, the site for the polymerization reaction and a polymerizable compound are reacted, whereby it is possible to enhance the stability of the vertical alignment property of the liquid crystal. Accordingly, even when the polymer network becomes dense in order to increase the adhesion to the liquid crystal alignment film, the vertical alignment property of the liquid crystal will not be impaired, and it is possible to obtain a reverse device which exhibits good optical properties.

The liquid crystal alignment film to be used in the present invention is obtained from a liquid crystal alignment treating agent containing a polymer having a side chain structure of the above formula [2-1] or formula [2-2]. In particular, the side chain structure represented by the formula [2-1] presents a rigid structure, whereby a liquid crystal display device using a liquid crystal alignment film having such a side chain structure, is capable of obtaining a high and stable vertical alignment property of the liquid crystal. Therefore, particularly in a case where a side chain structure of the formula [2-1] is used, it is possible to obtain a reverse device which exhibits good optical properties.

In addition, the liquid crystal alignment film of the present invention is obtained from the liquid crystal alignment treating agent containing a polymer having a side chain structure of the formula [3] together with a side chain structure of the above formula [2-1] or formula [2-2], and the side chain structure of formula [3] undergoes, in a step for irradiating with ultraviolet rays to be described later, a photoreaction with a reactive group of the polymerizable compound in the liquid crystal composition, whereby the adhesion between the liquid crystal layer and the liquid crystal alignment film will be further strengthened. Especially, since the side chain structure of formula [3] is located in the polymer constituting the liquid crystal alignment film, its effect is large as compared with a case where a compound having a group which undergoes a photoreaction, is incorporated in the liquid crystal alignment treating agent.

Thus, the liquid crystal display device of the present invention becomes to be a good reverse device having good optical properties with good adhesion between the liquid crystal layer and the liquid crystal alignment film, and being capable of maintaining these properties for a long time.

DESCRIPTION OF EMBODIMENTS

<Liquid Crystal Display Device>

The liquid crystal display device of the present invention is a liquid crystal display device having a liquid crystal layer formed by disposing a liquid crystal composition containing a liquid crystal and a polymerizable compound between a pair of substrates provided with electrodes, and curing it by irradiation with ultraviolet rays by means of an ultraviolet irradiation device, wherein at least one of the substrates is provided with a liquid crystal alignment film so as to align the liquid crystal vertically, and it is suitable for use as a reverse device which becomes a transparent state when no voltage is applied, and becomes a scattering state when a voltage is applied.

The liquid crystal composition in the present invention contains a liquid crystal and a polymerizable compound to be polymerized by ultraviolet rays, and this polymerizable compound plays a role of forming a polymer network (cured resin). Further, the above-mentioned liquid crystal layer is a cured product composite of the liquid crystal and the polymerizable compound, and the cured product composite here means, as mentioned above, for example, such a state that the liquid crystal is present in the polymer network formed by the polymerizable compound.

<Specific Compound and Liquid Crystal Composition>

The liquid crystal composition of the present invention contains a liquid crystal, a polymerizable compound and a specific compound represented by the following formula [1].

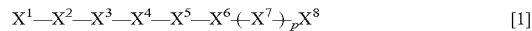

In the formula [1], $X^1$, $X^2$, $X^3$, $X^4$, $X^5$, $X^6$, $X^7$, $X^8$ and p are as defined above, and inter alia, respectively, the following ones are preferred.

$X^1$ is, from the viewpoint of optical properties of the liquid crystal display device, preferably the above formula [1-a], formula [1-b], formula [1-c] or formula [1-e]. More preferred are the formula [1-a], formula [1-b] or formula [1-c].

$X^2$ is, from the viewpoint of availability of raw material or easy synthesis, preferably a single bond, —O—, —CH$_2$O—, —CONH—, —COO— or —OCO—. More preferred is a single bond, —O—, —COO— or —OCO—. $X^3$ is preferably a single bond or —(CH$_2$)$_a$— (a is an integer of from 1 to 10). More preferred is —(CH$_2$)$_a$— (a is an integer of from 1 to 10). $X^4$ is, from the viewpoint of availability of raw material or easy synthesis, preferably a single bond, —O— or —COO—. More preferred is —O—.

$X^5$ is, from the viewpoint of optical properties of the liquid crystal display device, preferably a benzene ring or a cyclohexane ring, or a C$_{17-51}$ divalent organic group having a steroid skeleton. More preferred is a benzene ring or a C$_{17-51}$ divalent organic group having a steroid skeleton. $X^6$ is, from the viewpoint of easy synthesis, preferably a single bond, —O—, —COO— or —OCO—. More preferred is a single bond, —COO— or —OCO—.

$X^7$ is, from the viewpoint of optical properties of the liquid crystal display device, preferably a benzene ring or a cyclohexane ring. $X^8$ is, from the viewpoint of optical properties of the liquid crystal display device, preferably a C$_{1-18}$ alkyl group or a C$_{1-18}$ alkoxy group. More preferred is a C$_{1-12}$ alkyl group. p is, from the viewpoint of availability of raw material or easy synthesis, preferably an integer of 0 to 2.

In the formula [1], preferred combinations of $X^1$ to $X^8$ and p are as shown in the following Tables 1 to 9.

TABLE 1

|  | $X^1$ | $X^2$ | $X^3$ | $X^4$ | $X^5$ | $X^6$ | $X^7$ | $X^8$ | p |
|---|---|---|---|---|---|---|---|---|---|
| 1-1a | Formula [1-a] | Single bond | —(CH$_2$)$_a$— (a is an integer of 1 to 10) | —O— | Benzene ring | Single bond | Benzene ring | C$_{1-12}$ alkyl group | 1 |
| 1-2a | Formula [1-a] | Single bond | —(CH$_2$)$_a$— (a is an integer of 1 to 10) | —O— | Benzene ring | Single bond | Benzene ring | C$_{1-12}$ alkyl group | 2 |
| 1-3a | Formula [1-a] | Single bond | —(CH$_2$)$_a$— (a is an integer of 1 to 10) | —O— | Benzene ring | Single bond | Cyclohexane ring | C$_{1-12}$ alkyl group | 1 |
| 1-4a | Formula [1-a] | Single bond | —(CH$_2$)$_a$— (a is an integer of 1 to 10) | —O— | Benzene ring | Single bond | Cyclohexane ring | C$_{1-12}$ alkyl group | 2 |
| 1-5a | Formula [1-a] | Single bond | —(CH$_2$)$_a$— (a is an integer of 1 to 10) | —COO— | Benzene ring | Single bond | Benzene ring | C$_{1-12}$ alkyl group | 1 |
| 1-6a | Formula [1-a] | Single bond | —(CH$_2$)$_a$— (a is an integer of 1 to 10) | —COO— | Benzene ring | Single bond | Benzene ring | C$_{1-12}$ alkyl group | 2 |
| 1-7a | Formula [1-a] | Single bond | —(CH$_2$)$_a$— (a is an integer of 1 to 10) | —COO— | Benzene ring | Single bond | Cyclohexane ring | C$_{1-12}$ alkyl group | 1 |
| 1-8a | Formula [1-a] | Single bond | —(CH$_2$)$_a$— (a is an integer of 1 to 10) | —COO— | Benzene ring | Single bond | Cyclohexane ring | C$_{1-12}$ alkyl group | 2 |
| 1-9a | Formula [1-a] | Single bond | —(CH$_2$)$_a$— (a is an integer of 1 to 10) | —O— | Benzene ring | —COO— | Benzene ring | C$_{1-12}$ alkyl group | 1 |
| 1-10a | Formula [1-a] | Single bond | —(CH$_2$)$_a$— (a is an integer of 1 to 10) | —O— | Benzene ring | —COO— | Benzene ring | C$_{1-12}$ alkyl group | 2 |
| 1-11a | Formula [1-a] | Single bond | —(CH$_2$)$_a$— (a is an integer of 1 to 10) | —O— | Benzene ring | —COO— | Cyclohexane ring | C$_{1-12}$ alkyl group | 1 |
| 1-12a | Formula [1-a] | Single bond | —(CH$_2$)$_a$— (a is an integer of 1 to 10) | —O— | Benzene ring | —COO— | Cyclohexane ring | C$_{1-12}$ alkyl group | 2 |
| 1-13a | Formula [1-a] | Single bond | —(CH$_2$)$_a$— (a is an integer of 1 to 10) | —COO— | Benzene ring | —COO— | Benzene ring | C$_{1-12}$ alkyl group | 1 |
| 1-14a | Formula [1-a] | Single bond | —(CH$_2$)$_a$— (a is an integer of 1 to 10) | —COO— | Benzene ring | —COO— | Benzene ring | C$_{1-12}$ alkyl group | 2 |
| 1-15a | Formula [1-a] | Single bond | —(CH$_2$)$_a$— (a is an integer of 1 to 10) | —COO— | Benzene ring | —COO— | Cyclohexane ring | C$_{1-12}$ alkyl group | 1 |

TABLE 2

|  | $X^1$ | $X^2$ | $X^3$ | $X^4$ | $X^5$ | $X^6$ | $X^7$ | $X^8$ | p |
|---|---|---|---|---|---|---|---|---|---|
| 1-16a | Formula [1-a] | Single bond | —(CH$_2$)$_a$— (a is an integer of 1 to 10) | —COO— | Benzene ring | —COO— | Cyclohexane ring | C$_{1-12}$ alkyl group | 2 |
| 1-17a | Formula [1-a] | Single bond | —(CH$_2$)$_a$— (a is an integer of 1 to 10) | —O— | Benzene ring | —OCO— | Benzene ring | C$_{1-12}$ alkyl group | 1 |
| 1-18a | Formula [1-a] | Single bond | —(CH$_2$)$_a$— (a is an integer of 1 to 10) | —O— | Benzene ring | —OCO— | Benzene ring | C$_{1-12}$ alkyl group | 2 |
| 1-19a | Formula [1-a] | Single bond | —(CH$_2$)$_a$— (a is an integer of 1 to 10) | —O— | Benzene ring | —OCO— | Cyclohexane ring | C$_{1-12}$ alkyl group | 1 |

TABLE 2-continued

| | $X^1$ | $X^2$ | $X^3$ | $X^4$ | $X^5$ | $X^6$ | $X^7$ | $X^8$ | p |
|---|---|---|---|---|---|---|---|---|---|
| 1-20a | Formula [1-a] | Single bond | —(CH$_2$)$_a$— (a is an integer of 1 to 10) | —O— | Benzene ring | —OCO— | Cyclohexane ring | C$_{1-12}$ alkyl group | 2 |
| 1-21a | Formula [1-a] | Single bond | —(CH$_2$)$_a$— (a is an integer of 1 to 10) | —COO— | Benzene ring | —OCO— | Benzene ring | C$_{1-12}$ alkyl group | 1 |
| 1-22a | Formula [1-a] | Single bond | —(CH$_2$)$_a$— (a is an integer of 1 to 10) | —COO— | Benzene ring | —OCO— | Benzene ring | C$_{1-12}$ alkyl group | 2 |
| 1-23a | Formula [1-a] | Single bond | —(CH$_2$)$_a$— (a is an integer of 1 to 10) | —COO— | Benzene ring | —OCO— | Cyclohexane ring | C$_{1-12}$ alkyl group | 1 |
| 1-24a | Formula [1-a] | Single bond | —(CH$_2$)$_a$— (a is an integer of 1 to 10) | —COO— | Benzene ring | —OCO— | Cyclohexane ring | C$_{1-12}$ alkyl group | 2 |
| 1-25a | Formula [1-b] | Single bond | —(CH$_2$)$_a$— (a is an integer of 1 to 10) | —O— | Benzene ring | Single bond | Benzene ring | C$_{1-12}$ alkyl group | 1 |
| 1-26a | Formula [1-b] | Single bond | —(CH$_2$)$_a$— (a is an integer of 1 to 10) | —O— | Benzene ring | Single bond | Benzene ring | C$_{1-12}$ alkyl group | 2 |
| 1-27a | Formula [1-b] | Single bond | —(CH$_2$)$_a$— (a is an integer of 1 to 10) | —O— | Benzene ring | Single bond | Cyclohexane ring | C$_{1-12}$ alkyl group | 1 |
| 1-28a | Formula [1-b] | Single bond | —(CH$_2$)$_a$— (a is an integer of 1 to 10) | —O— | Benzene ring | Single bond | Cyclohexane ring | C$_{1-12}$ alkyl group | 2 |
| 1-29a | Formula [1-b] | Single bond | —(CH$_2$)$_a$— (a is an integer of 1 to 10) | —COO— | Benzene ring | Single bond | Benzene ring | C$_{1-12}$ alkyl group | 1 |
| 1-30a | Formula [1-b] | Single bond | —(CH$_2$)$_a$— (a is an integer of 1 to 10) | —COO— | Benzene ring | Single bond | Benzene ring | C$_{1-12}$ alkyl group | 2 |

TABLE 3

| | $X^1$ | $X^2$ | $X^3$ | $X^4$ | $X^5$ | $X^6$ | $X^7$ | $X^8$ | p |
|---|---|---|---|---|---|---|---|---|---|
| 1-31a | Formula [1-b] | Single bond | —(CH$_2$)$_a$— (a is an integer of 1 to 10) | —COO— | Benzene ring | Single bond | Cyclohexane ring | C$_{1-12}$ alkyl group | 1 |
| 1-32a | Formula [1-b] | Single bond | —(CH$_2$)$_a$— (a is an integer of 1 to 10) | —COO— | Benzene ring | Single bond | Cyclohexane ring | C$_{1-12}$ alkyl group | 2 |
| 1-33a | Formula [1-b] | Single bond | —(CH$_2$)$_a$— (a is an integer of 1 to 10) | —O— | Benzene ring | —COO— | Benzene ring | C$_{1-12}$ alkyl group | 1 |
| 1-34a | Formula [1-b] | Single bond | —(CH$_2$)$_a$— (a is an integer of 1 to 10) | —O— | Benzene ring | —COO— | Benzene ring | C$_{1-12}$ alkyl group | 2 |
| 1-35a | Formula [1-b] | Single bond | —(CH$_2$)$_a$— (a is an integer of 1 to 10) | —O— | Benzene ring | —COO— | Cyclohexane ring | C$_{1-12}$ alkyl group | 1 |
| 1-36a | Formula [1-b] | Single bond | —(CH$_2$)$_a$— (a is an integer of 1 to 10) | —O— | Benzene ring | —COO— | Cyclohexane ring | C$_{1-12}$ alkyl group | 2 |
| 1-37a | Formula [1-b] | Single bond | —(CH$_2$)$_a$— (a is an integer of 1 to 10) | —COO— | Benzene ring | —COO— | Benzene ring | C$_{1-12}$ alkyl group | 1 |
| 1-38a | Formula [1-b] | Single bond | —(CH$_2$)$_a$— (a is an integer of 1 to 10) | —COO— | Benzene ring | —COO— | Benzene ring | C$_{1-12}$ alkyl group | 2 |
| 1-39a | Formula [1-b] | Single bond | —(CH$_2$)$_a$— (a is an integer of 1 to 10) | —COO— | Benzene ring | —COO— | Cyclohexane ring | C$_{1-12}$ alkyl group | 1 |
| 1-40a | Formula [1-b] | Single bond | —(CH$_2$)$_a$— (a is an integer of 1 to 10) | —COO— | Benzene ring | —COO— | Cyclohexane ring | C$_{1-12}$ alkyl group | 2 |
| 1-41a | Formula [1-b] | Single bond | —(CH$_2$)$_a$— (a is an integer of 1 to 10) | —O— | Benzene ring | —OCO— | Benzene ring | C$_{1-12}$ alkyl group | 1 |
| 1-42a | Formula [1-b] | Single bond | —(CH$_2$)$_a$— (a is an integer of 1 to 10) | —O— | Benzene ring | —OCO— | Benzene ring | C$_{1-12}$ alkyl group | 2 |
| 1-43a | Formula [1-b] | Single bond | —(CH$_2$)$_a$— (a is an integer of 1 to 10) | —O— | Benzene ring | —OCO— | Cyclohexane ring | C$_{1-12}$ alkyl group | 1 |
| 1-44a | Formula [1-b] | Single bond | —(CH$_2$)$_a$— (a is an integer of 1 to 10) | —O— | Benzene ring | —OCO— | Cyclohexane ring | C$_{1-12}$ alkyl group | 2 |
| 1-45a | Formula [1-b] | Single bond | —(CH$_2$)$_a$— (a is an integer of 1 to 10) | —COO— | Benzene ring | —OCO— | Benzene ring | C$_{1-12}$ alkyl group | 1 |

TABLE 4

| | $X^1$ | $X^2$ | $X^3$ | $X^4$ | $X^5$ | $X^6$ | $X^7$ | $X^8$ | p |
|---|---|---|---|---|---|---|---|---|---|
| 1-46a | Formula [1-b] | Single bond | —(CH$_2$)$_a$— (a is an integer of 1 to 10) | —COO— | Benzene ring | —OCO— | Benzene ring | C$_{1-12}$ alkyl group | 2 |
| 1-47a | Formula [1-b] | Single bond | —(CH$_2$)$_a$— (a is an integer of 1 to 10) | —COO— | Benzene ring | —OCO— | Cyclohexane ring | C$_{1-12}$ alkyl group | 1 |
| 1-48a | Formula [1-b] | Single bond | —(CH$_2$)$_a$— (a is an integer of 1 to 10) | —COO— | Benzene ring | —OCO— | Cyclohexane ring | C$_{1-12}$ alkyl group | 2 |

TABLE 4-continued

| | X$^1$ | X$^2$ | X$^3$ | X$^4$ | X$^5$ | X$^6$ | X$^7$ | X$^8$ | p |
|---|---|---|---|---|---|---|---|---|---|
| 1-49a | Formula [1-c] | —O— | —(CH$_2$)$_a$— (a is an integer of 1 to 10) | —O— | Benzene ring | Single bond | Benzene ring | C$_{1-12}$ alkyl group | 1 |
| 1-50a | Formula [1-c] | —O— | —(CH$_2$)$_a$— (a is an integer of 1 to 10) | —O— | Benzene ring | Single bond | Benzene ring | C$_{1-12}$ alkyl group | 2 |
| 1-51a | Formula [1-c] | —COO— | —(CH$_2$)$_a$— (a is an integer of 1 to 10) | —O— | Benzene ring | Single bond | Benzene ring | C$_{1-12}$ alkyl group | 1 |
| 1-52a | Formula [1-c] | —COO— | —(CH$_2$)$_a$— (a is an integer of 1 to 10) | —O— | Benzene ring | Single bond | Benzene ring | C$_{1-12}$ alkyl group | 2 |
| 1-53a | Formula [1-c] | —OCO— | —(CH$_2$)$_a$— (a is an integer of 1 to 10) | —O— | Benzene ring | Single bond | Benzene ring | C$_{1-12}$ alkyl group | 1 |
| 1-54a | Formula [1-c] | —OCO— | —(CH$_2$)$_a$— (a is an integer of 1 to 10) | —O— | Benzene ring | Single bond | Benzene ring | C$_{1-12}$ alkyl group | 2 |
| 1-55a | Formula [1-c] | —O— | —(CH$_2$)$_a$— (a is an integer of 1 to 10) | —COO— | Benzene ring | Single bond | Benzene ring | C$_{1-12}$ alkyl group | 1 |
| 1-56a | Formula [1-c] | —O— | —(CH$_2$)$_a$— (a is an integer of 1 to 10) | —COO— | Benzene ring | Single bond | Benzene ring | C$_{1-12}$ alkyl group | 2 |
| 1-57a | Formula [1-c] | —COO— | —(CH$_2$)$_a$— (a is an integer of 1 to 10) | —COO— | Benzene ring | Single bond | Benzene ring | C$_{1-12}$ alkyl group | 1 |
| 1-58a | Formula [1-c] | —COO— | —(CH$_2$)$_a$— (a is an integer of 1 to 10) | —COO— | Benzene ring | Single bond | Benzene ring | C$_{1-12}$ alkyl group | 2 |
| 1-59a | Formula [1-c] | —OCO— | —(CH$_2$)$_a$— (a is an integer of 1 to 10) | —COO— | Benzene ring | Single bond | Benzene ring | C$_{1-12}$ alkyl group | 1 |
| 1-60a | Formula [1-c] | —OCO— | —(CH$_2$)$_a$— (a is an integer of 1 to 10) | —COO— | Benzene ring | Single bond | Benzene ring | C$_{1-12}$ alkyl group | 2 |

TABLE 5

| | X$^1$ | X$^2$ | X$^3$ | X$^4$ | X$^5$ | X$^6$ | X$^7$ | X$^8$ | p |
|---|---|---|---|---|---|---|---|---|---|
| 1-61a | Formula [1-c] | —O— | —(CH$_2$)$_a$— (a is an integer of 1 to 10) | —O— | Benzene ring | —COO— | Benzene ring | C$_{1-12}$ alkyl group | 1 |
| 1-62a | Formula [1-c] | —O— | —(CH$_2$)$_a$— (a is an integer of 1 to 10) | —O— | Benzene ring | —COO— | Benzene ring | C$_{1-12}$ alkyl group | 2 |
| 1-63a | Formula [1-c] | —COO— | —(CH$_2$)$_a$— (a is an integer of 1 to 10) | —O— | Benzene ring | —COO— | Benzene ring | C$_{1-12}$ alkyl group | 1 |
| 1-64a | Formula [1-c] | —COO— | —(CH$_2$)$_a$— (a is an integer of 1 to 10) | —O— | Benzene ring | —COO— | Benzene ring | C$_{1-12}$ alkyl group | 2 |
| 1-65a | Formula [1-c] | —OCO— | —(CH$_2$)$_a$— (a is an integer of 1 to 10) | —O— | Benzene ring | —COO— | Benzene ring | C$_{1-12}$ alkyl group | 1 |
| 1-66a | Formula [1-c] | —OCO— | —(CH$_2$)$_a$— (a is an integer of 1 to 10) | —O— | Benzene ring | —COO— | Benzene ring | C$_{1-12}$ alkyl group | 2 |
| 1-67a | Formula [1-c] | —O— | —(CH$_2$)$_a$— (a is an integer of 1 to 10) | —COO— | Benzene ring | —COO— | Benzene ring | C$_{1-12}$ alkyl group | 1 |
| 1-68a | Formula [1-c] | —O— | —(CH$_2$)$_a$— (a is an integer of 1 to 10) | —COO— | Benzene ring | —COO— | Benzene ring | C$_{1-12}$ alkyl group | 2 |
| 1-69a | Formula [1-c] | —COO— | —(CH$_2$)$_a$— (a is an integer of 1 to 10) | —COO— | Benzene ring | —COO— | Benzene ring | C$_{1-12}$ alkyl group | 1 |
| 1-70a | Formula [1-c] | —COO— | —(CH$_2$)$_a$— (a is an integer of 1 to 10) | —COO— | Benzene ring | —COO— | Benzene ring | C$_{1-12}$ alkyl group | 2 |
| 1-71a | Formula [1-c] | —OCO— | —(CH$_2$)$_a$— (a is an integer of 1 to 10) | —COO— | Benzene ring | —COO— | Benzene ring | C$_{1-12}$ alkyl group | 1 |
| 1-72a | Formula [1-c] | —OCO— | —(CH$_2$)$_a$— (a is an integer of 1 to 10) | —COO— | Benzene ring | —COO— | Benzene ring | C$_{1-12}$ alkyl group | 2 |
| 1-73a | Formula [1-c] | —O— | —(CH$_2$)$_a$— (a is an integer of 1 to 10) | —O— | Benzene ring | —OCO— | Benzene ring | C$_{1-12}$ alkyl group | 1 |
| 1-74a | Formula [1-c] | —O— | —(CH$_2$)$_a$— (a is an integer of 1 to 10) | —O— | Benzene ring | —OCO— | Benzene ring | C$_{1-12}$ alkyl group | 2 |
| 1-75a | Formula [1-c] | —COO— | —(CH$_2$)$_a$— (a is an integer of 1 to 10) | —O— | Benzene ring | —OCO— | Benzene ring | C$_{1-12}$ alkyl group | 1 |

TABLE 6

| | X$^1$ | X$^2$ | X$^3$ | X$^4$ | X$^5$ | X$^6$ | X$^7$ | X$^8$ | p |
|---|---|---|---|---|---|---|---|---|---|
| 1-76a | Formula [1-c] | —COO— | —(CH$_2$)$_a$— (a is an integer of 1 to 10) | —O— | Benzene ring | —OCO— | Benzene ring | C$_{1-12}$ alkyl group | 2 |
| 1-77a | Formula [1-c] | —OCO— | —(CH$_2$)$_a$— (a is an integer of 1 to 10) | —O— | Benzene ring | —OCO— | Benzene ring | C$_{1-12}$ alkyl group | 1 |

TABLE 6-continued

| | $X^1$ | $X^2$ | $X^3$ | $X^4$ | $X^5$ | $X^6$ | $X^7$ | $X^8$ | p |
|---|---|---|---|---|---|---|---|---|---|
| 1-78a | Formula [1-c] | —OCO— | —(CH$_2$)$_a$— (a is an integer of 1 to 10) | —O— | Benzene ring | —OCO— | Benzene ring | C$_{1-12}$ alkyl group | 2 |
| 1-79a | Formula [1-c] | —O— | —(CH$_2$)$_a$— (a is an integer of 1 to 10) | —COO— | Benzene ring | —OCO— | Benzene ring | C$_{1-12}$ alkyl group | 1 |
| 1-80a | Formula [1-c] | —O— | —(CH$_2$)$_a$— (a is an integer of 1 to 10) | —COO— | Benzene ring | —OCO— | Benzene ring | C$_{1-12}$ alkyl group | 2 |
| 1-81a | Formula [1-c] | —COO— | —(CH$_2$)$_a$— (a is an integer of 1 to 10) | —COO— | Benzene ring | —OCO— | Benzene ring | C$_{1-12}$ alkyl group | 1 |
| 1-82a | Formula [1-c] | —COO— | —(CH$_2$)$_a$— (a is an integer of 1 to 10) | —COO— | Benzene ring | —OCO— | Benzene ring | C$_{1-12}$ alkyl group | 2 |
| 1-83a | Formula [1-c] | —OCO— | —(CH$_2$)$_a$— (a is an integer of 1 to 10) | —COO— | Benzene ring | —OCO— | Benzene ring | C$_{1-12}$ alkyl group | 1 |
| 1-84a | Formula [1-c] | —OCO— | —(CH$_2$)$_a$— (a is an integer of 1 to 10) | —COO— | Benzene ring | —OCO— | Benzene ring | C$_{1-12}$ alkyl group | 2 |
| 1-85a | Formula [1-c] | —O— | —(CH$_2$)$_a$— (a is an integer of 1 to 10) | —O— | Benzene ring | Single bond | Cyclohexane ring | C$_{1-12}$ alkyl group | 1 |
| 1-86a | Formula [1-c] | —O— | —(CH$_2$)$_a$— (a is an integer of 1 to 10) | —O— | Benzene ring | Single bond | Cyclohexane ring | C$_{1-12}$ alkyl group | 2 |
| 1-87a | Formula [1-c] | —COO— | —(CH$_2$)$_a$— (a is an integer of 1 to 10) | —O— | Benzene ring | Single bond | Cyclohexane ring | C$_{1-12}$ alkyl group | 1 |
| 1-88a | Formula [1-c] | —COO— | —(CH$_2$)$_a$— (a is an integer of 1 to 10) | —O— | Benzene ring | Single bond | Cyclohexane ring | C$_{1-12}$ alkyl group | 2 |
| 1-89a | Formula [1-c] | —OCO— | —(CH$_2$)$_a$— (a is an integer of 1 to 10) | —O— | Benzene ring | Single bond | Cyclohexane ring | C$_{1-12}$ alkyl group | 1 |
| 1-90a | Formula [1-c] | —OCO— | —(CH$_2$)$_a$— (a is an integer of 1 to 10) | —O— | Benzene ring | Single bond | Cyclohexane ring | C$_{1-12}$ alkyl group | 2 |

TABLE 7

| | $X^1$ | $X^2$ | $X^3$ | $X^4$ | $X^5$ | $X^6$ | $X^7$ | $X^8$ | p |
|---|---|---|---|---|---|---|---|---|---|
| 1-91a | Formula [1-c] | —O— | —(CH$_2$)$_a$— (a is an integer of 1 to 10) | —COO— | Benzene ring | Single bond | Cyclohexane ring | C$_{1-12}$ alkyl group | 1 |
| 1-92a | Formula [1-c] | —O— | —(CH$_2$)$_a$— (a is an integer of 1 to 10) | —COO— | Benzene ring | Single bond | Cyclohexane ring | C$_{1-12}$ alkyl group | 2 |
| 1-93a | Formula [1-c] | —COO— | —(CH$_2$)$_a$— (a is an integer of 1 to 10) | —COO— | Benzene ring | Single bond | Cyclohexane ring | C$_{1-12}$ alkyl group | 1 |
| 1-94a | Formula [1-c] | —COO— | —(CH$_2$)$_a$— (a is an integer of 1 to 10) | —COO— | Benzene ring | Single bond | Cyclohexane ring | C$_{1-12}$ alkyl group | 2 |
| 1-95a | Formula [1-c] | —OCO— | —(CH$_2$)$_a$— (a is an integer of 1 to 10) | —COO— | Benzene ring | Single bond | Cyclohexane ring | C$_{1-12}$ alkyl group | 1 |
| 1-96a | Formula [1-c] | —OCO— | —(CH$_2$)$_a$— (a is an integer of 1 to 10) | —COO— | Benzene ring | Single bond | Cyclohexane ring | C$_{1-12}$ alkyl group | 2 |
| 1-97a | Formula [1-c] | —O— | —(CH$_2$)$_a$— (a is an integer of 1 to 10) | —O— | Benzene ring | —COO— | Cyclohexane ring | C$_{1-12}$ alkyl group | 1 |
| 1-98a | Formula [1-c] | —O— | —(CH$_2$)$_a$— (a is an integer of 1 to 10) | —O— | Benzene ring | —COO— | Cyclohexane ring | C$_{1-12}$ alkyl group | 2 |
| 1-99a | Formula [1-c] | —COO— | —(CH$_2$)$_a$— (a is an integer of 1 to 10) | —O— | Benzene ring | —COO— | Cyclohexane ring | C$_{1-12}$ alkyl group | 1 |
| 1-100a | Formula [1-c] | —COO— | —(CH$_2$)$_a$— (a is an integer of 1 to 10) | —O— | Benzene ring | —COO— | Cyclohexane ring | C$_{1-12}$ alkyl group | 2 |
| 1-101a | Formula [1-c] | —OCO— | —(CH$_2$)$_a$— (a is an integer of 1 to 10) | —O— | Benzene ring | —COO— | Cyclohexane ring | C$_{1-12}$ alkyl group | 1 |
| 1-102a | Formula [1-c] | —OCO— | —(CH$_2$)$_a$— (a is an integer of 1 to 10) | —O— | Benzene ring | —COO— | Cyclohexane ring | C$_{1-12}$ alkyl group | 2 |
| 1-103a | Formula [1-c] | —O— | —(CH$_2$)$_a$— (a is an integer of 1 to 10) | —COO— | Benzene ring | —COO— | Cyclohexane ring | C$_{1-12}$ alkyl group | 1 |
| 1-104a | Formula [1-c] | —O— | —(CH$_2$)$_a$— (a is an integer of 1 to 10) | —COO— | Benzene ring | —COO— | Cyclohexane ring | C$_{1-12}$ alkyl group | 2 |
| 1-105a | Formula [1-c] | —COO— | —(CH$_2$)$_a$— (a is an integer of 1 to 10) | —COO— | Benzene ring | —COO— | Cyclohexane ring | C$_{1-12}$ alkyl group | 1 |

TABLE 8

| | $X^1$ | $X^2$ | $X^3$ | $X^4$ | $X^5$ | $X^6$ | $X^7$ | $X^8$ | p |
|---|---|---|---|---|---|---|---|---|---|
| 1-106a | Formula [1-c] | —COO— | —(CH$_2$)$_a$— (a is an integer of 1 to 10) | —COO— | Benzene ring | —COO— | Cyclohexane ring | C$_{1-12}$ alkyl group | 2 |

TABLE 8-continued

| | | X¹ | X² | X³ | X⁴ | X⁵ | X⁶ | X⁷ | X⁸ | p |
|---|---|---|---|---|---|---|---|---|---|---|
| 1-107a | Formula [1-c] | —OCO— | —(CH$_2$)$_a$— (a is an integer of 1 to 10) | —COO— | Benzene ring | —COO— | Cyclohexane ring | C$_{1-12}$ alkyl group | 1 |
| 1-108a | Formula [1-c] | —OCO— | —(CH$_2$)$_a$— (a is an integer of 1 to 10) | —COO— | Benzene ring | —COO— | Cyclohexane ring | C$_{1-12}$ alkyl group | 2 |
| 1-109a | Formula [1-c] | —O— | —(CH$_2$)$_a$— (a is an integer of 1 to 10) | —O— | Benzene ring | —OCO— | Cyclohexane ring | C$_{1-12}$ alkyl group | 1 |
| 1-110a | Formula [1-c] | —O— | —(CH$_2$)$_a$— (a is an integer of 1 to 10) | —O— | Benzene ring | —OCO— | Cyclohexane ring | C$_{1-12}$ alkyl group | 2 |
| 1-111a | Formula [1-c] | —COO— | —(CH$_2$)$_a$— (a is an integer of 1 to 10) | —O— | Benzene ring | —OCO— | Cyclohexane ring | C$_{1-12}$ alkyl group | 1 |
| 1-112a | Formula [1-c] | —COO— | —(CH$_2$)$_a$— (a is an integer of 1 to 10) | —O— | Benzene ring | —OCO— | Cyclohexane ring | C$_{1-12}$ alkyl group | 2 |
| 1-113a | Formula [1-c] | —OCO— | —(CH$_2$)$_a$— (a is an integer of 1 to 10) | —O— | Benzene ring | —OCO— | Cyclohexane ring | C$_{1-12}$ alkyl group | 1 |
| 1-114a | Formula [1-c] | —OCO— | —(CH$_2$)$_a$— (a is an integer of 1 to 10) | —O— | Benzene ring | —OCO— | Cyclohexane ring | C$_{1-12}$ alkyl group | 2 |
| 1-115a | Formula [1-c] | —O— | —(CH$_2$)$_a$— (a is an integer of 1 to 10) | —COO— | Benzene ring | —OCO— | Cyclohexane ring | C$_{1-12}$ alkyl group | 1 |
| 1-116a | Formula [1-c] | —O— | —(CH$_2$)$_a$— (a is an integer of 1 to 10) | —COO— | Benzene ring | —OCO— | Cyclohexane ring | C$_{1-12}$ alkyl group | 2 |
| 1-117a | Formula [1-c] | —COO— | —(CH$_2$)$_a$— (a is an integer of 1 to 10) | —COO— | Benzene ring | —OCO— | Cyclohexane ring | C$_{1-12}$ alkyl group | 1 |
| 1-118a | Formula [1-c] | —COO— | —(CH$_2$)$_a$— (a is an integer of 1 to 10) | —COO— | Benzene ring | —OCO— | Cyclohexane ring | C$_{1-12}$ alkyl group | 2 |
| 1-119a | Formula [1-c] | —OCO— | —(CH$_2$)$_a$— (a is an integer of 1 to 10) | —COO— | Benzene ring | —OCO— | Cyclohexane ring | C$_{1-12}$ alkyl group | 1 |
| 1-120a | Formula [1-c] | —OCO— | —(CH$_2$)$_a$— (a is an integer of 1 to 10) | —COO— | Benzene ring | —OCO— | Cyclohexane ring | C$_{1-12}$ alkyl group | 2 |

TABLE 9

| | | X¹ | X² | X³ | X⁴ | X⁵ | X⁶ | X⁷ | X⁸ | p |
|---|---|---|---|---|---|---|---|---|---|---|
| 1-121a | Formula [1-a] | Single bond | —(CH$_2$)$_a$— (a is an integer of 1 to 10) | —O— | C$_{17-51}$ organic group having steroid skeleton | Single bond | — | C$_{1-12}$ alkyl group | 0 |
| 1-122a | Formula [1-b] | Single bond | —(CH$_2$)$_a$— (a is an integer of 1 to 10) | —O— | C$_{17-51}$ organic group having steroid skeleton | Single bond | — | C$_{1-12}$ alkyl group | 0 |
| 1-123a | Formula [1-a] | Single bond | —(CH$_2$)$_a$— (a is an integer of 1 to 10) | —COO— | C$_{17-51}$ organic group having steroid skeleton | Single bond | — | C$_{1-12}$ alkyl group | 0 |
| 1-124a | Formula [1-b] | Single bond | —(CH$_2$)$_a$— (a is an integer of 1 to 10) | —COO— | C$_{17-51}$ organic group having steroid skeleton | Single bond | — | C$_{1-12}$ alkyl group | 0 |
| 1-125a | Formula [1-c] | —O— | —(CH$_2$)$_a$— (a is an integer of 1 to 10) | —O— | C$_{17-51}$ organic group having steroid skeleton | Single bond | — | C$_{1-12}$ alkyl group | 0 |
| 1-126a | Formula [1-c] | —COO— | —(CH$_2$)$_a$— (a is an integer of 1 to 10) | —O— | C$_{17-51}$ organic group having steroid skeleton | Single bond | — | C$_{1-12}$ alkyl group | 0 |
| 1-127a | Formula [1-c] | —OCO— | —(CH$_2$)$_a$— (a is an integer of 1 to 10) | —O— | C$_{17-51}$ organic group having steroid skeleton | Single bond | — | C$_{1-12}$ alkyl group | 0 |
| 1-128a | Formula [1-c] | —O— | —(CH$_2$)$_a$— (a is an integer of 1 to 10) | —COO— | C$_{17-51}$ organic group having steroid skeleton | Single bond | — | C$_{1-12}$ alkyl group | 0 |
| 1-129a | Formula [1-c] | —COO— | —(CH$_2$)$_a$— (a is an integer of 1 to 10) | —COO— | C$_{17-51}$ organic group having steroid skeleton | Single bond | — | C$_{1-12}$ alkyl group | 0 |
| 1-130a | Formula [1-c] | —OCO— | —(CH$_2$)$_a$— (a is an integer of 1 to 10) | —COO— | C$_{17-51}$ organic group having steroid skeleton | Single bond | — | C$_{1-12}$ alkyl group | 0 |

Among them, from the viewpoint of optical properties of the liquid crystal display device, preferred is a combination of (1-1a) to (1-12a), (1-13a), (1-14a), (1-17a), (1-18a), (1-21a), (1-22a), (1-25a) to (1-38a), (1-41a), (1-42a), (1-45a), (1-46a), (1-49a) to (1-96a) or (1-121a) to (1-130a).

More preferred is a combination of (1-1a) to (1-4a), (1-9a) to (1-12a), (1-25a) to (1-28a), (1-33a) to (1-36a), (1-49a) to (1-52a), (1-61a) to (1-64a), (1-85a) to (1-88a), (1-121a), (1-122a), (1-125a) or (1-126a).

Particularly preferred is a combination of (1-3a), (1-4a), (1-9a), (1-10a), (1-27a), (1-28a), (1-33a) (1-34a), (1-49a) to (1-52a), (1-61a) to (1-64a), (1-85a) to (1-88a), (1-121a), (1-122a), (1-125a) or (1-126a).

As more specific compounds, compounds represented by the following formula [1a-1] to formula [1a-6] may be mentioned, and it is preferred to use them.

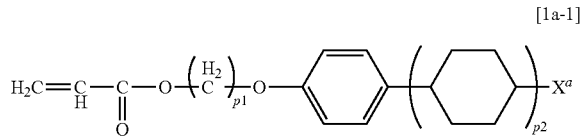

[1a-1]

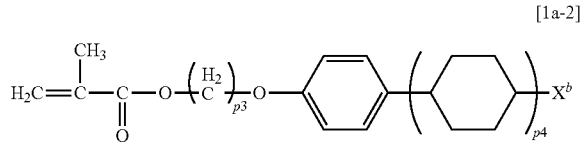

[1a-2]

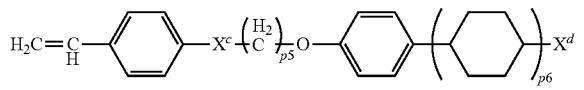

[1a-3]

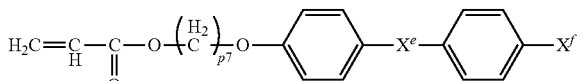

[1a-4]

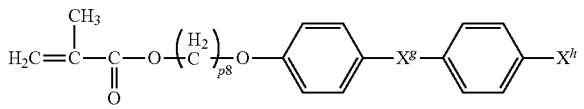

[1a-5]

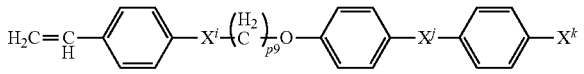

[1a-6]

In the formula [1a-1] to formula [1a-6], $X^a$ to $X^k$ and p1 to p9 are as defined above. Among them, respectively, the following ones are preferred.

$X^a$, $X^b$, $X^d$, $X^f$, $X^h$ and $X^k$ are each independently, from the viewpoint of optical properties of the liquid crystal display device, preferably a $C_{1-12}$ alkyl group or a $C_{1-12}$ alkoxy group. More preferred is a $C_{1-8}$ alkyl group or a $C_{1-8}$ alkoxy group. $X^c$ and $X^i$ are each independently, from the viewpoint of availability of raw material or easy synthesis, preferably —O— or —COO—. $X^e$, $X^g$ and $X^j$ are each independently, from the viewpoint of availability of raw material or easy synthesis, preferably —COO— or —OCO—. p1, p3, p5, p7, p8 and p9 are each independently preferably an integer of from 1 to 10. More preferred from the viewpoint of optical properties of the liquid crystal display device, is an integer of from 1 to 8. p2, p4 and p6 are each independently preferably an integer of 1 or 2.

The proportion of the specific compound in the liquid crystal composition is, from the viewpoint of optical properties of the liquid crystal display device, preferably from 0.1 to 20 parts by mass to 100 parts by mass of the liquid crystal composition excluding the specific compound. More preferred is from 0.5 to 15 parts by mass, and particularly preferred is from 1 to 10 parts by mass. As the specific compound, one type may be used alone or two or more types may be used as mixed, depending on the optical properties of the liquid crystal display device or the adhesion property between liquid crystal layer and the liquid crystal alignment film.

As the liquid crystal in the liquid crystal composition, a nematic liquid crystal, a smectic liquid crystal or a cholesteric liquid crystal may be used. Among them, preferred is one having a negative dielectric anisotropy. Further, from the viewpoint of low voltage driving and scattering properties, one having a large anisotropy of dielectric constant and a large anisotropy of refractive index, is preferred. Further, depending on the respective physical property values of the phase transition temperature, the dielectric anisotropy and the refractive index anisotropy, two or more types of liquid crystal may be used as mixed.

In order to drive the liquid crystal display device as an active element such as TFT (Thin Film Transistor), the liquid crystal is required to have a high electrical resistance and a high voltage holding ratio (also referred to as VHR).

Therefore, as the liquid crystal, it is preferred to use a fluorinated or chlorinated liquid crystal which has a high electrical resistance, and of which VHR will not be lowered by active energy rays such as ultraviolet rays.

Further, the liquid crystal display device may be made to be a guest-host type device by dissolving a dichroic dye in the liquid crystal composition. In such a case, it is possible to obtain a device which is transparent when no voltage is applied, and becomes absorbed (scattered) when a voltage is applied. Further, in this liquid crystal display device, the direction of the liquid crystal director (direction of alignment) changes by 90 degrees depending on the presence or absence of the voltage application. Therefore, with this liquid crystal display device, by utilizing the difference in light absorption properties of the dichroic dye, it is possible to obtain a high contrast as compared to a conventional guest-host type device to carry out switching between random alignment and vertical alignment. Further, with the guest-host type device having a dichroic dye dissolved, the liquid crystal becomes colored when aligned horizontally, and becomes opaque only in a scattering state. Therefore, it is also possible to obtain a device which is switchable from colorless transparent at the time of no application of a voltage to a state of colored opaque and colored transparent, as a voltage is applied.

The polymerizable compound in the liquid crystal composition may be one capable of undergoing a polymerization reaction by ultraviolet rays to form a cured product composite of the liquid crystal composition (e.g. like a polymer network), i.e. a liquid crystal layer. At that time, a monomer of the polymerizable compound may be introduced into the liquid crystal composition, or, in advance, the monomer may be subjected to a polymerization reaction, and the obtained polymer may be introduced into the liquid crystal composition. However, even when the polymer is used, it should have a site which undergoes a polymerization reaction by ultraviolet rays. More preferably, from the viewpoint of the handling efficiency of the liquid crystal composition, that is, from the viewpoint of inhibition of a high viscosity of the liquid crystal composition or the solubility in the liquid crystal, preferred is a method of introducing the monomer into the liquid crystal composition, and subjecting it to a polymerization reaction by irradiation with ultraviolet rays at the time of preparing a liquid crystal display device, to form a cured product.

The polymerizable compound is preferably a compound which is soluble in the liquid crystal. However, it becomes necessary that when the polymerizable compound is dissolved in a liquid crystal, a temperature is present at which a part or whole of the liquid crystal composition exhibits a liquid crystal phase. Even in a case where a part of the liquid crystal composition exhibits a liquid crystal phase, it is preferred that when the liquid crystal display device is observed with the naked eye, substantially uniform transparency and scattering properties are obtainable throughout the entire inside of the device.

The polymerizable compound may be any compound which undergoes a polymerization reaction by ultraviolet rays, and at that time, the polymerization may be proceeded in any reaction mode to form a cured product of the liquid crystal composition. As a specific reaction mode, radical polymerization, cationic polymerization, anionic polymerization or polyaddition reaction may be mentioned. Among them, radical polymerization is preferred as the reaction mode of the polymerizable compound. At that time, as the polymerizable compound, the following radical-type polymerizable compounds (monomers) and their oligomers may be used. Further, as mentioned above, it is also possible to use polymers obtained by subjecting these monomers to a polymerization reaction.

A monofunctional polymerizable compound (also referred to as a monofunctional monomer) may, for example, be 2-ethylhexyl acrylate, butylethyl acrylate, butoxyethyl acrylate, 2-cyanoethyl acrylate, benzyl acrylate, cyclohexyl acrylate, hydroxyethyl acrylate, 2-hydroxypropyl acrylate, 2-ethoxyethyl acrylate, N,N-diethylaminoethyl acrylate, N,N-dimethylaminoethyl acrylate, dicyclopentanyl acrylate, dicyclopentenyl acrylate, glycidyl acrylate, tetrahydrofurfuryl acrylate, isobornyl acrylate, isodecyl acrylate, lauryl acrylate, morpholine acrylate, phenoxyethyl acrylate, phenoxydiethylene glycol acrylate, 2,2,2-trifluoroethyl acrylate, 2,2,3,3,3-pentafluoropropyl acrylate, 2,2,3,3-tetrafluoropropyl acrylate, 2,2,3,4,4,4-hexafluorobutyl acrylate, 2-ethylhexyl methacrylate, butylethyl methacrylate, butoxyethyl methacrylate, 2-cyanoethyl methacrylate, benzyl methacrylate, cyclohexyl methacrylate, hydroxyethyl methacrylate, 2-hydroxypropyl methacrylate, 2-ethoxyethyl acrylate, N,N-diethylaminoethyl methacrylate, N,N-dimethylaminoethyl methacrylate, dicyclopentanyl methacrylate, dicyclopentenyl methacrylate, glycidyl methacrylate, tetrahydrofurfuryl methacrylate, isobornyl methacrylate, isodecyl methacrylate, lauryl methacrylate, morpholine methacrylate, phenoxyethyl methacrylate, phenoxydiethylene glycol methacrylate, 2,2,2-trifluoroethyl methacrylate, 2,2,3,3-tetrafluoropropyl methacrylate or 2,2,3,4,4,4-hexafluorobutyl methacrylate, and their oligomers, etc.

The bifunctional polymerizable compound (also referred to as a bifunctional monomer) may, for example, be 4,4'-biphenyl diacrylate, diethylstilbestrol diacrylate, 1,4-bisacryloyloxybenzene, 4,4'-bisacryloyloxydiphenyl ether, 4,4'-bisacryloyloxydiphenylmethane, 3,9-[1,1-dimethyl-2-acryloyloxyethyl]-2,4,8,10-tetraspiro[5,5]undecane, α,α'-bis[4-acryloyloxyphenyl]-1,4-diisopropylbenzene, 1,4-bisacryloyloxytetrafluorobenzene, 4,4'-bisacryloyloxyoctafluorobiphenyl, diethylene glycol acrylate, 1,4-butanediol diacrylate, 1,3-butylene glycol diacrylate, dicyclopentanyl diacrylate, glycerol diacrylate, 1,6-hexanediol diacrylate, neopentyl glycol diacrylate, tetraethylene glycol diacrylate, 1,9-nonanediol diacrylate, polyethylene glycol diacrylate, polypropylene glycol diacrylate, 1,9-nonanediol dimethacrylate, polyethylene glycol dim ethacrylate or polypropylene glycol dimethacrylate, and their oligomers, etc.

A polyfunctional polymerizable compound (also referred to as a polyfunctional monomer) may, for example, be trimethylolpropane triacrylate, pentaerythritol tetraacrylate, pentaerythritol triacrylate, ditrimethylolpropane tetraacrylate, dipentaerythritol hexaacrylate, dipentaerythritol monohydroxy pentaacrylate, 4,4'-diacryloyloxy stilbene, 4,4'-diacryloyloxy dimethyl stilbene, 4,4'-diacryloyloxy diethyl stilbene, 4,4'-diacryloyloxy dipropyl stilbene, 4,4'-diacryloyloxy dibutyl stilbene, 4,4'-diacryloyloxy dipentyl stilbene, 4,4'-diacryloyloxy dihexyl stilbene, 4,4'-diacryloyloxy difluorostilbene, 2,2,3,3,4,4-hexafluoropentanediol-1,5-diacrylate, 1,1,2,2,3,3-hexafluoropropyl-1,3-diacrylate, diethylene glycol dimethacrylate, 1,4-butanediol dim ethacrylate, 1,3-butylene glycol dimethacrylate, 1,6-hexanediol dimethacrylate, neopentyl glycol dimethacrylate, tetraethylene glycol dimethacrylate, trimethylolpropane trimethacrylate, pentaerythritol tetraacrylate, pentaerythritol trimethacrylate, ditrimethylolpropane tetramethacrylate, dipentaerythritol hexamethacrylate, dipentaerythritol monohydroxy pentamethacrylate or 2,2,3,3,4,4-hexafluoropentanediol-1,5-dimethacrylate, and their oligomers, etc.

One of these radical type polymerizable compounds, or two or more of them as mixed, may be used depending on the optical properties of the liquid crystal display device or the adhesion properties between the liquid crystal layer and the liquid crystal alignment film.

In order to promote formation of a cured product composite of the liquid crystal composition, or for the purpose of promoting radical polymerization of the polymerizable compound in the liquid crystal composition, it is preferred to introduce a radical initiator (also referred to as a polymerization initiator) that generates radicals by ultraviolet rays. For example, organic peroxides such as tert-butylperoxy-iso-butarate, 2,5-dimethyl-2,5-bis(benzoyldioxy)hexane, 1,4-bis[α-(tert-butyldioxy)-iso-propoxy]benzene, di-tert-butyl peroxide, 2,5-dimethyl-2,5-bis(tert-butyldioxy)hexene hydroperoxide, α-(iso-propylphenyl)-iso-propyl hydroperoxide, 2,5-dimethylhexane, tert-butyl hydroperoxide, 1,1-bis(tert-butyldioxy)-3,3,5-trimethylcyclohexane, butyl-4,4-bis(tert-butyldioxy) valerate, cyclohexanone peroxide, 2,2', 5,5'-tetra(tert-butylperoxycarbonyl)benzophenone, 3,3',4,4'-tetra(tert-butylperoxycarbonyl)benzophenone, 3,3',4,4'-tetra(tert-amylperoxycarbonyl)benzophenone, 3,3',4,4'-tetra(tert-hexylperoxycarbonyl)benzophenone, 3,3'-bis(tert-butylperoxycarbonyl)-4,4'-dicarboxybenzophenone, tert-butylperoxybenzoate, di-tert-butyldiperoxy isophthalate, etc.; quinones such as 9,10-anthraquinone, 1-chloroanthraquinone, 2-chloroanthraquinone, octamethyl anthraquinone, 1,2-anthraquinone, etc.; and benzoin derivatives such as benzoin methyl, benzoin ethyl ether, α-methyl benzoin, α-phenyl benzoin, etc. may be mentioned.

One of these radical initiators, or two or more of them as mixed, may be used depending on the optical properties of the liquid crystal display device or the adhesion properties between the liquid crystal layer and the liquid crystal alignment film.

As the polymerizable compound, the following ionic polymerizable compound may also be used. Specifically, it is a compound having at least one cross-linking group selected from the group consisting of a hydroxy group, a hydroxyalkyl group and a lower alkoxyalkyl group.

More specifically, as a crosslinkable compound having at least one group selected from the group consisting of a hydroxy group, a hydroxyalkyl group and a lower alkoxyalkyl group, in particular, a melamine derivative or a benzoguanamine derivative as disclosed on pages 39 to 40 in WO2013/125595 (published on 2013.8.29), or a crosslinkable compound represented by the formula [6-1] to formula [6-48] as published on pages 62 to 66 in WO2011/132751 (published on Oct. 27, 2011), may be mentioned.

Further, as the ionic polymerizable compound, it is also possible to use a compound having a crosslinking group containing an epoxy group or an isocyanate group. Specifically, a crosslinkable compound having an epoxy group or an isocyanate group as disclosed on pages 37 to 38 in WO2013/125595 (published on Aug. 29, 2013) may be mentioned.

In the case of using an ionic polymerizable compound, an ionic initiator which generates an acid or base by ultraviolet rays, may be introduced for the purpose of accelerating the polymerization reaction.

Specifically, it is possible to use, for example, a triazine compound, an acetophenone derivative compound, a disulfone compound, a diazomethane compound, a sulfonic acid derivative compound, a diaryliodonium salt, a triarylsulfonium salt, a triarylphosphonium salt, an iron-arene complex, etc., but the ionic initiator is not limited thereto. More specifically, for example, diphenyliodonium chloride, diphenyliodonium trifluoromethane sulfonate, diphenyliodonium mesylate, diphenyliodonium tosylate, diphenyliodonium bromide, diphenyliodonium tetrafluoroborate, diphenyliodonium hexafluoroantimonate, diphenyliodonium hexafluoroarsenate, bis(p-tert-butylphenyl) iodonium hexafluorophosphate, bis(p-tert-butylphenyl)iodonium mesylate, bis(p-tert-butylphenyl)iodonium tosylate, bis(p-tert-butylphenyl)iodonium trifluoromethanesulfonate, bis(p-tert-butylphenyl)iodonium tetrafluoroborate, bis(p-tert-butylphenyl)iodonium chloride, bis(p-chlorophenyl)iodonium chloride, bis(p-chlorophenyl)iodonium tetrafluoroborate, triphenylsulfonium chloride, triphenylsulfonium bromide, tri(p-methoxyphenyl)sulfonium tetrafluoroborate, tri(p-methoxyphenyl)sulfonium hexafluorophosphonate, tri(p-ethoxyphenyl)sulfonium tetrafluoroborate, triphenylphosphonium chloride, triphenylphosphonium bromide, tri(p-methoxyphenyl)phosphonium tetrafluoroborate, tri(p-methoxyphenyl)phosphonium hexafluorophosphonate, tri (p-ethoxyphenyl)phosphonium tetrafluoroborate, bis[[(2-nitrobenzyl)oxy]carbonylhexane-1,6-diamine], nitrobenzyl cyclohexyl carbamate, di(methoxybenzyl)hexamethylene dicarbamate, bis[[(2-nitrobenzyl)oxy]carbonylhexane-1,6-diamine], nitrobenzyl cyclohexyl carbamate, di(methoxybenzyl)hexamethylene dicarbamate, etc. may be mentioned.

<Specific Side Chain Structure (1)>

The specific side chain structure (1) in the present invention is represented by the following formula [2-1] or formula [2-2].

                              [2-1]

In the formula [2-1], $Y^1$, $Y^2$, $Y^3$, $Y^4$, $Y^5$, $Y^6$ and n are as defined above, but inter alia, respectively, the following ones are preferred.

$Y^1$ is, from the viewpoint of availability of raw material and easy synthesis, preferably a single bond, —$(CH_2)_a$— (a is an integer of from 1 to 15), —O—, —$CH_2O$— or —COO—. More preferred is a single bond, —$(CH_2)_a$— (a is an integer of from 1 to 10), —O—, —$CH_2O$— or —COO—. $Y^2$ is preferably a single bond or —$(CH_2)_b$— (b is an integer of from 1 to 10). $Y^3$ is, from the viewpoint of easy synthesis, preferably a single bond, —$(CH_2)_a$— (a is an integer of from 1 to 15), —O—, —$CH_2O$— or —COO—. More preferred is a single bond, —$(CH_2)_a$— (a is an integer of from 1 to 10), —O—, —$CH_2O$— or —COO—. $Y^4$ is, from the viewpoint of easy synthesis, preferably a benzene ring, a cyclohexane ring or a $C_{17}$-51 organic group having a steroid skeleton.

$Y^5$ is preferably a benzene ring or a cyclohexane ring. $Y^6$ is preferably a $C_{1-18}$ alkyl group, a $C_{1-10}$ fluorinated alkyl group, a $C_{1-18}$ alkoxy group, or a $C_{1-10}$ fluorinated alkoxy group. More preferred is a $C_{1-12}$ alkyl group, or a $C_{1-12}$ alkoxy group. Particularly preferred is a $C_{1-9}$ alkyl group, or a $C_{1-9}$ alkoxy group. n is, from the viewpoint of availability of raw material or easy synthesis, preferably from 0 to 3, more preferably from 0 to 2.

Preferred combinations of $Y^1$, $Y^2$, $Y^3$, $Y^4$, $Y^5$, $Y^6$ and n may be the same combinations as (2-1) to (2-629) disclosed in Tables 6 to 47 on pages 13 to 34 in WO (international publication) 2011/132751 (published on Oct. 27, 2011 public). In each Table in the international publication, $Y^1$ to $Y^6$ in the present invention are shown as Y1 to Y6, and therefore, Y1 to Y6 shall be read as $Y^1$ to $Y^6$. Further, in (2-605) to (2-629) listed in each Table in the international publication, the $C_{17-51}$ organic group having a steroid skeleton in the present invention, is shown as a $C_{12-25}$ organic group having a steroid skeleton, and therefore, the $C_{12-25}$ organic group having a steroid skeleton shall be read as a $C_{17-51}$ organic group having a steroid skeleton.

Among them, preferred is a combination of (2-25) to (2-96), (2-145) to (2-168), (2-217) to (2-240), (2-268) to (2-315), (2-364) to (2-387), (2-436) to (2-483), (2-603) to (2-615) or (2-624). A particularly preferred combination is (2-49) to (2-96), (2-145) to (2-168), (2-217) to (2-240), (2-603) to (2-606), (2-607) to (2-609), (2-611), (2-612) or (2-624).

                              [2-2]

In the formula [2-2], $Y^7$ and $Y^8$ are as defined above, but inter alia, respectively, the following ones are preferred.

$Y^7$ is preferably a single bond, —O—, —$CH_2O$—, —CONH—, —CON($CH_3$)— or —COO—. More preferred is a single bond, —O—, —CONH— or —COO—. $Y^8$ is preferably a $C_8$-18 alkyl group.

As the specific side chain structure (1) in the present invention, as described above, from such a viewpoint that it is possible to obtain a high and stable vertical alignment of the liquid crystal, the specific side chain structure represented by the formula [2-1] is preferred.

<Specific Side Chain Structure (2)>

The specific side chain structure (2) is represented by the following formula [3].

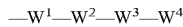                              [3]

In the formula [3], $W^1$, $W^2$, $W^3$ and $W^4$ are as defined above, but inter alia, respectively, the following ones are preferred.

$W^1$ is, from the viewpoint of availability of raw material or easy synthesis, preferably a single bond, —O—, —$CH_2O$—, —CONH—, —CON($CH_3$)— or —COO—. More preferred is —O—, —$CH_2O$— or —COO—. $W^2$ is preferably a single bond, a $C_{1-18}$ alkylene group, or a $C_{6-12}$ organic group having a benzene ring or a cyclohexane ring. More preferred is a $C_{2-10}$ alkylene group from the viewpoint of the optical properties of the liquid crystal display device. $W^3$ is, from the viewpoint of availability of raw material or easy synthesis, preferably a single bond, —O—, —$CH_2O$—, —CO— or —OCO—. $W^4$ is, from the viewpoint of the optical properties of the liquid crystal display device, preferably a structure represented by the above formula [3-a], formula [3-b], formula [3-c] or formula [3-e].

Preferred combinations of $W^1$ to $W^4$ in the formula [3] are shown in the following Table 10 and Table 11.

TABLE 10

| | $W^1$ | $W^2$ | $W^3$ | $W^4$ |
|---|---|---|---|---|
| 3-1a | —O— | $C_{2-10}$ alkylene group | Single bond | Formula [3-a] |
| 3-2a | —$CH_2O$— | $C_{2-10}$ alkylene group | Single bond | Formula [3-a] |
| 3-3a | —COO— | $C_{2-10}$ alkylene group | Single bond | Formula [3-a] |
| 3-4a | —O— | $C_{2-10}$ alkylene group | Single bond | Formula [3-b] |
| 3-5a | —$CH_2O$— | $C_{2-10}$ alkylene group | Single bond | Formula [3-b] |
| 3-6a | —COO— | $C_{2-10}$ alkylene group | Single bond | Formula [3-b] |
| 3-7a | —O— | $C_{2-10}$ alkylene group | —O— | Formula [3-c] |
| 3-8a | —$CH_2O$— | $C_{2-10}$ alkylene group | —O— | Formula [3-c] |
| 3-9a | —COO— | $C_{2-10}$ alkylene group | —O— | Formula [3-c] |
| 3-10a | —O— | $C_{2-10}$ alkylene group | —$CH_2O$— | Formula [3-c] |
| 3-11a | —$CH_2O$— | $C_{2-10}$ alkylene group | —$CH_2O$— | Formula [3-c] |
| 3-12a | —COO— | $C_{2-10}$ alkylene group | —$CH_2O$— | Formula [3-c] |
| 3-13a | —O— | $C_{2-10}$ alkylene group | —COO— | Formula [3-c] |
| 3-14a | —$CH_2O$— | $C_{2-10}$ alkylene group | —COO— | Formula [3-c] |
| 3-15a | —COO— | $C_{2-10}$ alkylene group | —COO— | Formula [3-c] |

TABLE 11

| | $W^1$ | $W^2$ | $W^3$ | $W^4$ |
|---|---|---|---|---|
| 3-16a | —O— | $C_{2-10}$ alkylene group | —OCO— | Formula [3-c] |
| 3-17a | —CH$_2$O— | $C_{2-10}$ alkylene group | —OCO— | Formula [3-c] |
| 3-18a | —COO— | $C_{2-10}$ alkylene group | —OCO— | Formula [3-c] |
| 3-19a | —O— | $C_{2-10}$ alkylene group | Single bond | Formula [3-e] |
| 3-20a | —CH$_2$O— | $C_{2-10}$ alkylene group | Single bond | Formula [3-e] |
| 3-21a | —COO— | $C_{2-10}$ alkylene group | Single bond | Formula [3-e] |
| 3-22a | —O— | $C_{2-10}$ alkylene group | —CH$_2$O— | Formula [3-e] |
| 3-23a | —CH$_2$O— | $C_{2-10}$ alkylene group | —CH$_2$O— | Formula [3-e] |
| 3-24a | —COO— | $C_{2-10}$ alkylene group | —CH$_2$O— | Formula [3-e] |
| 3-25a | —O— | $C_{2-10}$ alkylene group | —COO— | Formula [3-e] |
| 3-26a | —CH$_2$O— | $C_{2-10}$ alkylene group | —COO— | Formula [3-e] |
| 3-27a | —COO— | $C_{2-10}$ alkylene group | —COO— | Formula [3-e] |
| 3-28a | —O— | $C_{2-10}$ alkylene group | —OCO— | Formula [3-e] |
| 3-29a | —CH$_2$O— | $C_{2-10}$ alkylene group | —OCO— | Formula [3-e] |
| 3-30a | —COO— | $C_{2-10}$ alkylene group | —OCO— | Formula [3-e] |

Among them, from the viewpoint of the optical properties of the liquid crystal display device, preferred is a combination of (3-1a) to (3-9a), (3-13a) to (3-24a) or (3-28a) to (3-30a). More preferred is a combination of (3-1a) to (3-9a) or (3-16a) to (3-24a). Particularly preferred is a combination of (3-1a) to (3-9a) or (3-16a) to (3-18a).

<Specific Polymer>

The specific polymer having a specific side chain structure (1) and a specific side chain structure (2) is not particularly limited, but at least one polymer selected from the group consisting of an acrylic polymer, a methacrylic polymer, a novolak resin, a polyhydroxystyrene, a polyimide precursor, a polyimide, a polyamide, a polyester, cellulose and polysiloxane, is preferred. More preferred is a polyimide precursor, a polyimide or polysiloxane. Particularly preferred is a polyimide precursor or a polyimide.

In the case of using as the specific polymer a polyimide precursor or a polyimide (collectively referred to as a polyimide-type polymer), it is preferably a polyimide precursor or polyimide obtained by reacting a diamine component and tetracarboxylic acid component.

The polyimide precursor has a structure represented by the following formula [A].

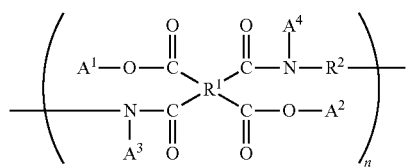

[A]

($R^1$ is a tetravalent organic group, $R^2$ is a divalent organic group, $A^1$ and $A^2$ are each independently a hydrogen atom or a $C_{1-8}$ alkyl group, $A^3$ and $A^4$ are each independently a hydrogen atom, a $C_{1-5}$ alkyl group or an acetyl group, and n is a positive integer.)

The above diamine component is a diamine having two primary or secondary amino groups in the molecule, and the above tetracarboxylic acid component may, for example, be a tetracarboxylic acid compound, a tetracarboxylic dianhydride, a tetracarboxylic acid dihalide compound, a tetracarboxylic acid dialkyl ester compound or a tetracarboxylic acid dialkyl ester dihalide compound.

The polyimide type polymer is preferably a polyamic acid consisting of repeating units represented by the following structural formula [D] or a polyimide obtained by imidizing such a polyamic acid, for such a reason that it is relatively easily obtainable by using, as raw materials, a tetracarboxylic acid dianhydride represented by the following formula [B] and a diamine represented by the following formula [C].

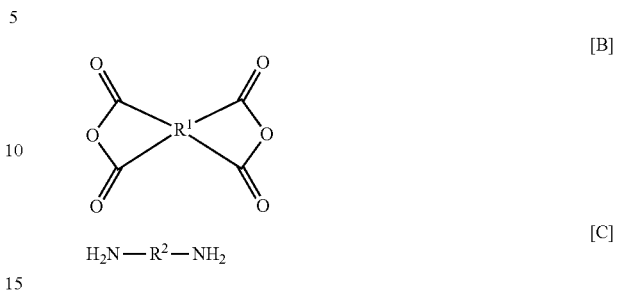

[B]

[C]

($R^1$ and $R^2$ have the same meanings as those defined in the formula [A].)

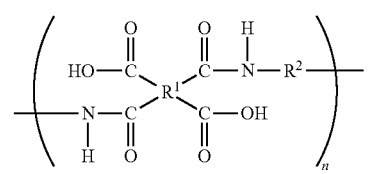

[D]

($R^1$ and $R^2$ have the same meanings as those defined in the formula [A].)

Further, by a usual synthetic method, it is also possible to introduce the $C_{1-8}$ alkyl group of $A^1$ and $A^2$ of the formula [A], and the $C_{1-5}$ alkyl group or the acetyl group of $A^3$ and $A^4$ of the formula [A] to the polymer of the formula [D] obtained as described above.

As a method for introducing the specific side chain structure (1) and the specific side chain structure (2) to the polyimide-type polymer, it is preferred to use a diamine having each specific side chain structure, as a part of the raw material.

Specifically, as the diamine having a specific side chain structure (1), it is preferred to use a diamine represented by the following formula [2a] (also referred to as a specific side chain type diamine (1)).

[2a]

In the formula [2a], Y is a structure represented by the above formula [2-1] or formula [2-2]. Here, definitions and preferred combinations of $Y^1, Y^2, Y^3, Y^4, Y^5, Y^6$ and n in the formula [2-1] are as described above, and definitions and preferred combinations of $Y^7$ and $Y^8$ in the formula [2-2] are as described above.

m is an integer of from 1 to 4. It is particularly preferably an integer of 1.

The specific side chain type diamine having a specific side chain structure represented by the formula [2-1] may, specifically, be diamine compounds of the formula [2-1] to formula [2-6], the formula [2-9] to formula [2-36], as described on pages 15 to 19 in WO2013/125595 (published on Aug. 29, 2013). Here, in the description of WO2013/

125595, $R_2$ in the formula [2-1] to formula [2-3] and $R_4$ in the formula [2-4] to formula [2-6] represent at least one selected from the group consisting of a $C_{1-18}$ alkyl group, a $C_{1-18}$ fluorinated alkyl group, a $C_{1-18}$ alkoxy group and a $C_{1-18}$ fluorinated alkoxy group. Further, $A_4$ in the formula [2-13] is a $C_{3-18}$ straight or branched alkyl group. In addition, $R_3$ in the formula [2-4] to formula [2-6] is at least one selected from the group consisting of —O—, —CH$_2$O—, —COO— and —OCO—.

Among them, a preferred diamine is a diamine compound of the formula [2-1] to formula [2-6], the formula [2-9] to formula [2-13] or the formula [2-22] to formula [2-31], as described in WO2013/125595.

Further, diamines represented by the following formula [2a-32] to formula [2a-36] are most preferred from the viewpoint of the vertical alignment properties of the liquid crystal and the optical properties of the liquid crystal display device, when used for a liquid crystal alignment film.

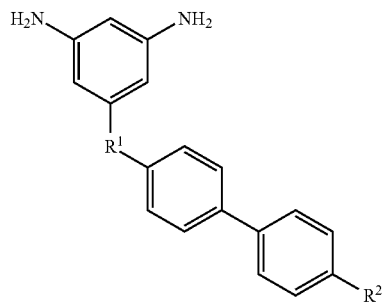
[2a-32]

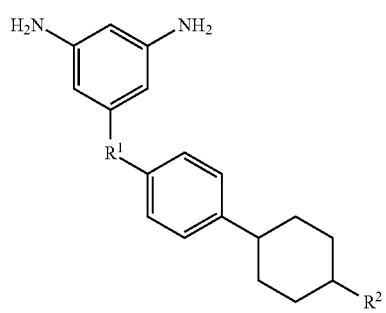
[2a-33]

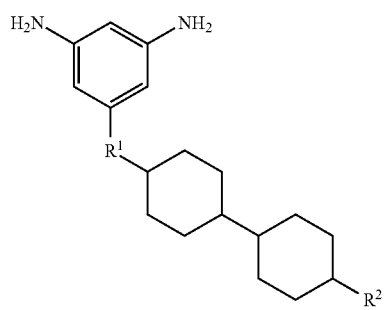
[2a-34]

($R^1$ is —CH$_2$O—, and $R^2$ is a $C_{3-12}$ alkyl group.)

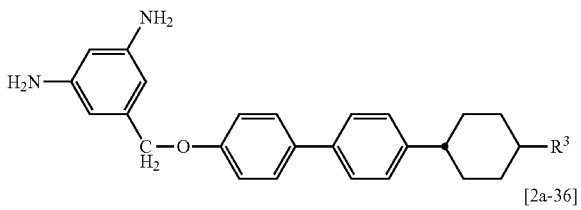
[2a-35]

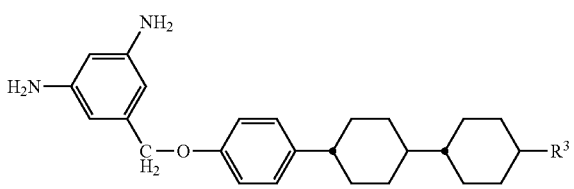
[2a-36]

($R^3$ is a $C_3$-12 alkyl group, and with respect to the cis-trans isomerism, 1,4-cyclohexylene is a trans isomer.)

The specific side chain type diamine having a specific side chain structure represented by the above formula [2-2] may, specifically, be diamine compounds of formula [DA1] to formula [DA11] as described on page 23 in WO2013/125595 (published on Aug. 29, 2013). In the description of WO2013/125595, $A_1$ in the formula [DA1] to formula [DA5] is a $C_{8-22}$ alkyl group or a $C_{6-18}$ fluorinated alkyl group.

The proportion of the specific side chain type diamine (1) to be used, is preferably from 10 to 80 mol %, more preferably from 20 to 70 mol % to the total diamine component, from the viewpoint of the vertical alignment properties of the liquid crystal when it is used for a liquid crystal alignment film, and from the viewpoint of adhesion between the liquid crystal layer and the liquid crystal alignment film in the liquid crystal display device.

Further, as the specific side chain type diamine (1), one type alone, or two or more types as mixed, may be used depending upon the solubility of the polyimide-type polymer in the solvent, and the vertical alignment property of the liquid crystal when it is used for a liquid crystal alignment film, and further depending upon the properties such as optical properties of the liquid crystal display device.

As the diamine having a specific side chain structure (2), a diamine represented by the following formula [3a] (also referred to as a specific side chain type diamine (2)) is preferred.

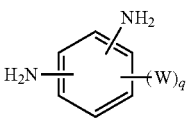
[3a]

In the formula [3a], W is a structure represented by the formula [3]. Definitions and preferred combinations of $W^1$, $W^2$, $W^3$ and $W^4$ in the formula [3] are as described above. m is an integer of from 1 to 4. It is particularly preferably an integer of 1.

As the specific side chain type diamine (2) having a specific side chain structure (2) represented by the formula [3], specifically, for example, the following formula [3a-1] to formula [3a-27] may be mentioned.

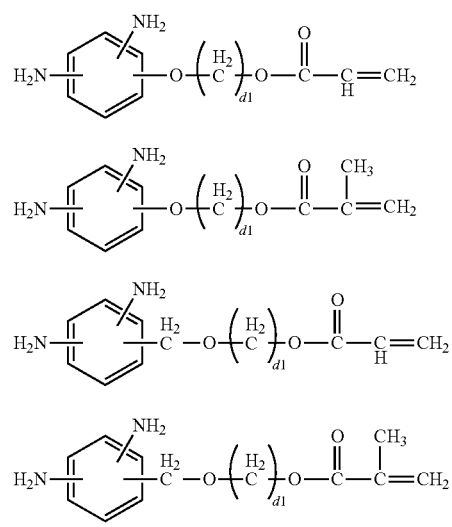
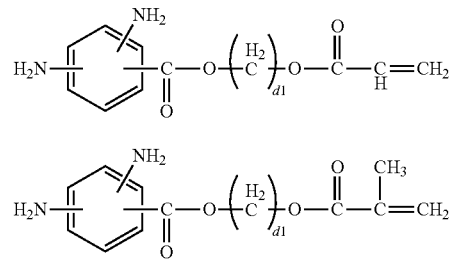
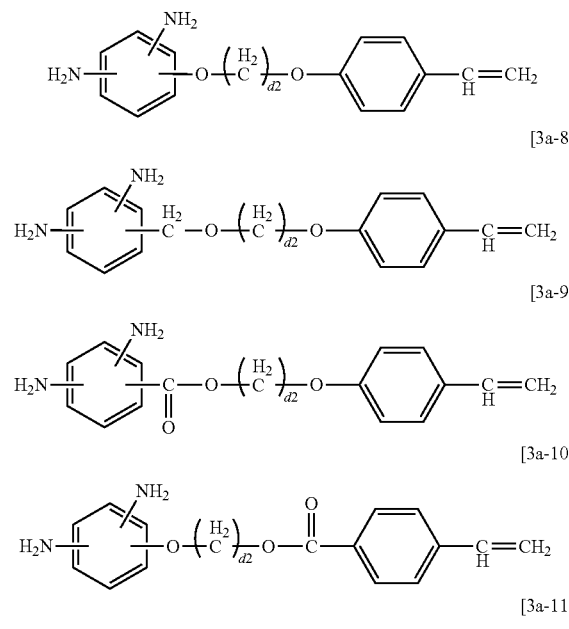
(d1 is an integer of from 2 to 10.)
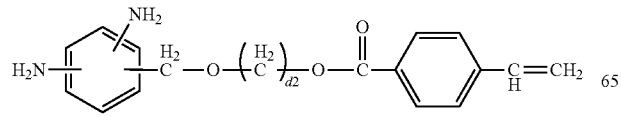
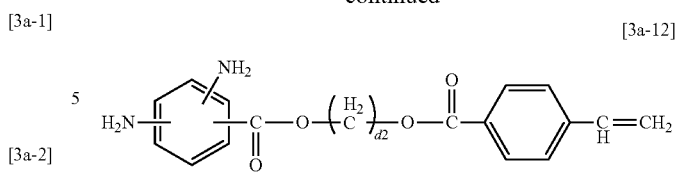
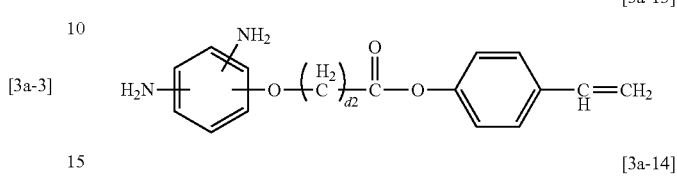
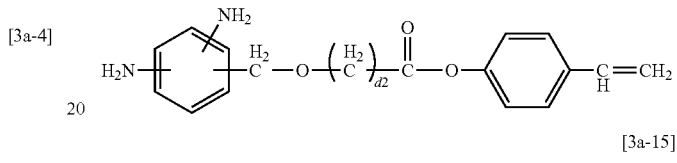
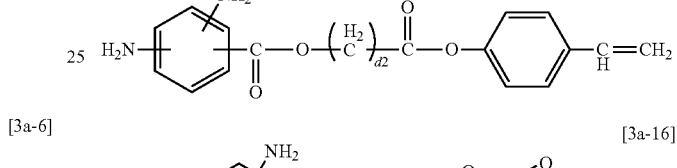
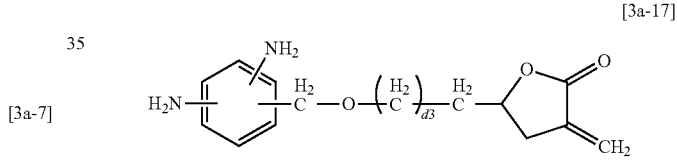

-continued

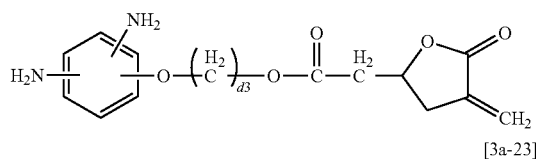

[3a-22]

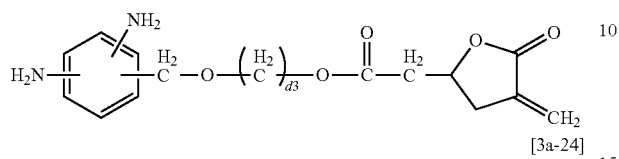

[3a-23]

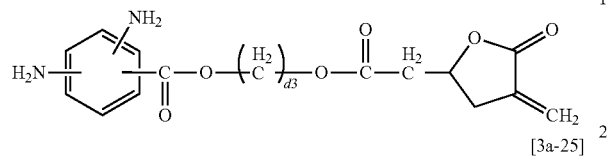

[3a-24]

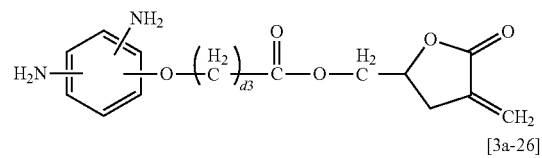

[3a-25]

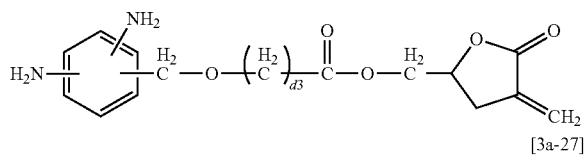

[3a-26]

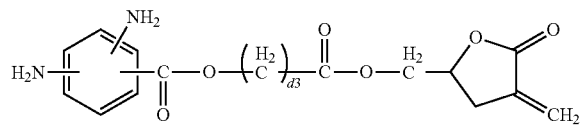

[3a-27]

(d3 is an integer of from 2 to 10.)

The proportion of the specific side chain type diamine (2) to be used, is preferably from 5 to 60 mol %, more preferably from 10 to 50 mol %, to the total diamine component, from the viewpoint of adhesion between the liquid crystal layer and the liquid crystal alignment film in the liquid crystal display device.

Further, as the specific side chain type diamine (2), one type alone, or two or more types as mixed, may be used depending upon the solubility of the polyimide-type polymer in the solvent, and the vertical alignment property of the liquid crystal when it is used for a liquid crystal alignment film, and further, depending on the properties such as optical properties of the liquid crystal display device.

As the diamine component for producing the polyimide type polymer, a diamine represented by the following formula [4a] (also referred to as a third diamine) is preferred.

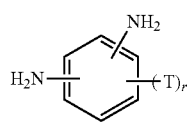

[4a]

T is at least one substituent selected from the group consisting of structures represented by the following for- mula [4-1] to formula [4-4]. r is an integer of from 1 to 4. It is particularly preferably an integer of 1.

$—(CH_2)_a—OH$ [4-1]

$—(CH_2)_b—COOH$ [4-2]

[4-3]

—$T^3$ [4-4]

In the formula [4-1], a is an integer of from 0 to 4. Among them, from the viewpoint of availability of raw material or easy synthesis, an integer of 0 or 1 is preferred. In the formula [4-2], b is an integer of from 0 to 4. Among them, from the viewpoint of availability of raw material or easy synthesis, an integer of 0 or 1 is preferred. In the formula [4-3], $T^1$ and $T^2$ are each independently a $C_{1-12}$ hydrocarbon group. In the formula [4-4], $T^3$ is a $C_{1-5}$ alkyl group.

Specific examples of the third diamine will be given below, but are not limited thereto. For example, 2,4-dimethyl-m-phenylenediamine, 2,6-diaminotoluene, 2,4-diaminophenol, 3,5-diaminophenol, 3,5-diaminobenzyl alcohol, 2,4-diaminobenzyl alcohol, 4,6-diaminoresorcinol, 2,4-diaminobenzoic acid, 2,5-diaminobenzoic acid or 3,5-diamino benzoic acid, and further, diamines of structures represented by the following formula [4a-1] to [4a-6] may be mentioned.

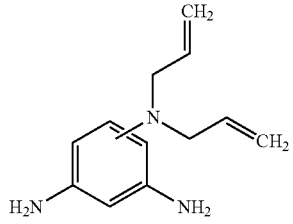

[4a-1]

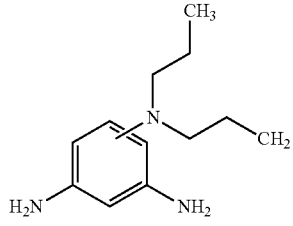

[4a-2]

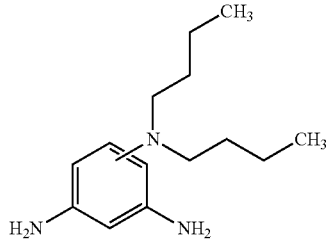

[4a-3]

-continued

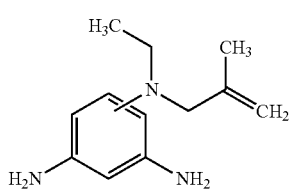
[4a-4]

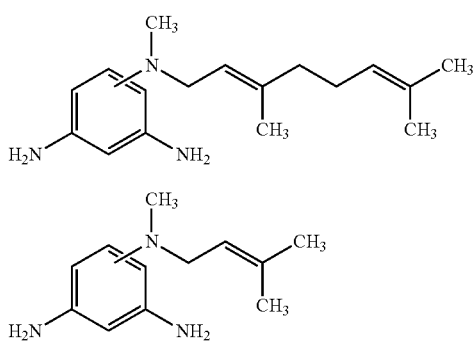
[4a-5]
[4a-6]

Among them, preferred is 2,4-diaminophenol, 3,5-diaminophenol, 3,5-diaminobenzyl alcohol, 2,4-diaminobenzyl alcohol, 4,6-diaminoresorcinol, 2,4-diaminobenzoic acid, 2,5-diaminobenzoic acid, 3,5-diaminobenzoic acid, or a diamine represented by the formula [4a-1], formula [4a-2] or formula [4a-3]. Particularly preferred from the viewpoint of the solubility of the polyimide-type polymer in the solvent or the optical properties of the liquid crystal display device, is 2,4-diaminophenol, 3,5-diaminophenol, 3,5-diaminobenzyl alcohol, 3,5-diaminobenzoic acid, or a diamine represented by the formula [4a-1] or formula [4a-2].

The proportion of the third diamine to be used is preferably from 1 to 50 mol %, more preferably from 1 to 40 mol %, particularly preferably from 5 to 40 mol %, to the total diamine component, from the viewpoint of adhesion between the liquid crystal layer and the liquid crystal alignment film in the liquid crystal display device.

As the third diamine, one type alone, or two or more types as mixed, may be used depending upon the solubility of the polyimide-type polymer in the solvent, the vertical alignment properties of the liquid crystal when it is used for a liquid crystal alignment film, and further, depending on the properties such as optical properties of the liquid crystal display device.

As a diamine component for producing the polyimide type polymer, it is also possible to use a diamine (also referred to as other diamine) other than the specific side chain type diamine (1), the specific side chain type diamine (2) and the third diamine, so long as it does not impair the effects of the present invention.

More specifically, other diamine compounds as described on pages 19 to 23 in WO2013/125595 (published on Aug. 29, 2013), diamine compounds of the formula [DA12], formula [DA15] to formula [DA20] as described on page 24 in the same publication and diamine compounds of the formula [DA26] to formula [DA28] as described on pages 25 to 26 in the same publication, may be mentioned. Further, other diamines may be used either singly or in combination in accordance with the respective properties.

As the tetracarboxylic acid component for producing the polyimide type polymer, preferred is a tetracarboxylic acid dianhydride represented by the following formula [5], or its tetracarboxylic acid derivative such as a tetracarboxylic acid, a tetracarboxylic acid dihalide, a tetracarboxylic acid dialkyl ester or a tetracarboxylic acid dialkyl ester dihalide (all collectively referred to as a specific tetracarboxylic acid component).

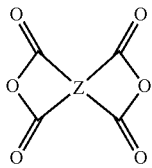
[5]

Z is at least one structure selected from the group consisting of the following formula [5a] to formula [5k].

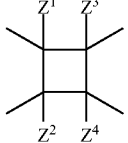
[5a]

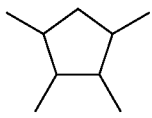
[5b]

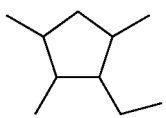
[5c]

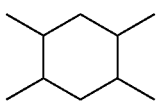
[5d]

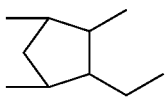
[5e]

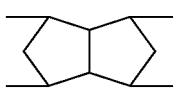
[5f]

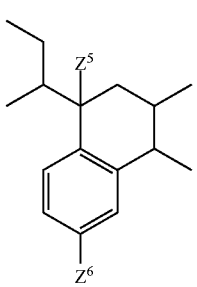
[5g]

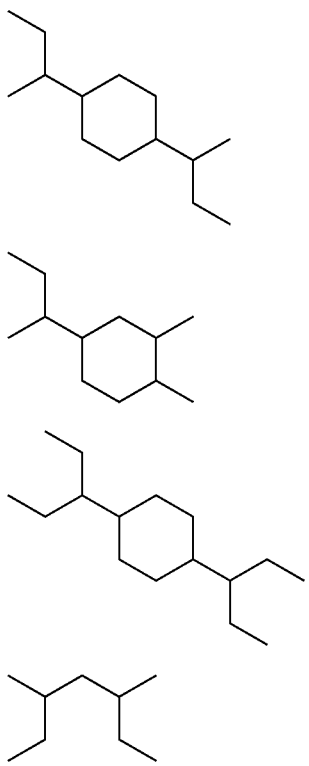

Z in the formula [5] is, from easy synthesis and the polymerization reaction efficiency at the time of producing the polymer, preferably the above formula [5a], formula [5c], formula [5d], formula [5e], formula [5f], formula [5g] or formula [5k]. More preferred from the viewpoint of optical properties of the liquid crystal display device, is the formula [5a], formula [5e], formula [5f], formula [5g] or formula [5k].

The proportion of the specific tetracarboxylic acid component to be used is preferably at least 1 mol % to the total tetracarboxylic acid component. More preferred is at least 5 mol %, and further preferred is at least 10 mol %. Among them, from the viewpoint of optical properties of the liquid crystal display device, particularly preferred is from 10 to 90 mol %.

Further, in the case of using a specific tetracarboxylic acid component of the above formula [5e], formula [5f], formula [5g] or formula [5k], by adjusting its proportion to be at least 20 mol % in the entire tetracarboxylic acid component, the desired effect is obtainable. More preferred is at least 30 mol %. Moreover, the entire tetracarboxylic acid component may be a tetracarboxylic acid component of the formula [5e], formula [5f], formula [5g] or formula [5k].

For the polyimide-type polymer, it is possible to use other tetracarboxylic acid component other than the specific tetracarboxylic acid component so long as it does not impair the effects of the present invention. As such other tetracarboxylic acid component, the following tetracarboxylic acid, tetracarboxylic dianhydride, dicarboxylic acid dihalide, dicarboxylic acid dialkyl ester or dialkyl ester dihalide may be mentioned.

Specifically, other tetracarboxylic acid component as described on pages 27 to 28 in WO2013/125595 (published on Aug. 29, 2013) may be mentioned. Further, the specific tetracarboxylic acid component and other tetracarboxylic acid component, may be used either singly or in combination depending on the respective properties.

The method for synthesizing a polyimide-type polymer is not particularly limited. Usually, it is obtained by reacting a diamine component and a tetracarboxylic acid component. Specifically, a method which is described on pages 29 to 30 in International Publication WO2013/125595 (published on Aug. 29, 2013) may be mentioned.

The reaction of the diamine component and the tetracarboxylic acid component is usually conducted in a solvent containing the diamine component and the tetracarboxylic acid component. The solvent to be used at that time is not particularly limited so long as the resulting polyimide precursor will be dissolved therein.

For example, N-methyl-2-pyrrolidone, N-ethyl-2-pyrrolidone or γ-butyrolactone, N,N-dimethylformamide, N,N-dimethylacetamide, dimethylsulfoxide, 1,3-dimethyl-imidazolidinone, etc. may be mentioned. Further, in a case where the solvent solubility of the polyimide precursor is high, it is possible to use methyl ethyl ketone, cyclohexanone, cyclopentanone, 4-hydroxy-4-methyl-2-pentanone or a solvent represented the following formula [D-1] to formula [D-3].

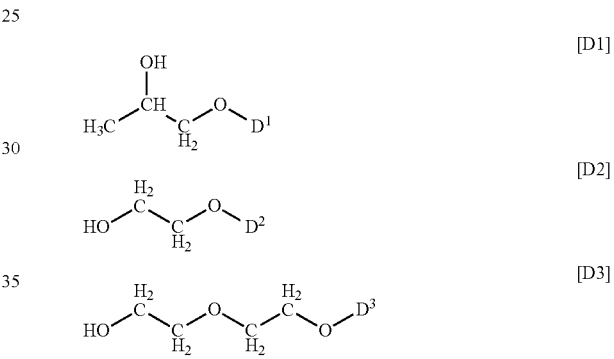

($D^1$ is a $C_{1-3}$ alkyl group, $D^2$ is a $C_{1-3}$ alkyl group, and $D^3$ is a $C_{1-4}$ alkyl group.)

They may be used alone or as mixed. Further, even a solvent which does not dissolve the polyimide precursor, may be used by mixing it with the above-described solvent to such an extent that the resulting polyimide precursor will not precipitate. Further, water in the organic solvent hinders the polymerization reaction, and further causes hydrolysis of the formed polyimide precursor, and therefore, it is preferred to use an organic solvent which has been dried by dehydration.

The molecular weight of the polyimide-type polymer is made to be, in consideration of the strength of the liquid crystal alignment film obtained therefrom, and the working efficiency and coating properties at the time of forming a liquid crystal alignment film, preferably from 5,000 to 1,000,000, more preferably from 10,000 to 150,000, by Mw (weight average molecular weight) as measured by the GPC (Gel Permeation Chromatography) method.

<Treating Agent for Liquid Crystal Alignment>

The liquid crystal alignment treating agent is a solution for forming a liquid crystal alignment film, and is a solution comprising the specific polymer having a specific side chain structure (1) and a specific side chain structure (2), and a solvent.

The specific polymer having a specific side chain structure (1) and a specific side chain structure (2), is preferably at least one polymer selected from the group consisting of an acrylic polymer, a methacrylic polymer, a novolak resin, a polyhydroxystyrene, a polyimide precursor, a polyimide, a polyamide, a polyester, cellulose and polysiloxane. More preferred is a polyimide precursor, a polyimide or polysiloxane, and most preferred is a polyimide precursor or a polyimide. Further, as the specific polymer, one of these polymers, or two or more of them, may be used.

All of polymer components in the liquid crystal alignment treating agent, may all be the specific polymers, or polymer(s) other than the specific polymers may be mixed. At that time, the content of other polymer(s) is from 0.5 to 15 parts by mass, preferably from 1 to 10 parts by mass, to 100 parts by mass of the specific polymer. Such other polymer(s) may be the above-mentioned polymer that does not have a specific side chain structure (1) and a specific side chain structure (2).

The content of the solvent in the liquid crystal alignment treating agent may be suitably selected depending on the coating method of the liquid crystal alignment treating agent or with a view to obtaining a desired film thickness. Particularly, from the viewpoint of forming a uniform liquid crystal alignment film by coating, the content of the solvent in the liquid crystal alignment treating agent is preferably from 50 to 99.9 mass %, more preferably from 60 to 99 mass %. Particularly preferred is from 65 to 99 mass %.

The solvent to be used in the liquid crystal alignment treating agent is not particularly limited so long as it is a solvent for dissolving the specific polymer. Particularly, in a case where the specific polymer is a polyimide precursor, a polyimide, a polyamide or a polyester, or in a case where the solubility of an acrylic polymer, a methacrylic polymer, a novolak resin, a polyhydroxystyrene, cellulose or polysiloxane in the solvent is low, it is preferred to use a solvent (also referred to as a solvent A) as shown below.

For example, N,N-dimethylformamide, N,N-dimethylacetamide, N-methyl-2-pyrrolidone, N-ethyl-2-pyrrolidone, dimethyl sulfoxide, γ-butyrolactone, 1,3-dimethyl-imidazolidinone, methyl ethyl ketone, cyclohexanone, cyclopentanone or 4-hydroxy-4-methyl-2-pentanone. Among them, it is preferred to use N-methyl-2-pyrrolidone, N-ethyl-2-pyrrolidone or γ-butyrolactone. Further, they may be used alone, or may be used as mixed.

In a case where the specific polymer is an acrylic polymer, a methacrylic polymer, a novolak resin, a polyhydroxystyrene, cellulose or polysiloxane, or furthermore, in a case where the specific polymer is a polyimide precursor, a polyimide, a polyamide or a polyester, and the solubility of such a specific polymer in a solvent is high, it is possible to use a solvent (also referred to as a solvent B) as shown below. Specific examples of the solvent B may be poor solvents as described on pages 35 to 37 in WO2013/125595 (published on Aug. 29, 2013) as specific examples of solvent B.

Among them, it is preferred to use 1-hexanol, cyclohexanol, 1,2-ethanediol, 1,2-propanediol, propylene glycol monobutyl ether, ethylene glycol monobutyl ether, dipropylene glycol dimethyl ether, cyclohexanone, cyclopentanone, or a solvent represented by the above formula [D1] to formula [D3].

Further, at the time of using such a solvent B, in order to improve the coating properties of the liquid crystal alignment treating agent, it is preferred to use the solvent A such as N-methyl-2-pyrrolidone, N-ethyl-2-pyrrolidone or γ-butyrolactone in combination. More preferred is a combined use of γ-butyrolactone.

Such a solvent B is capable of improving the coating property and surface smoothness of the liquid crystal alignment film at the time of applying the liquid crystal alignment treating agent, and therefore, in a case where a polyimide precursor, a polyimide, a polyamide or a polyester is used as the specific polymer, it is preferred to use the solvent B in combination with the solvent A. At that time, the solvent B is preferably from 1 to 99 mass % in the total solvent contained in the liquid crystal alignment treating agent. Further, preferred is from 10 to 99 mass %. More preferred is from 20 to 95 mass %.

To the liquid crystal alignment treating agent of the present invention, it is preferred to incorporate at least one generating agent (also called a specific generating agent) selected from the group consisting of a photo-radical generating agent, a photo-acid generating agent and a photo-base generating agent.

The photo-radical generating agent is not particularly limited so long as it generates radicals by ultraviolet rays. It may, for example, be an organic peroxide, such as tert-butylperoxy-iso-butarate, 2,5-dimethyl-2,5-bis(benzoyldioxy)hexane, 1,4-bis[α-(tert-butyldioxy)-iso-propoxy]benzene, di-tert-butyl peroxide, 2,5-dimethyl-2,5-bis(tert-butyloxy)hexene hydroperoxide, α-(iso-propylphenyl)-iso-propyl hydroperoxide, 2,5-dimethylhexane, tert-butyl hydroperoxide, 1,1-bis(tert-butyldioxy)-3,3,5-trimethylcyclohexane, butyl-4,4-bis(tert-butyldioxy)valerate, cyclohexanone peroxide, 2,2',5,5'-tetra(tert-butylperoxycarbonyl) benzophenone, 3,3',4,4'-tetra(tert-butylperoxycarbonyl) benzophenone, 3,3',4,4'-tetra(tert-amylperoxycarbonyl) benzophenone, 3,3',4,4'-tetra(tert-hexylperoxycarbonyl) benzophenone, 3,3'-bis(tert-butylperoxycarbonyl)-4,4'-dicarboxybenzophenone, tert-butyl peroxybenzoate, di-tert-butyl diperoxyisophthalate, etc.; a quinone, such as 9,10-anthraquinone, 1-chloroanthraquinone, 2-chloroanthraquinone, octamethyl anthraquinone, 1,2-benzanthraquinone, etc., a benzoin derivative, such as benzoin methyl, benzoin ethyl ether, α-methyl benzoin, α-phenyl benzoin, etc.

The photo-acid generating agent and the photo-base generating agent are not particularly limited so long as they generate an acid and a base, respectively, by ultraviolet rays. For example, a triazine type compound, an acetophenone derivative compound, a disulfone type compound, a diazomethane type compound, a sulfonic acid derivative compound, a diaryliodonium salt, a triarylsulfonium salt, a triarylphosphonium salt, an iron arene complex, etc, may be mentioned. More specifically, for example, diphenyliodonium chloride, diphenyliodonium trifluoromethanesulfonate, diphenyliodonium mesylate, diphenyliodonium tosylate, diphenyliodonium bromide, diphenyliodonium tetrafluoroborate, diphenyliodonium hexafluoroantimonate, diphenyliodonium hexafluoroarsenate, bis(p-tert-butylphenyl)iodonium hexafluorophosphate, bis(p-tert-butylphenyl) iodonium mesylate, bis(p-tert-butylphenyl)iodonium tosylate, bis(p-tert-butylphenyl)iodonium trifluoromethanesulfonate, bis(p-tert-butylphenyl)iodonium tetrafluoroborate, bis(p-tert-butylphenyl)iodonium chloride, bis(p-chlorophenyl)iodonium chloride, bis(p-chlorophenyl) iodonium tetrafluoroborate, triphenylsulfonium chloride, triphenylsulfonium bromide, tri(p-methoxyphenyl)sulfonium tetrafluoroborate, tri(p-methoxyphenyl)sulfonium hexafluorophosphonate, tri(p-ethoxyphenyl)sulfonium tetrafluoroborate, triphenylphosphonium chloride, triphenylphosphonium bromide, tri(p-methoxyphenyl)phosphonium tetrafluoroborate, tri(p-methoxyphenyl)phosphonium hexafluorophosphonate, tri(p-ethoxyphenyl)phosphonium tetrafluoroborate, bis[[(2-nitrobenzyl)oxy]carbonylhexane-1,6-diamine], nitrobenzylcyclohexyl carbamate, di(methoxybenzyl)hexamethylene dicarbamate, bis[[(2-nitrobenzypoxy]carbonyl-hexane-1,6-diamine], nitrobenzylcyclohexyl carbamate, di(methoxybenzyl)hexamethylene dicarbamate, etc., may be mentioned.

To the liquid crystal alignment treating agent, it is preferred to incorporate a compound (also referred to as a specific adhesion compound) having at least one structure selected from the group consisting of structures represented by the following formula [b-1] to formula [b-8] in order to enhance the adhesion between the liquid crystal layer and the liquid crystal alignment film.

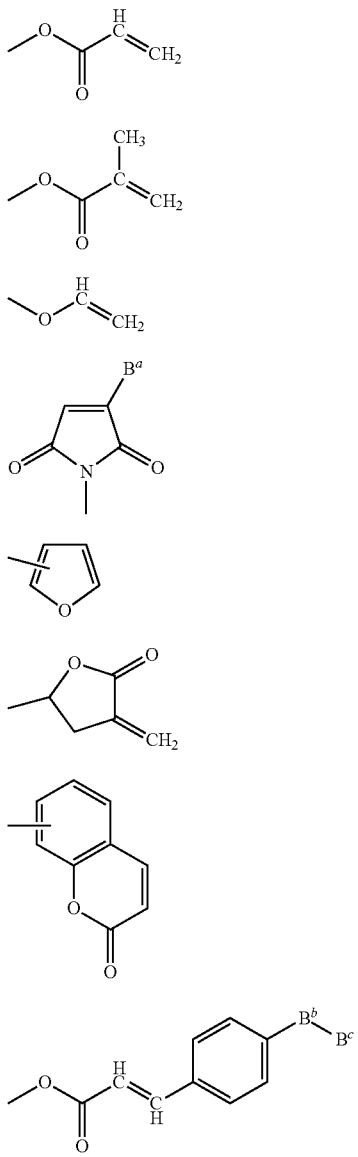

More specifically as the specific adhesion compound, a compound represented by the following formula [7A] is preferred.

[7A]

In the formula [7A], $M^1$ is at least one selected from the group consisting of the following formula [a-1] to [a-7]. Among them, from the viewpoint of easy production, the formula [a-1], formula [a-2], formula [a-3], formula [a-5] or formula [a-6] is preferred. More preferred is the formula [a-1], formula [a-3], formula [a-5] or formula [a-6].

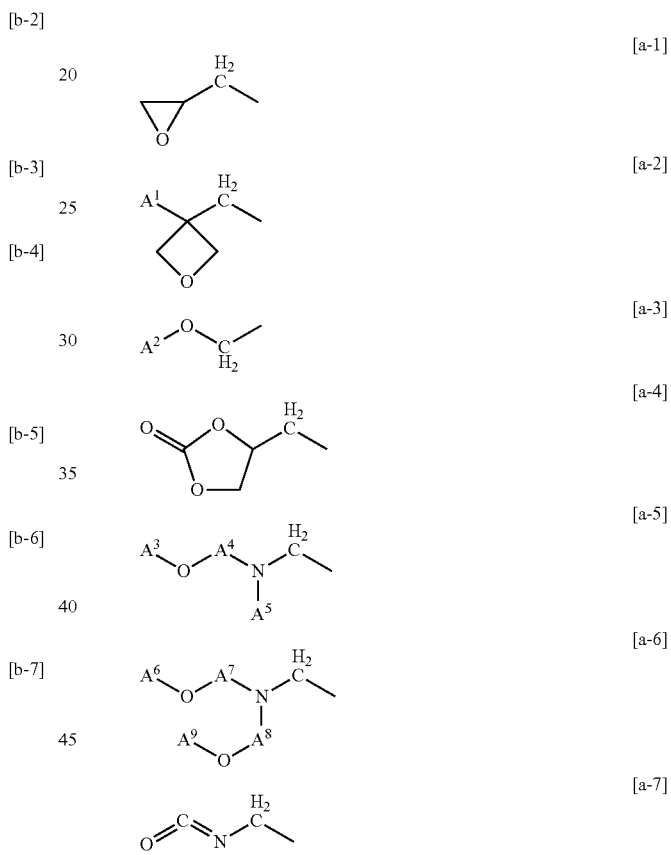

In the formula [b-4], $B^a$ is a hydrogen atom or a benzene ring. Among them, a hydrogen atom is preferred. In the formula [b-8], $B^b$ is at least one cyclic group selected from the group consisting of a benzene ring, a cyclohexane ring and a heterocyclic ring. $B^c$ is at least one selected from the group consisting of a $C_{1-18}$ alkyl group, a $C_{1-18}$ fluorinated alkyl group, a $C_{1-18}$ alkoxy group and a $C_{1-18}$ fluorinated alkoxy group. Among them, a $C_{1-12}$ alkyl group, or a $C_{1-12}$ alkoxy group is preferred.

$A^1$ is a hydrogen atom or a $C_{1-5}$ alkyl group. Among them, from the viewpoint of easy production, a hydrogen atom or a $C_{1-2}$ alkyl group is preferred. More preferred is a hydrogen atom or a methyl group.

$A^2$ is a hydrogen atom or a $C_{1-3}$ alkyl group. Among them, from the viewpoint of easy production, a hydrogen atom or a $C_{1-2}$ alkyl group is preferred. More preferred is a hydrogen atom or a methyl group.

$A^3$, $A^5$, $A^6$ and $A^9$ are each independently a hydrogen atom or a $C_{1-3}$ alkyl group. Among them, from the viewpoint of easy production, a hydrogen atom or a $C_{1-2}$ alkyl group is preferred. More preferred is a hydrogen atom or a methyl group.

$A^4$, $A^7$ and $A^8$ are each independently a $C_{1-3}$ alkylene group. Among them, from the viewpoint of easy production, a $C_{1-2}$ alkylene group is preferred.

In the formula [7A], $M^2$ is at least one bond group selected from the group consisting of a single bond, —$CH_2$—, —O—, —NH—, —N($CH_3$)—, —CONH—, —NHCO—, —$CH_2$O—, —O$CH_2$—, —COO—, —OCO—, —CON($CH_3$)— and —N($CH_3$)CO—. Among them, from the viewpoint of easy production, preferred is a single bond, —$CH_2$—, —O—, —NH—, —CONH—, —NHCO—, —$CH_2$O—, —O$CH_2$—, —COO—, —OCO—, —CON($CH_3$)— or —N($CH_3$)CO—. More preferred is a single bond, —$CH_2$—, —O—, —NH—, —CONH—, —$CH_2$O—, —O$CH_2$—, —COO— or —OCO—. Particularly preferred is a single bond, —O—, —CONH—, —O$CH_2$—, —COO— or —OCO—.

In the formula [7A], $M^3$ is at least one selected from the group consisting of a $C_{1-20}$ alkylene group, —($CH_2$—$CH_2$—O)$_p$— (p is an integer of from 1 to 10), —($CH_2$—O—)$_q$— (q is an integer of from 1 to 10), and a $C_{6-20}$ organic group having a benzene ring or a cyclohexane ring. At that time, any —$CH_2$— group of the above alkylene group may be replaced by —COO—, —OCO—, —CONH—, NHCO—, —CO—, —S—, —$SO_2$—, —$CF_2$—, —C($CF_3$)$_2$—, —Si($CH_3$)$_2$—, —OSi($CH_3$)$_2$— or —Si($CH_3$)$_2$O—, and a hydrogen atom bonded to any carbon atom may be replaced by a hydroxy group (OH group), a carboxy group (COOH group) or a halogen atom. Among them, from the viewpoint of easy production, a $C_{1-20}$ alkylene group, —($CH_2$—$CH_2$—O)$_p$—, —($CH_2$—O—)$_q$— or the following formula [c-1] to formula [c-5] is preferred. More preferred is a $C_{1-15}$ alkylene group, —($CH_2$—$CH_2$—O)$_p$—, —($CH_2$—O—)$_q$—, the following formula [c-1], formula [c-3], formula [c-4] or formula [c-5]. Particularly preferred is a $C_1$-15 alkylene group, —($CH_2$—$CH_2$—O)$_p$—, the formula [c-1], formula [c-4] or formula [c-5].

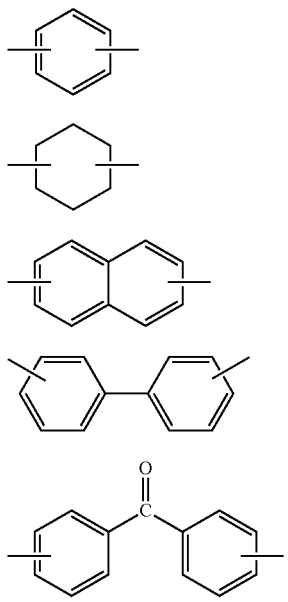

In the formula [7A], $M^4$ is at least one bond group selected from the group consisting of a single bond, —$CH_2$—, —O$CH_2$— and —O—$CH_2$—$CH_2$—. Among them, from the viewpoint of easy production, a single bond, or a structure represented by —$CH_2$— or —O$CH_2$— is preferred.

In the formula [7A], $M^5$ is at least one structure selected from the group consisting of structures represented by the above formula [b-1] to [b-8]. Among them, from the viewpoint of easy production, preferred is the formula [b-1], formula [b-2] or formula [b-6]. More preferred is the formula [b-1] or formula [b-2].

In the formula [7A], n is an integer of from 1 to 3. Among them, from the viewpoint of easy production, preferred is an integer of 1 or 2. More preferred is an integer of 1.

In the formula [7A], m is an integer of from 1 to 3. Among them, from the viewpoint of easy production, preferred is an integer of 1 or 2.

As the specific adhesion compound, preferred is at least one compound selected from the group consisting of compounds represented by the following formula [72-1] to formula [7a-5].

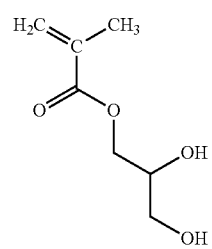

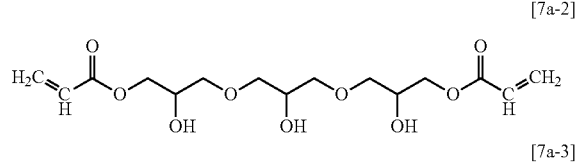

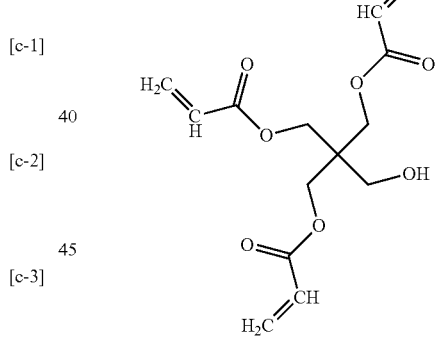

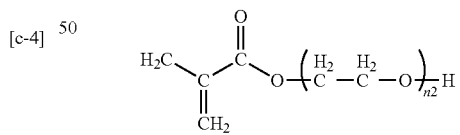

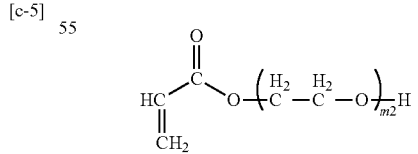

(n2 is an integer of from 1 to 10, and m2 is an integer of from 1 to 10.)

Further, as the specific adhesion compound, the following ones may also be used.

For example, a compound having three polymerizable unsaturated groups in the molecule, such as trimethylolpropane tri(meth)acrylate, pentaerythritol tri(meth)acrylate, dipentaerythritol penta(meth)acrylate, tri(meth)acryloyloxyethoxy trimethylolpropane or glycerol polyglycidyl ether poly(meth)acrylate; a compound having two polymerizable unsaturated groups in the molecule, such as ethylene glycol di(meth)acrylate, diethylene glycol di(meth)acrylate, tetraethylene glycol di(meth)acrylate, polyethylene glycol di(meth)acrylate, propylene glycol di(meth)acrylate, polypropylene glycol di(meth)acrylate, butylene glycol di(meth)acrylate, neopentyl glycol di(meth)acrylate, ethylene oxide bisphenol A type di(meth)acrylate, propylene oxide bisphenol type di(meth)acrylate, 1,6-hexanediol di(meth)acrylate, glycerin di(meth)acrylate, pentaerythritol di(meth)acrylate, ethylene glycol diglycidyl ether di(meth)acrylate, diethylene glycol diglycidyl ether di(meth)acrylate, phthalic acid diglycidyl ester di(meth)acrylate, hydroxypivalic acid neopentyl glycol di(meth)acrylate, etc.; a compound having one polymerizable unsaturated group in the molecule, such as 2-hydroxyethyl (meth)acrylate, 2-hydroxypropyl (meth)acrylate, 2-hydroxybutyl (meth)acrylate, 2-phenoxy-2-hydroxypropyl (meth)acrylate, 2-(meth)acryloyloxy-2-hydroxypropyl phthalate, 3-chloro-2-hydroxypropyl (meth)acrylate, glycerin mono(meth)acrylate, 2-(meth)acryloyloxyethyl phosphoric acid ester, N-methylol (meth)acrylamide, etc., may be mentioned.

The content of the specific adhesion compound in the liquid crystal alignment treating agent is preferably from 0.1 to 150 parts by mass to 100 parts by mass of all polymer components. In order to let the crosslinking reaction proceed to provide the desired effects, it is more preferably from 0.1 to 100 parts by mass, most preferably from 1 to 50 parts by mass, to 100 parts by mass of all polymer components. As the specific adhesion compound, one type may be used alone, or two or more types may be used as mixed.

The liquid crystal alignment treating agent of the present invention preferably contains a compound having epoxy groups, isocyanate groups, oxetane groups, or cyclocarbonate groups, or a compound having at least one type of groups selected from the group consisting of hydroxy groups, hydroxyalkyl groups and lower alkoxyalkyl groups (collectively referred to as a specific crosslinkable compound.). At that time, such groups should be present at least two in the compound.

As examples of the crosslinkable compound having epoxy groups or isocyanate groups, in particular, crosslinkable compounds having epoxy groups or isocyanate groups as described on pages 37 to 38 in WO2013/125595 (published on Aug. 29, 2013) may be mentioned.

As the crosslinkable compound having oxetane groups, specifically, crosslinkable compounds represented by the formula [4a] to formula [4k] as published on pages 58 to 59 in WO2011/132751 may be mentioned.

As the crosslinkable compound having cyclocarbonate groups, specifically, crosslinkable compounds represented by the formula [5-1] to formula [5-42] as published on pages 76 to 82 in WO2012/014898 may be mentioned.

As the crosslinkable compound having at least one type of groups selected from the group consisting of hydroxy groups, hydroxyalkyl groups and lower alkoxyalkyl groups, specifically, melamine derivatives or benzoguanamine derivatives as described on pages 39 to 40 in WO2013/125595 (published on Aug. 29, 2013), and crosslinkable compounds represented by the formula [6-1] to formula [6-48] as published on pages 62 to 66 in WO2011/132751 (published on Oct. 27, 2011) may be mentioned.

The content of the specific crosslinkable compound in the liquid crystal alignment treating agent is preferably 0.1 to 100 parts by mass to 100 parts by mass of all polymer components. In order to let the crosslinking reaction proceed thereby to provide the desired effects, it is more preferably from 0.1 to 50 parts by mass, most preferably from 1 to 30 parts by mass, to 100 parts by mass of all polymer components.

To the liquid crystal alignment treating agent, in order to promote charge transfer in the liquid crystal alignment film thereby to facilitate electrostatic discharge of the device, a nitrogen-containing heterocyclic amine compound represented by the formula [M1] to formula [M156] as published on pages 69 to 73 in WO2011/132751 (published on Oct. 27, 2011), may be added. The amine compound may be added directly to the liquid crystal alignment treating agent, but, it is preferably added after being formed into its solution with a concentration of from 0.1 to 10 mass %, preferably from 1 to 7 mass %, by a suitable solvent. This solvent is not particularly limited so long as it is an organic solvent capable of dissolving the specific polymer.

Further, for the liquid crystal alignment treating agent, it is possible to use a compound to improve uniformity of the film thickness or surface smoothness of the liquid crystal alignment film when the liquid crystal alignment treating agent is applied, so long as it does not impair the effects of the present invention. Furthermore, it is also possible to use such a compound that improves adhesion between the liquid crystal alignment film and the substrate.

As the compound to improve uniformity of the film thickness or surface smoothness of the liquid crystal alignment film, a fluorinated surfactant, a silicone-type surfactant, a nonionic surfactant, etc. may be mentioned. Specifically, surfactants as described on pates 42 to 43 in WO2013/125595 (published on Aug. 29, 2013) may be mentioned.

The amount of the surfactant to be used is preferably from 0.01 to 2 parts by mass, more preferably from 0.01 to 1 part by mass, to 100 parts by mass of all polymer components contained in the liquid crystal alignment treating agent.

As specific examples of the compound to improve adhesion between the liquid crystal alignment film and the substrate, a functional silane-containing compound and an epoxy group-containing compound may be mentioned. Specifically, compounds as described on pages 43 to 44 in WO2013/125595 (published on Aug. 29, 2013) may be mentioned.

The proportion of the compound to improve the adhesion to the substrate is preferably from 0.1 to 30 parts by mass, more preferably from 1 to 20 parts by mass, to 100 parts by mass of all polymer components contained in the liquid crystal alignment treating agent. If it is less than 0.1 part by mass, the effect of improving the adhesion cannot be expected, and if it is larger than 30 parts by mass, the storage stability of the liquid crystal alignment treating agent may be deteriorated.

To the liquid crystal alignment treating agent, as a compound other than those described above, a dielectric or conductive material for the purpose of altering the electrical characteristics such as the dielectric constant and conductivity of the liquid crystal alignment film may be added.

<Methods for Producing Liquid Crystal Alignment Film and Liquid Crystal Display Device>

The substrate to be used in a liquid crystal display device of the present invention is not particularly limited so long as it is a highly transparent substrate, and it is possible to use, in addition to a glass substrate, a plastic substrate such as an acrylic substrate, a polycarbonate substrate, or a PET (polyethylene terephthalate) substrate, and further, their films. In a case where the liquid crystal display device is to be used as a reverse device for e.g. a dimming window, the substrate is preferably a plastic substrate or film.

Further, from the viewpoint of simplification of the process, it is preferred to employ a substrate having ITO (Indium Tin Oxide) electrodes, IZO (Indium Zinc Oxide) electrodes, IGZO (Indium Gallium Zinc Oxide) electrodes, an organic conductive film, etc. for liquid crystal driving, formed thereon. In the case of producing a reflection type reverse device, it is possible to use, as only one of the pair of substrates, a substrate having a metal or dielectric multilayer film such as a silicon wafer or aluminum formed thereon.

In the liquid crystal display device of the present invention, at least one of the pair of substrates has a liquid crystal alignment film to align liquid crystal molecules vertically. The liquid crystal alignment film can be obtained by applying a liquid crystal alignment treating agent onto the substrate and firing it, followed by alignment treatment by e.g. rubbing treatment or light irradiation. However, in the case of a liquid crystal alignment film in the present invention, it can be used as a liquid crystal alignment film without such alignment treatment.

The method for applying the liquid crystal alignment treating agent is not particularly limited, but, from an industrial viewpoint, may, for example, be screen printing, offset printing, flexo printing, an ink jet method, a dipping method, a roll coater method, a slit coating method, a spinner method, a spray method, etc., and the method may suitably be selected for use depending on the type of the substrate, the desired thickness of the liquid crystal alignment film, etc.

After applying the liquid crystal alignment treating agent on the substrate, the solvent is evaporated by a heating means such a hot plate, a heat circulating oven or an IR (infrared) oven, at a temperature of from 30 to 300° C., preferably from 30 to 250° C. depending upon the type of the substrate or the solvent used in the liquid crystal alignment treating agent. Particularly, in a case where a plastic substrate is used as the substrate, it is preferred to conduct the treatment at a temperature of from 30 to 150° C.

With respect to the thickness of the liquid crystal alignment film after firing, if it is too thick, such becomes disadvantageous from the aspect of power consumption of the liquid crystal display device, and if it is too thin, the reliability of the device is likely to be low. Therefore, it is preferably from 5 to 500 nm, more preferably from 10 to 300 nm, particularly preferably from 10 to 250 nm.

In the liquid crystal composition to be used for the liquid crystal display device of the present invention, a spacer may be introduced for controlling the electrode gap (also referred to as the gap) of the liquid crystal display device.

The injection method of the liquid crystal composition is not particularly limited, and, for example, the following method may be mentioned. That is, in a case where a glass substrate is to be used as the substrate, a method may be mentioned in which a pair of substrates having a liquid crystal alignment film formed thereon are prepared, then to the four sides of one substrate, a sealing agent is applied except for a portion thereof, thereafter, the other substrate is bonded so that the liquid crystal alignment film side be inside, to prepare an empty cell, and then, from the portion where the sealing agent is not applied, the liquid crystal composition is vacuum-injected to obtain a liquid crystal composition injected cell. Further, in a case where a plastic substrate or film is to be used as the substrate, a method may be mentioned in which a pair of substrates having a liquid crystal alignment film formed thereon are prepared, then on one substrate, the liquid crystal composition is dropped by an ODF (One Drop Filling) method or an inkjet method, and thereafter, the other substrate is bonded to obtain a liquid crystal composition injected cell. In the present invention, adhesion between the liquid crystal layer and the liquid crystal alignment film, is high, and therefore, the sealing agent may not be applied to the four sides of the substrate.

The gap of the liquid crystal display device can be controlled by e.g. the above-mentioned spacer. The method may be a method of introducing a spacer of a desired size in the liquid crystal composition, as mentioned above, or a method of using a substrate having a column spacer of a desired size. Otherwise, in a case where by using plastic or film substrates as the substrates, bonding of the substrates is carried out by lamination, the gap may be controlled without introducing a spacer.

The size of the gap is preferably from 1 to 100 μm, more preferably from 2 to 50 μm, particularly preferably from 5 to 20 μm. If the gap is too small, the contrast of the liquid crystal display device decreases, and if it is too large, the driving voltage of the device becomes high.

The liquid crystal display device of the present invention is obtainable by curing the liquid crystal composition by irradiation with ultraviolet rays, to form a liquid crystal layer of a cured product composite of the liquid crystal and the polymerizable compound. Curing the liquid crystal composition is conducted by irradiating the above-mentioned liquid crystal composition injected cell with ultraviolet rays. The light source of the ultraviolet irradiation apparatus to be used at that time may, for example, be a metal halide lamp or a high pressure mercury lamp. Further, the wavelength of ultraviolet rays is preferably from 250 to 400 nm, more preferably from 310 to 370 nm. Further, after the irradiation with ultraviolet rays, heat treatment may be conducted. The temperature at that time is from 40 to 120° C., preferably from 40 to 80° C.

EXAMPLES

Hereinafter, the present invention will be described in more detail with reference to Examples, but the present invention is not limited to such Examples. Abbreviations are as follows.

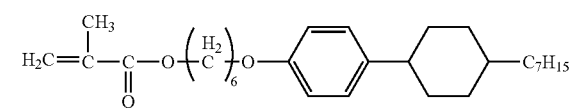

S1

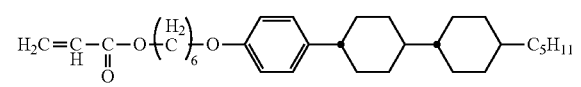

S2

L1: MLC-6608 (manufactured by Merck Ltd.)

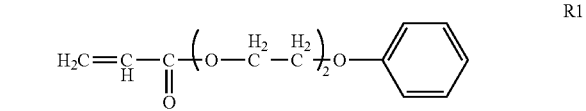

R1

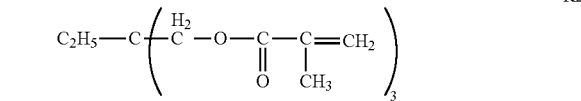

R2

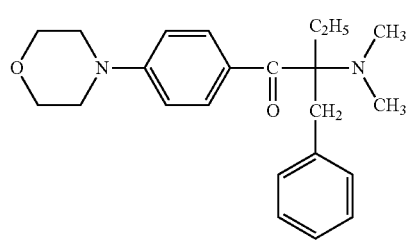

P1

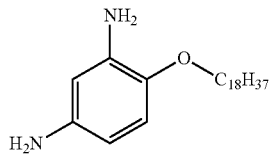

A5

(Specific Side-Chain Diamine (1))

A1: 1,3-Diamino-4-[4-(trans-4-n-heptylcyclohexyl)phenoxy]benzene

A2: 1,3-Diamino-4-[4-(trans-4-n-heptylcyclohexyl)phenoxymethyl]benzene

A3: 1,3-Diamino-4-{4-[trans-4-(trans-4-n-pentylcyclohexyl)cyclohexyl]Phenoxyl}benzene A4: A diamine represented by the following formula [A4]

A5: 1,3-Diamino-4-octadecyloxybenzene (Specific Side-Chain Diamine (2))

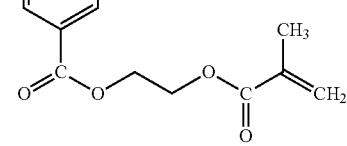

B1

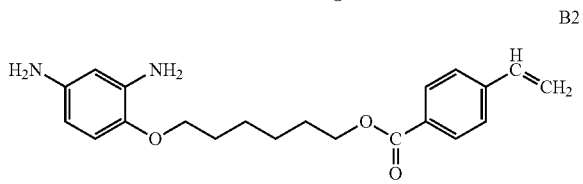

B2

(Third Diamine)

C1: 3,5-Diaminobenzoic acid

C2: A diamine represented by the following formula [C2]

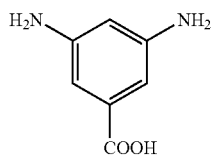

A1

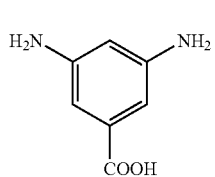

C1

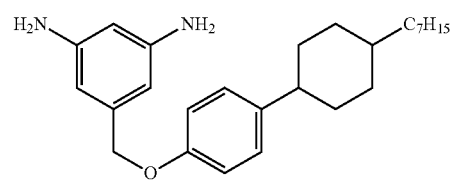

A2

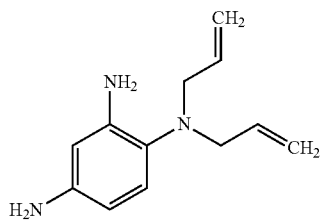

C2

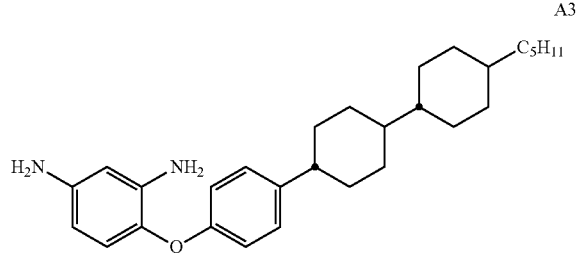

A3

(Other Diamine)

D1: m-Phenylenediamine

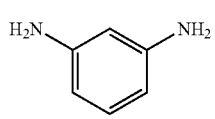

D1

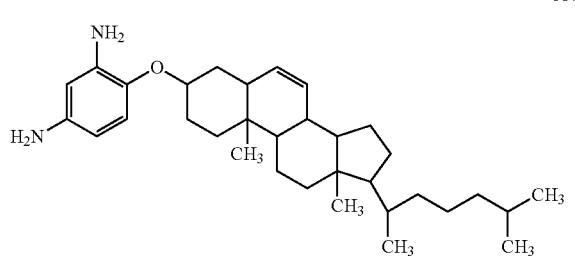

A4

(Tetracarboxylic Dianhydride)

E1: 1,2,3,4-Cyclobutanetetracarboxylic acid dianhydride

E2: Bicyclo[3,3,0]octane-2,4,6,8-tetracarboxylic acid dianhydride

E3: A tetracarboxylic acid dianhydride represented by the following formula [E3]

E4: A tetracarboxylic acid dianhydride represented by the following formula [E4]

E5: A tetracarboxylic acid dianhydride represented by the following formula [E5]

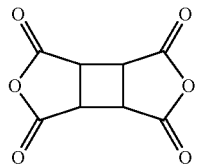
E1

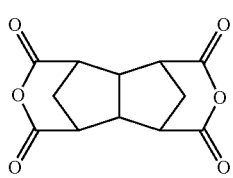
E2

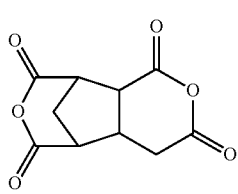
E3

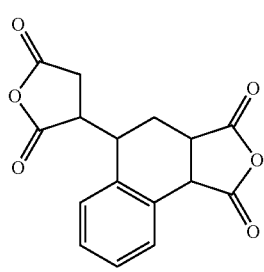
E4

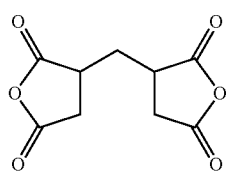
E5

<Specific Generating Agent>

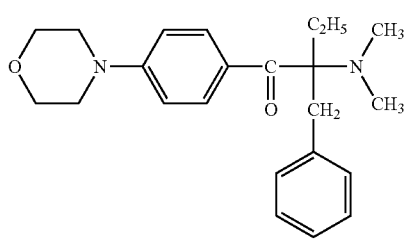
N1

<Specific Adhesion Compound>

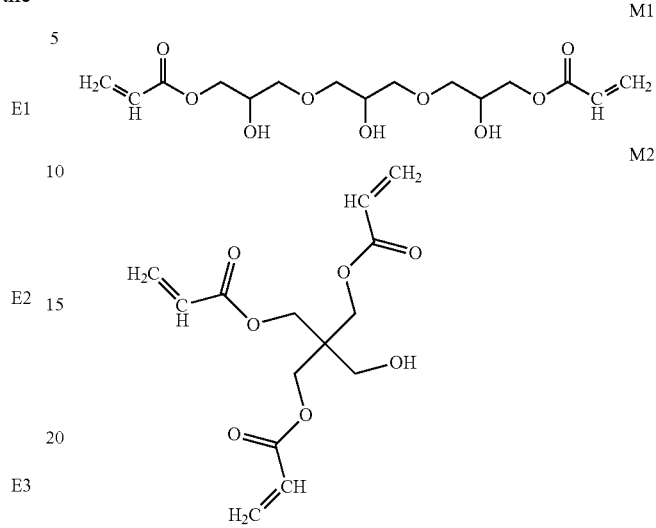

M1, M2

<Specific Crosslinkable Compound>

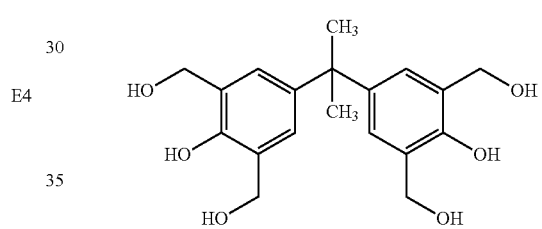
K1

<Solvent>

NMP: N-Methyl-2-pyrrolidone
NEP: N-Ethyl-2-pyrrolidone
γ-BL: γ-Butyrolactone
BCS: Ethylene glycol monobutyl ether
PB: Propylene glycol monobutyl ether
PGME: Propylene glycol monomethyl ether
ECS: Ethylene glycol monoethyl ether
EC: Diethylene glycol monoethyl ether "Molecular Weight Measurement of Polyimide-Type Polymer"

Measured as follows by using a room temperature gel permeation chromatography (GPC) apparatus (GPC-101) (manufactured by Showa Denko K.K.), and a column (KD-803, KD-805) (manufactured by Shodex).

Column temperature: 50° C.

Eluent: N,N'-Dimethylformamide (additives: 30 mmol/L (liter) of lithium bromide monohydrate (LiBr.H$_2$O), 30 mmol/L of phosphoric acid anhydrous crystal (o-phosphoric acid), and 10 ml/L of tetrahydrofuran (THF))

Flow rate: 1.0 ml/m in

Standard samples for preparation of calibration curve: TSK standard polyethylene oxide (molecular weight: about 900,000, 150,000, 100,000 and 30,000) (manufactured by TOSOH CORPORATION) and polyethylene glycol (molecular weight: about 12,000, 4,000 and 1,000) (manufactured by Polymer Laboratories Ltd.).

"Measurement of Imidization Rate of Polyimide-Type Polymer"

20 mg of polyimide powder was put in an NMR (nuclear magnetic resonance) sample tube (NMR sampling tube standard, φ5 (manufactured by Kusano Scientific Co., Ltd.)), and deuterated dimethyl sulfoxide (DMSO-d6, 0.05 mass % TMS (tetramethylsilane) mixed product) (0.53 ml) was added and dissolved completely by applying ultrasound. The solution was subjected to measurement of proton NMR at 500 MHz by an NMR measuring machine (JNW-ECA500) (manufactured by JEOL DATUM Ltd.). The imidization rate was decided by using, as a reference proton, a proton derived from a structure that does not change before and after imidization, and obtained by the following formula by using the peak integration value of this proton and the proton peak integration value derived from the NH group of amide acid appearing in the vicinity of from 9.5 to 10.0 ppm.

Imidization rate (%)=(1−α·x/y)×100

(x is the proton peak integration value derived from the NH group of amide acid, y is the peak integration value of the reference proton, a is the ratio of the number of the reference protons to one NH group proton of the amide acid in the case of a polyamide acid (imidization rate is 0%).)

"Synthesis of Polyimide-Type Polymer"

Synthesis Example 1

E1 (3.50 g, 17.8 mmol), A2 (2.85 g, 7.22 mmol), B2 (1.92 g, 5.42 mmol) and C1 (0.83 g, 5.46 mmol) were mixed in PGME (27.3 g) and reacted at 40° C. for 30 hours, to obtain a polyamic acid solution (1) having a resin solid content concentration of 25 mass %. The number-average molecular weight (Mn) of this polyamic acid was 11,100, and the weight average molecular weight (Mw) was 46,300.

Synthesis Example 2

E2 (1.98 g, 7.91 mmol), A1 (3.05 g, 8.01 mmol), B1 (1.27 g, 4.81 mmol) and C1 (0.49 g, 3.22 mmol) were mixed in NMP (16.7 g) and reacted at 50° C. for 8 hours, and then, E1 (1.55 g, 7.90 mmol) and NMP (8.33 g) were added, followed by the reaction at 40° C. for 8 hours to obtain a polyamic acid solution (2) having a resin solid content concentration of 25 mass %. Mn of the polyamic acid was 21,000, and Mw was 62,700.

Synthesis Example 3

The polyamic acid solution (2) (30.0 g) obtained in Synthesis Example 2, was diluted to 6 mass % by adding NMP, and then, as imidization catalysts, acetic anhydride (3.90 g) and pyridine (2.40 g) were added, followed by the reaction at 50° C. for 4 hours. The reaction solution was poured into methanol (460 ml), and the obtained precipitate was collected by filtration. The precipitate was washed with methanol and dried at 60° C. under reduced pressure to obtain a polyimide powder (3). The imidization rate of the polyimide was 58%, Mn was 18,800, and Mw was 50,100.

Synthesis Example 4

E2 (1.02 g, 4.08 mmol), A2 (2.28 g, 5.78 mmol), B2 (1.76 g, 4.97 mmol) and C2 (1.18 g, 5.80 mmol) were mixed in NMP (17.3 g) and reacted at 50° C. for 8 hours, and then, E1 (2.40 g, 12.2 mmol) and NMP (8.64 g) were added, followed by the reaction at 40° C. for 8 hours, to obtain a polyamic acid solution having a resin solid content concentration of 25 mass %.

The obtained polyamic acid solution (30.0 g) was diluted to 6 mass % by adding NMP, and then, as imidization catalysts, acetic anhydride (3.85 g) and pyridine (2.45 g) were added, followed by the reaction at 50° C. for 4 hours. The reaction solution was poured into methanol (460 ml), and the obtained precipitate was collected by filtration. The precipitate was washed with methanol and dried at 60° C. under reduced pressure to obtain a polyimide powder (4). The imidization rate of the polyimide was 60%, Mn was 17,200, and Mw was 48,900.

Synthesis Example 5

E2 (2.11 g, 8.43 mmol), A4 (2.10 g, 4.26 mmol), B1 (0.90 g, 3.41 mmol) and C1 (1.43 g, 9.40 mmol) were mixed in NEP (16.4 g) and reacted at 50° C. for 8 hours, and then, E1 (1.65 g, 8.41 mmol) and NEP (8.18 g) were added, followed by the reaction at 40° C. for 8 hours, to obtain a polyamic acid solution having a resin solid content concentration of 25 mass %.

The obtained polyamic acid solution (30.0 g) was diluted to 6 mass % by adding NMP, and then, as imidization catalysts, acetic anhydride (3.85 g) and pyridine (2.40 g) were added, followed by the reaction at 50° C. for 2 hours. The reaction solution was poured into methanol (460 ml), and the obtained precipitate was collected by filtration. The precipitate was washed with methanol and dried at 60° C. under reduced pressure to obtain a polyimide powder (5). The imidization rate of the polyimide was 49%, Mn was 16,500, and Mw was 46,300.

Synthesis Example 6

E3 (3.55 g, 15.8 mmol), A2 (2.85 g, 7.22 mmol), B1 (0.85 g, 3.22 mmol), $C_2$ (0.82 g, 4.03 mmol) and D1 (0.17 g, 1.57 mmol) were mixed in NMP (24.7 g) and reacted at 40° C. for 12 hours, to obtain a polyamic acid solution having a resin solid content concentration of 25 mass %.

The obtained polyamic acid solution (30.0 g) was diluted to 6 mass % by adding NMP, and then, as imidization catalysts, acetic anhydride (3.85 g) and pyridine (2.40 g) were added, followed by the reaction at 50° C. for 4.5 hours. The reaction solution was poured into methanol (460 ml), and the obtained precipitate was collected by filtration. The precipitate was washed with methanol and dried at 60° C. under reduced pressure to obtain a polyimide powder (6). The imidization rate of the polyimide was 64%, Mn was 15,600, and Mw was 46,500.

Synthesis Example 7

E3 (3.55 g, 15.8 mmol), A4 (1.98 g, 4.02 mmol), B2 (2.27 g, 6.40 mmol) and C1 (0.85 g, 5.59 mmol) were mixed in NMP (26.0 g) and reacted at 40° C. for 12 hours, to obtain a polyamic acid solution having a resin solid content concentration of 25 mass %.

The obtained polyamic acid solution (30.0 g) was diluted to 6 mass % by adding NMP, and then, as imidization catalysts, acetic anhydride (3.90 g) and pyridine (2.50 g) were added, followed by the reaction at 50° C. for 2 hours. The reaction solution was poured into methanol (460 ml), and the obtained precipitate was collected by filtration. The precipitate was washed with methanol and dried at 60° C. under reduced pressure to obtain a polyimide powder (7). The imidization rate of the polyimide was 50%, Mn was 18,100, and Mw was 49,900.

Synthesis Example 8

E4 (2.22 g, 7.39 mmol), A3 (2.27 g, 5.25 mmol), B1 (0.40 g, 1.51 mmol), B2 (1.06 g, 2.99 mmol) and C1 (0.80 g, 5.26 mmol) were mixed in NMP (16.4 g) and reacted at 40° C. for 12 hours, and then, E1 (1.45 g, 7.39 mmol) and NMP (8.19 g) were added, followed by the reaction at 40° C. for 8 hours, to obtain a polyamic acid solution having a resin solid content concentration of 25 mass %.

The obtained polyamic acid solution (30.0 g) was diluted to 6 mass % by adding NMP, and then, as imidization catalysts, acetic anhydride (4.50 g) and pyridine (3.10 g) were added, followed by the reaction at 50° C. for 4 hours. The reaction solution was poured into methanol (460 ml), and the obtained precipitate was collected by filtration. The precipitate was washed with methanol and dried at 60° C. under reduced pressure to obtain a polyimide powder (8). The imidization rate of the polyimide was 71%, Mn was 16,500, and Mw was 44,600.

Synthesis Example 9

E5 (1.57 g, 7.40 mmol), A2 (2.96 g, 7.50 mmol), B2 (1.59 g, 4.49 mmol) and C2 (0.61 g, 3.00 mmol) were mixed in PGME (16.4 g) and reacted at 50° C. for 24 hours, and then, E1 (1.45 g, 7.39 mmol) and PGME (8.18 g) were added, followed by the reaction at 40° C. for 8 hours, to obtain a polyamic acid solution (9) having a resin solid content concentration of 25 mass %. Mn of the polyamic acid was 10,300, and Mw was 50,100.

Synthesis Example 10

E2 (1.98 g, 7.91 mmol), A5 (3.02 g, 8.02 mmol), B1 (1.27 g, 4.81 mmol) and C1 (0.49 g, 3.22 mmol) were mixed in NMP (16.6 g) and reacted at 50° C. for 8 hours, and then, E1 (1.55 g, 7.90 mmol) and NMP (8.30 g) were added, followed by the reaction at 40° C. for 8 hours, to obtain a polyamic acid solution having a resin solid content concentration of 25 mass %.

The obtained polyamic acid solution (30.0 g) was diluted to 6 mass % by adding NMP, and then, as imidization catalysts, acetic anhydride (3.90 g) and pyridine (2.40 g) were added, followed by the reaction at 50° C. for 4 hours. The reaction solution was poured into methanol (460 ml), and the obtained precipitate was collected by filtration. The precipitate was washed with methanol and dried at 60° C. under reduced pressure to obtain a polyimide powder (10). The imidization rate of the polyimide was 59%, Mn was 17,200, and Mw was 49,800.

Synthesis Example 11

E2 (3.19 g, 12.7 mmol), C1 (0.79 g, 5.19 mmol) and D1 (2.23 g, 20.6 mmol) were mixed in NMP (17.4 g) and reacted at 50° C. for 8 hours, and then, E1 (2.50 g, 12.7 mmol) and NMP (8.71 g) were added, followed by the reaction at 40° C. for 8 hours, to obtain a polyamic acid solution (11) having a resin solid content concentration of 25 mass %. Mn of the polyamic acid was 24,900, and Mw was 76,600.

Synthesis Example 12

E2 (4.47 g, 17.9 mmol), A1 (6.88 g, 18.1 mmol), C1 (1.10 g, 7.23 mmol) and D1 (1.17 g, 10.8 mmol) were mixed in NMP (34.2 g) and reacted at 50° C. for 8 hours, and then, E1 (3.50 g, 17.8 mmol) and NMP (17.1 g) were added, followed by the reaction at 40° C. for 8 hours, to obtain a polyamic acid solution (12) having a resin solid content concentration of 25 mass %. Mn of the polyamic acid was 20,500, and Mw was 64,200.

Synthesis Example 13

The polyamic acid solution (12) (30.0 g) obtained in Synthesis Example 12, was diluted to 6 mass % by adding NMP, and then, as imidization catalysts, acetic anhydride (3.90 g) and pyridine (2.40 g) were added, followed by the reaction at 50° C. for 4 hours. The reaction solution was poured into methanol (460 ml), and the obtained precipitate was collected by filtration. The precipitate was washed with methanol and dried at 60° C. under reduced pressure to obtain a polyimide powder (13). The imidization rate of the polyimide was 58%, Mn was 16,900, and Mw was 48,600.

Synthesis Example 14

E2 (5.23 g, 20.9 mmol), B1 (3.36 g, 12.7 mmol), C1 (1.29 g, 8.48 mmol) and D1 (2.29 g, 21.2 mmol) were mixed in NMP (32.5 g) and reacted at 50° C. for 8 hours, and then, E1 (4.10 g, 20.9 mmol) and NMP (16.3 g) were added, followed by the reaction at 40° C. for 8 hours, to obtain a polyamic acid solution (14) having a resin solid content concentration of 25 mass %. Mn of the polyamide acid was 22,700, and Mw was 73,600.

Synthesis Example 15

The polyamic acid solution (14) (30.0 g) obtained in Synthesis Example 14, was diluted to 6 mass % by adding NMP, and then, as imidization catalysts, acetic anhydride (3.90 g) and pyridine (2.40 g) were added, followed by the reaction at 50° C. for 4 hours. The reaction solution was poured into methanol (460 ml), and the obtained precipitate was collected by filtration. The precipitate was washed with methanol and dried at 60° C. under reduced pressure to obtain a polyimide powder (15). The imidization rate of the polyimide was 58%, Mn was 19,500, and Mw was 53,400.

The polyimide type polymers obtained in Synthesis Examples 1 to 15 are shown in Table 12 and Table 13.

TABLE 12

| | | | Diamine component | | | | |
| | Polymer | Tetracarboxylic acid component | Specific side chain type diamine compound (1) | Specific side chain type diamine compound (2) | Third diamine compound | Other diamine compound | Imidization rate (%) |
| --- | --- | --- | --- | --- | --- | --- | --- |
| Synthesis Example 1 | Polyamic acid solution (1) | E1 (3.50 g, 17.8 mmol) | A2 (2.85 g, 7.22 mmol) | B2 (1.92 g, 5.42 mmol) | C1 (0.83 g, 5.46 mmol) | | *1 |

TABLE 12-continued

|  | Polymer | Tetracarboxylic acid component | Diamine component | | | | Imidization rate (%) |
|---|---|---|---|---|---|---|---|
|  |  |  | Specific side chain type diamine compound (1) | Specific side chain type diamine compound (2) | Third diamine compound | Other diamine compound |  |
| Synthesis Example 2 | Polyamic acid solution (2) | E1 (1.55 g, 7.90 mmol), E2 (1.98 g, 7.91 mmol) | A1 (3.05 g, 8.01 mmol) | B1 (1.27 g, 4.81 mmol) | C1 (0.49 g, 3.22 mmol) |  | *1 |
| Synthesis Example 3 | Polyimide powder (3) | E1 (1.55 g, 7.90 mmol), E2 (1.98 g, 7.91 mmol) | A1 (3.05 g, 8.01 mmol) | B1 (1.27 g, 4.81 mmol) | C1 (0.49 g, 3.22 mmol) |  | 58 |
| Synthesis Example 4 | Polyimide powder (4) | E1 (2.40 g, 12.2 mmol), E2 (1.02 g, 4.08 mmol) | A2 (2.28 g, 5.78 mmol) | B2 (1.76 g, 4.97 mmol) | C2 (1.18 g, 5.80 mmol) |  | 60 |
| Synthesis Example 5 | Polyimide powder (5) | E1 (1.65 g, 8.41 mmol), E2 (2.11 g, 8.43 mmol) | A4 (2.10 g, 4.26 mmol) | B1 (0.90 g, 3.41 mmol) | C1 (1.43 g, 9.40 mmol) |  | 49 |
| Synthesis Example 6 | Polyimide powder (6) | E3 (3.55 g, 15.8 mmol) | A2 (2.85 g, 7.22 mmol) | B1 (0.85 g, 3.22 mmol) | C2 (0.82 g, 4.03 mmol) | D1 (0.17 g, 1.57 mmol) | 64 |
| Synthesis Example 7 | Polyimide powder (7) | E3 (3.55 g, 15.8 mmol) | A4 (1.98 g, 4.02 mmol) | B2 (2.27 g, 6.40 mmol) | C1 (0.85 g, 5.59 mmol) |  | 50 |
| Synthesis Example 8 | Polyimide powder (8) | E1 (1.45 g, 7.39 mmol), E4 (2.22 g, 7.39 mmol) | A3 (2.27 g, 5.25 mmol) | B1 (0.40 g, 1.51 mmol), B2 (1.06 g, 2.99 mmol) | C1 (0.80 g, 5.26 mmol) |  | 71 |
| Synthesis Example 9 | Polyamic acid solution (9) | E1 (1.45 g, 7.39 mmol), E5 (1.57 g, 7.40 mmol) | A2 (2.96 g, 7.50 mmol) | B2 (1.59 g, 4.49 mmol) | C2 (0.61 g, 3.00 mmol) |  | *1 |
| Synthesis Example 10 | Polyimide powder (10) | E1 (1.55 g, 7.90 mmol), E2 (1.98 g, 7.91 mmol) | A5 (3.02 g, 8.02 mmol) | B1 (1.27 g, 4.81 mmol) | C1 (0.49 g, 3.22 mmol) |  | 59 |

TABLE 13

|  | Polymer | Tetracarboxylic acid component | Diamine component | | | | Imidization rate (%) |
|---|---|---|---|---|---|---|---|
|  |  |  | Specific side chain type diamine compound (1) | Specific side chain type diamine compound (2) | Third diamine compound | Other diamine compound |  |
| Synthesis Example 11 | Polyamic acid solution (11) | E1 (2.50 g, 12.7 mmol), E2 (3.19 g, 12.7 mmol) |  |  | C1 (0.79 g, 5.19 mmol) | D1 (2.23 g, 20.6 mmol) | *1 |
| Synthesis Example 12 | Polyamic acid solution (12) | E1 (3.50 g, 17.8 mmol), E2 (4.47 g, 17.9 mmol) | A1 (6.88 g, 18.1 mmol) |  | C1 (1.10 g, 7.23 mmol) | D1 (1.17 g, 10.8 mmol) | *1 |
| Synthesis Example 13 | Polyimide powder (13) | E1 (3.50 g, 17.8 mmol), E2 (4.47 g, 17.9 mmol) | A1 (6.88 g, 18.1 mmol) |  | C1 (1.10 g, 7.23 mmol) | D1 (1.17 g, 10.8 mmol) | 58 |
| Synthesis Example 14 | Polyamic acid solution (14) | E1 (4.10 g, 20.9 mmol), E2 (5.23 g, 20.9 mmol) |  | B1 (3.36 g, 12.7 mmol) | C1 (1.29 g, 8.48 mmol) | D1 (2.29 g, 21.2 mmol) | *1 |
| Synthesis Example 15 | Polyimide powder (15) | E1 (4.10 g, 20.9 mmol), E2 (5.23 g, 20.9 mmol) |  | B1 (3.36 g, 12.7 mmol) | C1 (1.29 g, 8.48 mmol) | D1 (2.29 g, 21.2 mmol) | 58 |

*1: Polyamic acid

"Preparation of Liquid Crystal Composition"
(Liquid Crystal Composition (1))
L1 (2.40 g), R1 (1.20 g), R2 (1.20 g), S1 (0.024 g) and P1 (0.012 g) were mixed to obtain a liquid crystal composition (1).
(Liquid Crystal Composition (2))
L1 (2.40 g), R1 (1.20 g), R2 (1.20 g), S1 (0.24 g) and P1 (0.012 g) were mixed to obtain a liquid crystal composition (2).
(Liquid Crystal Composition (3))
L1 (2.40 g), R1 (1.20 g), R2 (1.20 g), S2 (0.048 g) and P1 (0.012 g) were mixed to obtain a liquid crystal composition (3).
(Liquid Crystal Composition (4))
L1 (2.40 g), R1 (1.20 g), R2 (1.20 g) and P1 (0.012 g) were mixed to obtain a liquid crystal composition (4).
"Production of Liquid Crystal Display Device (Glass Substrate)"
The liquid crystal alignment treating agent in each of Examples 4, 12 and 13, and Comparative Examples 1, 2, 4 and 6, was pressure filtered through a membrane filter with a pore size of 1 μm. The obtained solution was spin-coated on an ITO surface of a 100×100 mm ITO electrode-attached glass substrate (length: 100 mm, horizontal: 100 mm, thickness: 0.7 mm) washed with pure water and IPA (isopropyl alcohol) and heat-treated at 100° C. for 5 minutes on a hot plate, and at 210° C. for 30 minutes in a heat circulating clean oven, to obtain an ITO substrate provided with a liquid crystal alignment film having a film thickness of 100 nm. Two such ITO substrates each provided with a liquid crystal alignment film, were prepared, and the liquid crystal alignment film surface of one of the substrates was coated with a spacer of 6 μm. Thereafter, on the liquid crystal alignment film surface of the substrate coated with the spacer, the above-mentioned liquid crystal composition was dropped by an ODF (One Drop Filling) method, and then, the bonding was carried out so that the liquid crystal alignment film interface of the other substrate would face thereto, to obtain a liquid crystal display device before treatment.

This liquid crystal display device before treatment was subjected to irradiation with ultraviolet rays for an irradiation time of 30 seconds, by using a metal halide lamp with an illuminance of 20 mW and by cutting off wavelengths of 350 nm or less. At that time, the temperature in the irradiation device at the time of irradiating the liquid crystal cell with ultraviolet rays was controlled to be at 25° C. Thus, a liquid crystal display device (reverse type device) (glass substrate) was obtained.

By using this liquid crystal display device, evaluation of the liquid crystal alignment property was carried out. For the liquid crystal alignment property, the present device was observed by a polarizing microscope (ECLIPSE E600WPOL) (manufactured by Nikon Corporation) to confirm whether or not the liquid crystal was aligned vertically. In the liquid crystal display devices in Examples, the liquid crystal was aligned vertically. In the liquid crystal display devices in Comparative Examples 1 and 4, the liquid crystal was not aligned vertically.

"Production of Liquid Crystal Display Device (Plastic Substrate)"

The liquid crystal alignment treating agent in each of Examples 1 to 3, 5 to 11 and 14 to 17, and Comparative Example 3, 5 and 7, was pressure filtered through a membrane filter with a pore size of 1 μm. The obtained solution was applied by a bar coater on an ITO surface of a 150×150 mm ITO electrode-attached PET (polyethylene terephthalate) substrate (length: 150 mm, horizontal: 150 mm, thickness: 0.2 mm) washed with pure water, and heat-treated at 100° C. for 5 minutes on a hot plate and at 120° C. for 2 minutes in a heat circulating clean oven, to obtain an ITO substrate provided with a liquid crystal alignment film having a film thickness of 100 nm. Two such ITO substrates each provided with a liquid crystal alignment film were prepared, and the liquid crystal alignment film surface of one of the substrates was coated with a spacer of 6 μm. Thereafter, on the liquid crystal alignment film surface of the substrate coated with the spacer, the above-mentioned liquid crystal composition was dropped by an ODF method, and then, bonding was carried out so that the liquid crystal alignment film interface of the other substrate would face thereto, to obtain a liquid crystal display device before treatment.

This liquid crystal display device before treatment was subjected to irradiation with ultraviolet rays for an irradiation time of 30 seconds, by using a metal halide lamp with an illuminance of 20 mW and by cutting off wavelengths of 350 nm or less. At that time, the temperature in the irradiation device at the time of irradiating the liquid crystal cell with ultraviolet rays was controlled to be at 25° C. Thus, a liquid crystal display device (reverse type device) (plastic substrate) was obtained.

By using this liquid crystal display device, evaluation of the liquid crystal alignment property was carried out. For the liquid crystal alignment property, the present device was observed by a polarizing microscope (ECLIPSE E600WPOL) (manufactured by Nikon Corporation) to confirm whether or not the liquid crystal was aligned vertically. In the liquid crystal display devices in Examples, the liquid crystal was aligned vertically. In the liquid crystal display device in Comparative Example 5, the liquid crystal was not aligned vertically.

"Evaluation of Optical Properties (Transparency and Scattering Properties)"

Using the liquid crystal display devices (glass substrate and plastic substrate) obtained by the above-described methods, evaluation of the optical properties (transparency and scattering properties) was carried out.

Evaluation of transparency when no voltage was applied, was conducted by measuring the transmittance of the liquid crystal display device (glass substrate and plastic substrate) in a state where no voltage was applied. Specifically, using the UV-3600 (manufactured by Shimadzu Corporation) as the measuring device, the transmittance was measured under conditions at a temperature of 25° C. and a scanning wavelength of from 300 to 800 nm. At that time, in the case of a liquid crystal display device (glass substrate), the above mentioned ITO electrode-attached glass substrate was used as a reference (reference example), and in the case of a liquid crystal display device (plastic substrate), the above mentioned ITO electrode-attached PET substrate was used as a reference. The evaluation was based on the transmittance at a wavelength of 450 nm, and one having a higher transmittance was regarded to be better in transparency.

Further, evaluation of the transmittance after storage for 36 hours in a constant temperature and humidity tank under a humidity of 90% RH at a temperature of 80° C. was also carried out. Specifically, one with a lower reduction rate in transmittance after storage in the constant temperature and humidity tank, relative to the transmittance immediately after the preparation of the liquid crystal display device (initial value), was regarded to be better in this evaluation.

Further, evaluation of the transmittance after irradiation with ultraviolet rays of 5 $J/cm^2$ as calculated at 365 nm, was also carried out by using a tabletop UV curing device (HCT3B28HEX-1) (manufactured by Senraito Co.). Specifically, one with a lower reduction rate in transmittance after irradiation with ultraviolet rays, relative to the transmittance immediately after preparation of the liquid crystal display device (initial value), was regarded to be better in this evaluation.

Further, in Examples 1 to 3, 5 to 7, 14, 15 and 17, in addition to the standard tests as described above, evaluation of the transmittance after storage for 72 hours in a constant temperature and humidity tank at a temperature of 80° C. under a humidity of 90% RH, was also carried out as an emphasized test. The evaluation method was under the same conditions as described above.

Evaluation of the scattering properties when a voltage was applied, was carried out by applying 30V by AC driving to the liquid crystal display device (glass substrate), and visually observing the alignment state of the liquid crystal. Specifically, a case where the liquid crystal display device became cloudy, i.e. a case where scattering properties were obtained, was regarded as good in this evaluation (shown as "good" in the table).

Further, confirmation of the alignment state of the liquid crystal after storage for 36 hours in a constant temperature and humidity tank at a temperature of 80° C. under a humidity of 90% RH was also carried out. Specifically, a case where the liquid crystal display device became cloudy, i.e. a case where scattering properties were obtained, was regarded as good in this evaluation (shown as "good" in the table).

Further, confirmation of the alignment state of the liquid crystal after irradiation with ultraviolet rays of 5 $J/cm^2$ as calculated at 365 nm was also carried out by using a tabletop UV curing device (HCT3B28H EX-1) (manufactured by Senraito Co.). Specifically, a case where the liquid crystal display device became cloudy, i.e. a case where scattering properties were obtained, was regarded as good in this evaluation (shown as "good" in the table).

The evaluation results of the transmittance (%) and scattering properties immediately after production of the liquid crystal display device (initial), after storage in the constant temperature and humidity tank (constant temperature and humidity) and after irradiation with ultraviolet rays (ultraviolet rays) are shown as summarized in Tables 17 to 19.

"Evaluation of Adhesion Between Liquid Crystal Layer and Liquid Crystal Alignment Film"

Using the obtained liquid crystal display devices (glass substrate and plastic substrate) obtained by the above mentioned methods, evaluation of adhesion between the liquid crystal layer and the liquid crystal alignment film was carried out.

A liquid crystal display device (glass substrate and plastic substrate) was stored in a constant temperature and humidity tank at a temperature of 80° C. under a humidity of 90% RH for 36 hours, whereby the presence or absence of air bubbles in the liquid crystal display device and peeling of the device, were confirmed. Specifically, a case where no air bubbles were observed in the device, and peeling of the device (a state in which the liquid crystal layer and the liquid crystal alignment film are peeled) did not occur, was regarded as good in this evaluation (shown as "good" in the table).

Further, the presence or absence of air bubbles in the liquid crystal display device and peeling of the device, were confirmed also after the liquid crystal display device (glass substrate and plastic substrate) was subjected to irradiation with ultraviolet rays of 5 J/cm² as calculated at 365 nm, by using a tabletop UV curing device (HCT3B28HEX-1) (manufactured by Senraito Co.). Specifically, a case where no air bubbles were observed in the device, and peeling of the device did not occur, was regarded as good in this evaluation (shown as "good" in the table).

Further, in Examples 1 to 3, 5 to 7, 14, 15 and 17, in addition to the standard tests as described above, as an emphasized test, evaluation of adhesion after storage for 72 hours in a constant temperature and humidity tank at a temperature of 80° C. under a humidity of 90% RH was also carried out. Here, the evaluation method was under the same conditions as described above.

The adhesion results (adhesion) between the liquid crystal layer and the liquid crystal alignment film, after storage in the constant temperature and humidity tank (constant temperature and humidity) and after irradiation with ultraviolet rays (ultraviolet rays), are shown in Tables 20 to 22.

Example 1

To the polyamic acid solution (1) (5.50 g), PGME (20.7 g) and γ-BL (4.38 g) were added and stirred at 25° C. for 4 hours, to obtain a liquid crystal alignment treating agent (1). This liquid crystal alignment treating agent was confirmed to be a uniform solution, in which abnormality such as turbidity or precipitation was not observed. By using the liquid crystal alignment treating agent (1) and the liquid crystal composition (1), a liquid crystal display device was prepared, and the above evaluations were carried out.

Example 2

To the polyamic acid solution (1) (5.50 g), N1 (0.069 g), M1 (0.207 g), K1 (0.097 g), PGME (20.7 g) and γ-BL (4.38 g) were added and stirred at 25° C. for 6 hours, to obtain a liquid crystal alignment treating agent (2). This liquid crystal alignment treating agent was confirmed to be a uniform solution, wherein abnormality such as turbidity or precipitation was not observed. By using the liquid crystal alignment treating agent (2) and the liquid crystal composition (1) a liquid crystal display device was prepared, and the above evaluations were carried out.

Example 3

By using the liquid crystal alignment treating agent (2) in Example 2 and the liquid crystal composition (2), a liquid crystal display device was prepared, and the above evaluations were carried out.

Example 4

To the polyamic acid solution (2) (5.50 g), NMP (11.9 g) and BCS (13.1 g) were added and stirred at 25° C. for 4 hours, to obtain a liquid crystal alignment treating agent (3). This liquid crystal alignment treating agent was confirmed to be a uniform solution, wherein abnormality such as turbidity or precipitation was not observed. By using the liquid crystal alignment treating agent (3) and the liquid crystal composition (1), a liquid crystal display device was prepared, and the above evaluations were carried out.

Example 5

To the polyimide powder (3) (1.50 g), γ-BL (3.18 g) and PGME (28.7 g) were added and stirred at 60° C. for 24 hours, to obtain a liquid crystal alignment treating agent (4). This liquid crystal alignment treating agent was confirmed to be a uniform solution, wherein abnormality such as turbidity or precipitation was not observed. By using the liquid crystal alignment treating agent (4) and the liquid crystal composition (1), a liquid crystal display device was prepared, and the above evaluations were carried out.

Example 6

To the polyimide powder (4) (1.50 g), γ-BL (6.37 g) and PGME (25.5 g) were added and stirred at 60° C. for 24 hours, to obtain a liquid crystal alignment treating agent (5). This liquid crystal alignment treating agent was confirmed to be a uniform solution, wherein abnormality such as turbidity or precipitation was not observed. By using the liquid crystal alignment treating agent (5) and the liquid crystal composition (2), a liquid crystal display device was prepared, and the above evaluations were carried out.

Example 7

To the polyimide powder (4) (1.50 g), γ-BL (6.37 g) and PGME (25.5 g) were added and stirred at 60° C. for 24 hours. Thereafter, N1 (0.105 g), M1 (0.45 g) and K1 (0.075 g) were added, and stirred at 25° C. for 4 hours, to obtain a liquid crystal alignment treating agent (6). By using this liquid crystal alignment treating agent (6) and the liquid crystal composition (2), a liquid crystal display device was prepared, and the above evaluations were carried out.

Example 8

To the polyimide powder (4) (1.50 g), γ-BL (6.37 g) and PGME (25.5 g) were added and stirred at 60° C. for 24 hours. Thereafter, N1 (0.075 g) and K1 (0.15 g) were added and stirred at 25° C. for 4 hours, to obtain a liquid crystal alignment treating agent (7). This liquid crystal alignment treating agent was confirmed to be a uniform solution, wherein abnormality such as turbidity or precipitation was not observed. By using this liquid crystal alignment treating agent (7) and the liquid crystal composition (3), a liquid crystal display device was prepared, and the above evaluations were carried out.

Example 9

To the polyimide powder (5) (1.55 g), γ-BL (8.22 g) and PGME (24.7 g) were added and stirred at 60° C. for 24 hours. Thereafter, N1 (0.047 g), M1 (0.155 g) and K1 (0.078 g) were added and stirred at 25° C. for 4 hours, to obtain a liquid crystal alignment treating agent (8). This liquid crystal alignment treating agent was confirmed to be a uniform solution, wherein abnormality such as turbidity or precipitation was not observed. By using this liquid crystal alignment treating agent (8) and the liquid crystal composition (2), a liquid crystal display device was prepared, and the above evaluations were carried out.

Example 10

To the polyimide powder (6) (1.50 g), γ-BL (3.18 g) and PGME (28.7 g) were added and stirred at 60° C. for 24 hours. Thereafter, N1 (0.075 g) and K1 (0.105 g) were added and stirred at 25° C. for 4 hours, to obtain a liquid crystal alignment treating agent (9). This liquid crystal alignment treating agent was confirmed to be a uniform solution, wherein abnormality such as turbidity or precipitation was not observed. By using this liquid crystal alignment treating agent (9) and the liquid crystal composition (2), a liquid crystal display device was prepared, and the above evaluations were carried out.

Example 11

To the polyimide powder (6) (1.50 g), γ-BL (3.18 g) and PGME (28.7 g) were added and stirred at 60° C. for 24 hours. Then, N1 (0.045 g), M2 (0.075 g) and K1 (0.075 g) were added and stirred at 25° C. for 4 hours, to obtain a liquid crystal alignment treating agent (10). This liquid crystal alignment treating agent was confirmed to be a uniform solution, wherein abnormality such as turbidity or precipitation was not observed. By using this liquid crystal alignment treating agent (10) and the liquid crystal composition (3), a liquid crystal display device was prepared, and the above evaluations were carried out.

Example 12

To the polyimide powder (7) (1.50 g), γ-BL (12.7 g), BCS (9.55 g) and PB (9.55 g) were added and stirred at 60° C. for 24 hours. Then, N1 (0.105 g), M2 (0.075 g) and K1 (0.075 g) were added and stirred at 25° C. for 4 hours, to obtain a liquid crystal alignment treating agent (11). This liquid crystal alignment treating agent was confirmed to be a uniform solution, wherein abnormality such as turbidity or precipitation was not observed. By using this liquid crystal alignment treating agent (11) and the liquid crystal composition (2), a liquid crystal display device was prepared, and the above evaluations were carried out.

Example 13

To the polyimide powder (8) (1.50 g), NEP (15.9 g), BCS (6.37 g) and PB (9.55 g) were added and stirred at 60° C. for 24 hours. Thereafter, N1 (0.075 g) and K1 (0.045 g) were added and stirred at 25° C. for 4 hours, to obtain a liquid crystal alignment treating agent (12). This liquid crystal alignment treating agent was confirmed to be a uniform solution, wherein abnormality such as turbidity or precipitation was not observed. By using this liquid crystal alignment treating agent (12) and the liquid crystal composition (2), a liquid crystal display device was prepared, and the above evaluations were carried out.

Example 14

To the polyamic acid solution (9) (5.50 g), PGME (22.1 g) and γ-BL (2.92 g) were added and stirred at 25° C. for 4 hours, to obtain a liquid crystal alignment treating agent (13). This liquid crystal alignment treating agent was confirmed to be a uniform solution, wherein abnormality such as turbidity or precipitation was not observed. By using this liquid crystal alignment treating agent (13) and the liquid crystal composition (2), a liquid crystal display device was prepared, and the above evaluations were carried out.

Example 15

To the polyamic acid solution (9) (5.50 g), PGME (22.1 g) and γ-BL (2.92 g) were added and stirred at 25° C. for 4 hours. Then, N1 (0.069 g), M2 (0.138 g) and K1 (0.097 g) were added and stirred at 25° C. for 4 hours, to obtain a liquid crystal alignment treating agent (14). This liquid crystal alignment treating agent was confirmed to be a uniform solution, wherein abnormality such as turbidity or precipitation was not observed. By using this liquid crystal alignment treating agent (14) and the liquid crystal composition (2), a liquid crystal display device was prepared, and the above evaluations were carried out.

Example 16

By using the liquid crystal alignment treating agent (14) in Example 15 and the liquid crystal composition (3), a liquid crystal display device was prepared.

Example 17

To the polyimide powder (10) (1.50 g), γ-BL (3.18 g) and γ-BL (28.7 g) were added and stirred at 60° C. for 24 hours, to obtain a liquid crystal alignment treating agent (15). This liquid crystal alignment treating agent was confirmed to be a uniform solution, wherein abnormality such as turbidity or precipitation was not observed. By using this liquid crystal alignment treating agent (15) and the liquid crystal composition (1), a liquid crystal display device was prepared, and the above evaluations were carried out.

Comparative Example 1

To the polyamic acid solution (11) (5.50 g), NMP (11.9 g) and BCS (13.1 g) were added and stirred at 25° C. for 4 hours, to obtain a liquid crystal alignment treating agent (16). This liquid crystal alignment treating agent was confirmed to be a uniform solution, wherein abnormality such as turbidity or precipitation was not observed. By using this liquid crystal alignment treating agent (16) and the liquid crystal composition (1), a liquid crystal display device was prepared, and the above evaluations were carried out.

Comparative Example 2

To the polyamic acid solution (12) (5.50 g), NMP (11.9 g) and BCS (13.1 g) were added and stirred at 25° C. for 4 hours, to obtain a liquid crystal alignment treating agent (17). This liquid crystal alignment treating agent was confirmed to be a uniform solution, wherein abnormality such as turbidity or precipitation was not observed. By using this liquid crystal alignment treating agent (17) and the liquid crystal composition (1), a liquid crystal display device was prepared, and the above evaluations were carried out.

Comparative Example 3

To the polyimide powder (13) (1.50 g), γ-BL (3.18 g) and PGME (28.7 g) were added and stirred at 60° C. for 24 hours, to obtain a liquid crystal alignment treating agent (18). This liquid crystal alignment treating agent was confirmed to be a uniform solution, wherein abnormality such as turbidity or precipitation was not observed. By using this liquid crystal alignment treating agent (18) and the liquid crystal composition (1), a liquid crystal display device was prepared, and the above evaluations were carried out.

Comparative Example 4

To the polyamic acid solution (14) (5.50 g), NMP (11.9 g) and BCS (13.1 g) were added and stirred at 25° C. for 4 hours, to obtain a liquid crystal alignment treating agent (19). This liquid crystal alignment treating agent was confirmed to be a uniform solution, wherein abnormality such as turbidity or precipitation was not observed. By using this liquid crystal alignment treating agent (19) and the liquid crystal composition (1), a liquid crystal display device was prepared, and the above evaluations were carried out.

Comparative Example 5

To the polyimide powder (15) (1.50 g), γ-BL (3.18 g) and PGME (28.7 g) were added and stirred at 60° C. for 24 hours, to obtain a liquid crystal alignment treating agent (20). This liquid crystal alignment treating agent was confirmed to be a uniform solution, wherein abnormality such as turbidity or precipitation was not observed. By using this liquid crystal alignment treating agent (20) and the liquid crystal composition (1), a liquid crystal display device was prepared, and the above evaluations were carried out.

Comparative Example 6

By using the liquid crystal alignment treating agent (3) in Example 4 and the liquid crystal composition (4), a liquid crystal display device was prepared, and the above evaluations were carried out.

Comparative Example 7

By using the liquid crystal alignment treating agent (4) in Example 5 and the liquid crystal composition (4), a liquid crystal display device was prepared, and the above evaluations were carried out.

TABLE 14

|  | Liquid crystal alignment treating agent | Specific polymer | Polymer | Specific generating agent (*1) | Specific adhesion compound (*2) | Specific crosslinkable compound (*3) |
|---|---|---|---|---|---|---|
| Example 1 | Liquid crystal alignment treating agent (1) | Polyamic acid solution (1) | — | — | — | — |
| Example 2 | Liquid crystal alignment treating agent (2) | Polyamic acid solution (1) | — | N1 (5) | M1 (15) | K1 (7) |
| Example 3 | Liquid crystal alignment treating agent (2) | Polyamic acid solution (1) | — | N1 (5) | M1 (15) | K1 (7) |
| Example 4 | Liquid crystal alignment treating agent (3) | Polyamic acid solution (2) | — | — | — | — |
| Example 5 | Liquid crystal alignment treating agent (4) | Polyimide powder (3) | — | — | — | — |
| Example 6 | Liquid crystal alignment treating agent (5) | Polyimide powder (4) | — | — | — | — |
| Example 7 | Liquid crystal alignment treating agent (6) | Polyimide powder (4) | — | N1 (7) | M1 (30) | K1 (5) |
| Example 8 | Liquid crystal alignment treating agent (7) | Polyimide powder (4) | — | N1 (5) | — | K1 (10) |
| Example 9 | Liquid crystal alignment treating agent (8) | Polyimide powder (5) | — | N1 (3) | M1 (10) | K1 (5) |
| Example 10 | Liquid crystal alignment treating agent (9) | Polyimide powder (6) | — | N1 (5) | — | K1 (7) |

TABLE 15

|  | Liquid crystal alignment treating agent | Specific polymer | Polymer | Specific generating agent (*1) | Specific adhesion compound (*2) | Specific crosslinkable compound (*3) |
|---|---|---|---|---|---|---|
| Example 11 | Liquid crystal alignment treating agent (10) | Polyimide powder (6) | — | N1 (3) | M2 (5) | K1 (5) |
| Example 12 | Liquid crystal alignment treating agent (11) | Polyimide powder (7) | — | N1 (7) | M2 (5) | K1 (5) |
| Example 13 | Liquid crystal alignment treating agent (12) | Polyimide powder (8) | — | N1 (5) | — | K1 (3) |
| Example 14 | Liquid crystal alignment treating agent (13) | Polyamic acid solution (9) | — | — | — | — |
| Example 15 | Liquid crystal alignment treating agent (14) | Polyamic acid solution (9) | — | N1 (5) | M2 (10) | K1 (7) |
| Example 16 | Liquid crystal alignment treating agent (14) | Polyamic acid solution (9) | — | N1 (5) | M2 (10) | K1 (7) |

TABLE 15-continued

| | Liquid crystal alignment treating agent | Specific polymer | Polymer | Specific generating agent (*1) | Specific adhesion compound (*2) | Specific crosslinkable compound (*3) |
|---|---|---|---|---|---|---|
| Example 17 | Liquid crystal alignment treating agent (15) | Polyimide powder (10) | — | — | — | — |

TABLE 16

| | Liquid crystal alignment treating agent | Specific polymer | Polymer | Specific generating agent (*1) | Specific adhesion compound (*2) | Specific crosslinkable compound (*3) |
|---|---|---|---|---|---|---|
| Comparative Example 1 | Liquid crystal alignment treating agent (16) | — | Polyamic acid solution (11) | — | — | — |
| Comparative Example 2 | Liquid crystal alignment treating agent (17) | — | Polyamic acid solution (12) | — | — | — |
| Comparative Example 3 | Liquid crystal alignment treating agent (18) | — | Polyimide powder (13) | — | — | — |
| Comparative Example 4 | Liquid crystal alignment treating agent (19) | — | Polyamic acid solution (14) | — | — | — |
| Comparative Example 5 | Liquid crystal alignment treating agent (20) | — | Polyimide powder (15) | — | — | — |
| Comparative Example 6 | Liquid crystal alignment treating agent (3) | Polyamic acid solution (2) | — | — | — | — |
| Comparative Example 7 | Liquid crystal alignment treating agent (4) | Polyimide powder (3) | — | — | — | — |

(*1): shows the content (parts by mass) of the specific generating agent to 100 parts by mass of all polymers.
(*2): shows the content (parts by mass) of the specific adhesion compound to 100 parts by mass of all polymers.
(*3): shews the content (parts by mass) of the specific crosslinkable compound to 100 parts by mass of all polymers.

TABLE 17

| | | | Optical properties | | | | |
|---|---|---|---|---|---|---|---|
| | | | Transmittance (%) | | | Scattering properties | |
| | | | Constant temperature and humidity (standard test/emphasized test) | | | Constant temperature | |
| | Liquid crystal alignment treating agent | Liquid crystal composition | Initial | | Ultraviolet rays | Initial | and humidity | Ultraviolet rays |
| Example 1 | Liquid crystal alignment treating agent (1) | Liquid crystal composition (1) | 85.1 | 78.4/73.2 | 83.4 | Good | Good | Good |
| Example 2 | Liquid crystal alignment treating agent (2) | Liquid crystal composition (1) | 85.4 | 82.6/81.3 | 84.0 | Good | Good | Good |
| Example 3 | Liquid crystal alignment treating agent (2) | Liquid crystal composition (2) | 88.1 | 85.4/83.7 | 87.0 | Good | Good | Good |
| Example 4 | Liquid crystal alignment treating agent (3) | Liquid crystal composition (1) | 84.5 | 77.5/— | 82.6 | Good | Good | Good |
| Example 5 | Liquid crystal alignment treating agent (4) | Liquid crystal composition (1) | 84.7 | 77.7/73.0 | 83.1 | Good | Good | Good |
| Example 6 | Liquid crystal alignment treating agent (5) | Liquid crystal composition (2) | 88.0 | 82.5/76.3 | 86.0 | Good | Good | Good |
| Example 7 | Liquid crystal alignment treating agent (6) | Liquid crystal composition (2) | 88.3 | 85.7/83.9 | 87.2 | Good | Good | Good |
| Example 8 | Liquid crystal alignment treating agent (7) | Liquid crystal composition (3) | 86.3 | 83.5/— | 85.1 | Good | Good | Good |
| Example 9 | Liquid crystal alignment treating agent (8) | Liquid crystal composition (2) | 87.4 | 84.5/— | 86.2 | Good | Good | Good |
| Example 10 | Liquid crystal alignment treating agent (9) | Liquid crystal composition (2) | 88.0 | 85.0/— | 86.7 | Good | Good | Good |

TABLE 18

| | Liquid crystal alignment treating agent | Liquid crystal composition | Optical properties | | | Scattering properties | | |
|---|---|---|---|---|---|---|---|---|
| | | | Transmittance (%) | | | | | |
| | | | Constant temperature and humidity | | | | | |
| | | | Initial | (standard test/emphasized test) | Ultraviolet rays | Initial | Constant temperature and humidity | Ultraviolet rays |
| Example 11 | Liquid crystal alignment treating agent (10) | Liquid crystal composition (3) | 86.5 | 83.8/— | 85.1 | Good | Good | Good |
| Example 12 | Liquid crystal alignment treating agent (11) | Liquid crystal composition (2) | 87.8 | 84.9/— | 86.7 | Good | Good | Good |
| Example 13 | Liquid crystal alignment treating agent (12) | Liquid crystal composition (2) | 87.4 | 84.5/— | 86.2 | Good | Good | Good |
| Example 14 | Liquid crystal alignment treating agent (13) | Liquid crystal composition (2) | 88.2 | 82.3/77.2 | 86.4 | Good | Good | Good |
| Example 15 | Liquid crystal alignment treating agent (14) | Liquid crystal composition (2) | 88.5 | 85.8/84.2 | 87.3 | Good | Good | Good |
| Example 16 | Liquid crystal alignment treating agent (14) | Liquid crystal composition (3) | 87.1 | 84.3/— | 86.0 | Good | Good | Good |
| Example 17 | Liquid crystal alignment treating agent (15) | Liquid crystal composition (1) | 82.8 | 74.5/69.7 | 79.9 | Good | Good | Good |

TABLE 19

| | Liquid crystal alignment treating agent | Liquid crystal composition | Optical properties | | | Scattering properties | | |
|---|---|---|---|---|---|---|---|---|
| | | | Transmittance (%) | | | | | |
| | | | Initial | Constant temperature and humidity (standard test) | Ultraviolet rays | Initial | Constant temperature and humidity | Ultraviolet rays |
| Comparative Example 1 | Liquid crystal alignment treating agent (16) | Liquid crystal composition (1) | *1 | *1 | *1 | *1 | *1 | *1 |
| Comparative Example 2 | Liquid crystal alignment treating agent (17) | Liquid crystal composition (1) | 83.3 | 75.5 | 81.3 | Good | *4 | *3 |
| Comparative Example 3 | Liquid crystal alignment treating agent (18) | Liquid crystal composition (1) | 83.5 | 75.7 | 81.5 | Good | *4 | *3 |
| Comparative Example 4 | Liquid crystal alignment treating agent (19) | Liquid crystal composition (1) | *1 | *1 | *1 | *1 | *1 | *1 |
| Comparative Example 5 | Liquid crystal alignment treating agent (20) | Liquid crystal composition (1) | *1 | *1 | *1 | *1 | *1 | *1 |
| Comparative Example 6 | Liquid crystal alignment treating agent (3) | Liquid crystal composition (4) | 67.4 | 60.3 | 64.0 | Good | *2 | *2 |
| Comparative Example 7 | Liquid crystal alignment treating agent (4) | Liquid crystal composition (4) | 68.1 | 60.6 | 64.3 | Good | *2 | *2 |

*1: The liquid crystal was not aligned vertically.
*2: At very limited locations in the device, disturbance in the liquid crystal alignment was observed.
*3: At several locations in the device, disturbance in the liquid crystal alignment was observed (the number of locations was larger than *2).
*4: In the device, disturbance in the liquid crystal alignment was observed (the number of locations was larger than *3).

TABLE 20

| | Liquid crystal alignment treating agent | Liquid crystal composition | Adhesion | |
|---|---|---|---|---|
| | | | Constant temperature and humidity (standard test/emphasized test) | Ultraviolet rays |
| Example 1 | Liquid crystal alignment treating agent (1) | Liquid crystal composition (1) | Good/*2 | Good |
| Example 2 | Liquid crystal alignment treating agent (2) | Liquid crystal composition (1) | Good/Good | Good |

TABLE 20-continued

| | Liquid crystal alignment treating agent | Liquid crystal composition | Adhesion Constant temperature and humidity (standard test/emphasized test) | Ultraviolet rays |
|---|---|---|---|---|
| Example 3 | Liquid crystal alignment treating agent (2) | Liquid crystal composition (2) | Good/Good | Good |
| Example 4 | Liquid crystal alignment treating agent (3) | Liquid crystal composition (1) | Good/— | Good |
| Example 5 | Liquid crystal alignment treating agent (4) | Liquid crystal composition (1) | Good/*2 | Good |
| Example 6 | Liquid crystal alignment treating agent (5) | Liquid crystal composition (2) | Good/*2 | Good |
| Example 7 | Liquid crystal alignment treating agent (6) | Liquid crystal composition (2) | Good/Good | Good |
| Example 8 | Liquid crystal alignment treating agent (7) | Liquid crystal composition (3) | Good/— | Good |
| Example 9 | Liquid crystal alignment treating agent (8) | Liquid crystal composition (2) | Good/— | Good |
| Example 10 | Liquid crystal alignment treating agent (9) | Liquid crystal composition (2) | Good/— | Good |

TABLE 21

| | Liquid crystal alignment treating agent | Liquid crystal composition | Adhesion Constant temperature and humidity (standard test/emphasized test) | Ultraviolet rays |
|---|---|---|---|---|
| Example 11 | Liquid crystal alignment treating agent (10) | Liquid crystal composition (3) | Good/— | Good |
| Example 12 | Liquid crystal alignment treating agent (11) | Liquid crystal composition (2) | Good/— | Good |
| Example 13 | Liquid crystal alignment treating agent (12) | Liquid crystal composition (2) | Good/— | Good |
| Example 14 | Liquid crystal alignment treating agent (13) | Liquid crystal composition (2) | Good/*2 | Good |
| Example 15 | Liquid crystal alignment treating agent (14) | Liquid crystal composition (2) | Good/Good | Good |
| Example 16 | Liquid crystal alignment treating agent (14) | Liquid crystal composition (3) | Good/— | Good |
| Example 17 | Liquid crystal alignment treating agent (15) | Liquid crystal composition (1) | Good/*3 | Good |

TABLE 22

| | Liquid crystal alignment treating agent | Liquid crystal composition | Adhesion Constant temperature and humidity (standard test) | Ultraviolet rays |
|---|---|---|---|---|
| Comparative Example 1 | Liquid crystal alignment treating agent (16) | Liquid crystal composition (1) | *1 | *1 |
| Comparative Example 2 | Liquid crystal alignment treating agent (17) | Liquid crystal composition (1) | *4 | *3 |
| Comparative Example 3 | Liquid crystal alignment treating agent (18) | Liquid crystal composition (1) | *4 | *3 |
| Comparative Example 4 | Liquid crystal alignment treating agent (19) | Liquid crystal composition (1) | *1 | *1 |
| Comparative Example 5 | Liquid crystal alignment treating agent (20) | Liquid crystal composition (1) | *1 | *1 |
| Comparative Example 6 | Liquid crystal alignment treating agent (3) | Liquid crystal composition (4) | *2 | *2 |
| Comparative Example 7 | Liquid crystal alignment treating agent (4) | Liquid crystal composition (4) | *2 | *2 |

*1: Since the liquid crystal was not aligned vertically, no evaluation was possible.
*2: A very small amount of air bubbles was observed in the device.
*3: A small amount (more than *2) of air bubbles was observed in the device.
*4: A lot (more than *3) of air bubbles was observed in the device.

As is evident from the above, the liquid crystal display devices in Examples were, as compared with Comparative Examples, good in optical properties, i.e. in transparency when no voltage was applied, at the initial stage, after the storage in the constant temperature and humidity tank and after the irradiation with ultraviolet rays, and also high in adhesion between the liquid crystal layer and the liquid crystal alignment film. In particular, these properties were good also when plastic substrates were used as the substrates in the liquid crystal display device.

In particular, in Examples using a diamine having a specific side chain structure (1) and a specific side chain structure (2), the test results were obtained where the adhesion between the liquid crystal layer and the liquid crystal alignment film became high, as compared with in Comparative Examples using a diamine having only a specific side chain structure (1), specifically in a comparison between Example 4 and Comparative Example 2, and in a comparison between Example 5 and Comparative Example 3, under the same conditions.

Further, in Comparative Examples using no diamine having a specific side chain structure (1), the liquid crystal was not aligned vertically, i.e. specifically, in Comparative Examples 1, 4 and 5.

Furthermore, in Examples containing a specific compound in the liquid crystal composition, transparency of the liquid crystal display device when no voltage was applied, became high, as compared with Comparative Examples containing no specific compound, specifically in a comparison between Example 4 and Comparative Example 6 and in a comparison between Example 5 and Comparative Example 7, under the same conditions.

In a case where the amount of a specific compound in the liquid crystal composition was large, as compared with the case where it was less, transparency of the liquid crystal display device when no voltage was applied, became high, specifically in a comparison between Examples 2 and 3 under the same conditions.

Further, among the specific side chain structures, in the case of using a diamine having a specific side chain structure of the above formula [2-1], as compared with the case of using a diamine having the formula [2-2], transparency of the liquid crystal display device when no voltage was applied, became high. Further, also after storage in a constant temperature and humidity tank for a long time, as was conducted in the emphasized test, the result was such that the transparency when no voltage was applied, became high. Further, in the evaluation of adhesion between the liquid crystal layer and the liquid crystal alignment film, in the case of using a diamine having a specific side chain structure of the formula [2-1], such adhesion became high even after storage in a constant temperature and humidity tank for a long time, as conducted by the emphasized test, specifically in a comparison between Example 5 and Example 17 under the same conditions in the emphasized test.

Further, in a case where the liquid crystal alignment treating agent contained a specific generating agent, a specific adhesion compound and a specific crosslinkable compound, as compared with the case where it did not contain them, such a result was obtained that adhesion between the liquid crystal layer and the liquid crystal alignment film in the liquid crystal display device was further improved, specifically, in a comparison between Example 1 and Example 2, a comparison between Example 6 and Example 7, and a comparison between Example 14 to Example 15, under the same conditions in the emphasized test.

INDUSTRIAL APPLICABILITY

The liquid crystal display device of the present invention is useful for a liquid crystal display for the purpose of display, and further, for a dimming window or a light shutter element for controlling the transmission and blocking of light, particularly as a reverse device, etc., in transportation equipment such as automobiles, railways, aircrafts, etc.

Particularly in a case where the present device is used in a glass window of a vehicle, as compared with a conventional reverse device, the efficiency for intaking light at night time will be high, and the effect of preventing the glare from ambient light will be also high. Therefore, the safety and ride comfort at the time of driving a vehicle, can be further improved. Further, in a case where the present device is made of a film, and used as bonded on a vehicle glass window, as compared with a conventional reverse device, failure or deterioration caused by low adhesion between the liquid crystal layer and the liquid crystal alignment film is less likely to occur, whereby the reliability of the device will be high.

Furthermore, the present device is useful as a light guide plate for a display device such as LCD, OLED, etc., or as a back plate for a transparent display. Specifically, in a case where it is used as a back plate for a transparent display, when the transparent display and the present device are combined to carry out a screen display on the transparent display, it is possible to prevent entering of light from the back.

The entire disclosure of Japanese Patent Application No. 2014-195640 filed on Sep. 25, 2014 including specification, claims and summary is incorporated herein by reference in its entirety.

The invention claimed is:

1. A liquid crystal display device having a liquid crystal layer formed by irradiating and curing with ultraviolet rays a liquid crystal composition comprising a liquid crystal and a polymerizable compound disposed between a pair of substrates provided with electrodes, and at least one of the substrates being provided with a liquid crystal alignment film to vertically align a liquid crystal, wherein said liquid crystal composition comprises a compound represented by the following formula [1], and said liquid crystal alignment film is obtained from a liquid crystal alignment treating agent comprising a polymer having a side chain structure represented by the following formula [2-1] or formula [2-2], and a side chain structure represented by the following formula [3]:

$$X^1\text{—}X^2\text{—}X^3\text{—}X^4\text{—}X^5\text{—}X^6\text{—}(X^7)_p\text{—}X^8 \quad [1]$$

wherein $X^1$ is at least one selected from the group consisting of the following formula [1-a] to formula [1-g], $X^2$ is at least one bond group selected from the group consisting of a single bond, —O—, —NH—, —N(CH$_3$)—, —CH$_2$O—, —CONH—, —NHCO—, —CON(CH$_3$)—, —N(CH$_3$)CO—, —COO— and —OCO—, $X^3$ is a single bond or —(CH$_2$)$_a$— wherein a is an integer of from 1 to 15, $X^4$ is at least one bond group selected from the group consisting of a single bond, —O—, —OCH$_2$—, —COO— and —OCO—, $X^5$ is a benzene ring, a cyclohexane ring or a C$_{17\text{-}51}$ divalent organic group having a steroid skeleton, wherein any optional hydrogen atom on the benzene ring or the cyclohexane ring may be substituted by a C$_{1\text{-}3}$ alkyl group, a C$_{1\text{-}3}$ alkoxy group, a C$_{1\text{-}3}$ fluorinated alkyl group, a C$_{1\text{-}3}$ fluorinated alkoxy group or a fluorine atom, $X^6$ is at least one bond group selected from the group consisting of a single bond, —O—, —OCH$_2$—, —CH$_2$O—, —COO— and —OCO—, $X^7$ is a benzene ring or a cyclohexane ring, wherein any optional hydrogen atom on the cyclic group may be substituted by a C$_{1\text{-}3}$ alkyl group, a C$_{1\text{-}3}$ alkoxy group, a C$_{1\text{-}3}$ fluorinated alkyl group, a C$_{1\text{-}3}$ fluorinated alkoxy group or a fluorine atom, p is an integer of from 0 to 4, and $X^8$ is at least one selected from the group consisting of a C$_{1\text{-}18}$ alkyl group, a C$_{1\text{-}18}$ fluorinated alkyl group, a C$_{1\text{-}18}$ alkoxy group and a C$_{1\text{-}18}$ fluorinated alkoxy group,

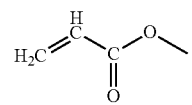

[1-a]

-continued

[1-b]
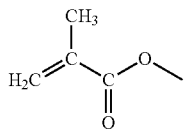

[1-c]
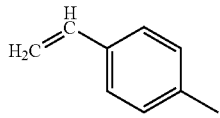

[1-d]
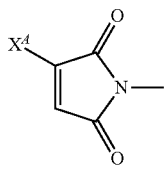

[1-e]
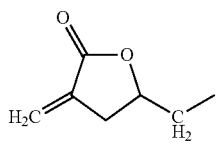

[1-f]
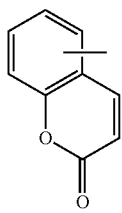

[1-g]
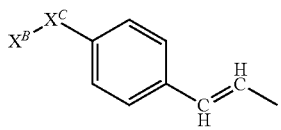

wherein $X^A$ is a hydrogen atom or a benzene ring, $X^B$ is at least one cyclic group selected from the group consisting of a benzene ring, a cyclohexane ring and a heterocyclic ring, and $X^C$ is at least one selected from the group consisting of a $C_{1-18}$ alkyl group, a $C_{1-18}$ fluorinated alkyl group, a $C_{1-18}$ alkoxy group and a $C_{1-18}$ fluorinated alkoxy group, $-Y^1-Y^2-Y^3-Y^4-(Y^5)_n-Y^6$      [2-1]

wherein $Y^1$ and $Y^3$ are each independently at least one bond group selected from the group consisting of a single bond, $-(CH_2)_a-$ wherein a is an integer of from 1 to 15, $-O-$, $-CH_2O-$, $-COO-$ and $-OCO-$, $Y^2$ is a single bond or $-(CH_2)_b-$ wherein b is an integer of from 1 to 15, $Y^4$ and $Y^5$ are each independently at least one divalent cyclic group selected from the group consisting of a benzene ring, a cyclohexane ring and a heterocyclic ring, or a $C_{17-51}$ divalent organic group having a steroid skeleton, wherein any optional hydrogen atom on the cyclic group may be substituted by a $C_{1-3}$ alkyl, alkoxy, fluorinated alkyl or fluorinated alkoxy group, or a fluorine atom, n is an integer of from 0 to 4, and $Y^6$ is a $C_{1-18}$ alkyl, fluorinated alkyl, alkoxy or fluorinated alkoxy group, $-Y^7-Y^8$      [2-2]

wherein $Y^7$ is at least one bond group selected from the group consisting of a single bond, $-O-$, $-CH_2O-$, $-CONH-$, $-NHCO-$, $-CON(CH_3)-$, $-N(CH_3)CO-$, $-COO-$ and $-OCO-$, and $Y^8$ is a $C_{8-22}$ alkyl group or a $C_{6-18}$ fluorinated alkyl group, $-W^1-W^2-W^3-W^4$      [3]

wherein $W^1$ and $W^3$ are each independently at least one bond group selected from the group consisting of a single bond, $-O-$, $-NH-$, $-N(CH_3)-$, $-CH_2O-$, $-CONH-$, $-NHCO-$, $-CON(CH_3)-$, $-N(CH_3)CO-$, $-COO-$ and $-OCO-$, $W^2$ is a single bond, a $C_{1-18}$ alkylene group or a $C_{6-24}$ organic group having at least one cyclic group selected from the group consisting of a benzene ring, a cyclohexane ring and a heterocyclic ring, wherein any optional hydrogen atom on the cyclic group may be substituted by a $C_{1-3}$ alkyl, alkoxy, fluorinated alkyl or fluorinated alkoxy group, and $W^4$ is at least one structure selected from the group consisting of the following formula [3-a] to formula [3-g]:

[3-a]
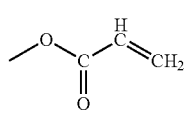

[3-b]
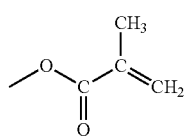

[3-c]
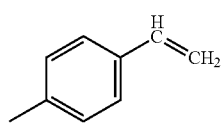

[3-d]
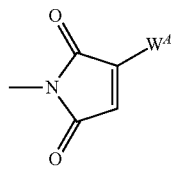

[3-e]
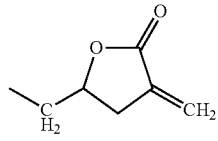

[3-f]
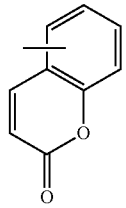

[3-g]
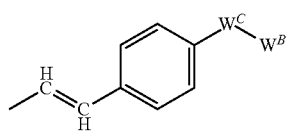

wherein $W^A$ is a hydrogen atom or a benzene ring, $W^B$ is at least one cyclic group selected from the group consisting of a benzene ring, a cyclohexane ring and a heterocyclic group, and $W^C$ is a $C_{1-18}$ alkyl, fluorinated alkyl, alkoxy or fluorinated alkoxy group; and wherein the liquid crystal display device is in a transparent state when no voltage is applied and in a scattering state when a voltage is applied.

2. The liquid crystal display device according to claim 1, wherein the compound represented by the formula [1] is at least one selected from the group consisting of compounds represented by the following formula [1a-1] to formula [1a-6]:

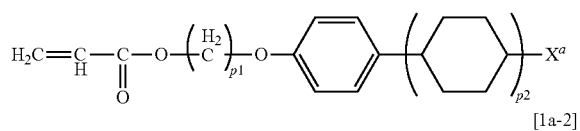
[1a-1]

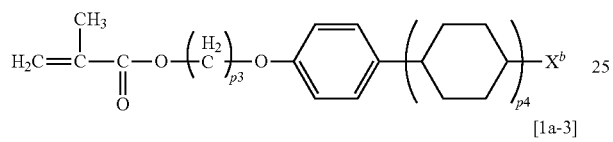
[1a-2]

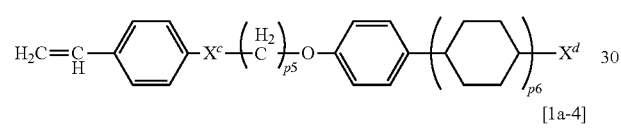
[1a-3]

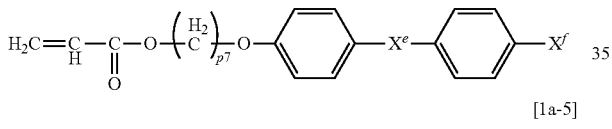
[1a-4]

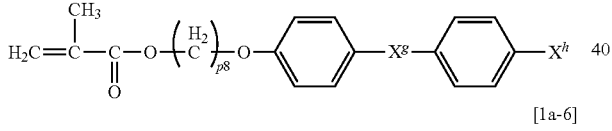
[1a-5]

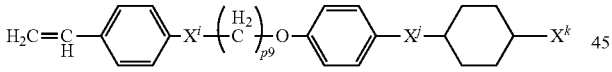
[1a-6]

wherein $X^a$, $X^b$, $X^d$, $X^f$, $X^h$ and $X^k$ are each independently a $C_{1-18}$ alkyl group or a $C_{1-18}$ alkoxy group, $X^c$ and $X^i$ are each independently —O—, —COO— or —OCO—, $X^e$, $X^g$ and $X^j$ are each independently —CH$_2$—, —O—, —COO— or —OCO—, p1, p3, p5, p7, p8 and p9 are each independently an integer of from 1 to 12, and p2, p4 and p6 are each independently an integer of 1 or 2.

3. The liquid crystal display device according to claim 1, wherein the liquid crystal alignment treating agent is a liquid crystal alignment treating agent comprising a polyimide precursor obtained by a reaction of a tetracarboxylic acid component and a diamine component comprising a diamine having a side chain structure of the above formula [2-1] or formula [2-2] and a diamine having a side chain structure represented by the above formula [3], or a polyimide obtained by imidizing the polyimide precursor.

4. The liquid crystal display device according to claim 3, wherein the diamine having a side chain structure represented by the above formula [2-1] or formula [2-2] is a diamine represented by the following formula [2a]:

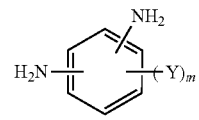
[2a]

wherein Y is a structure represented by the above formula [2-1] or formula [2-2], and m is an integer of from 1 to 4.

5. The liquid crystal display device according to claim 3, wherein the diamine having a side chain structure represented by the above formula [3] is a diamine represented by the following formula [3a]:

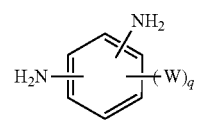
[3a]

wherein W is a structure represented by the above formula [3], and q is an integer of from 1 to 4.

6. The liquid crystal display device according to claim 3, wherein the tetracarboxylic acid component is a tetracarboxylic acid component comprising a tetracarboxylic dianhydride represented by the following formula [5]:

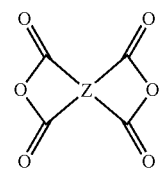
[5]

wherein Z is at least one structure selected from the group consisting of structures represented by the following formula [5a] to formula [5k]:

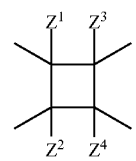
[5a]

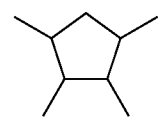
[5b]

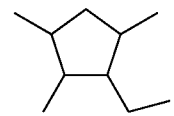
[5c]

-continued

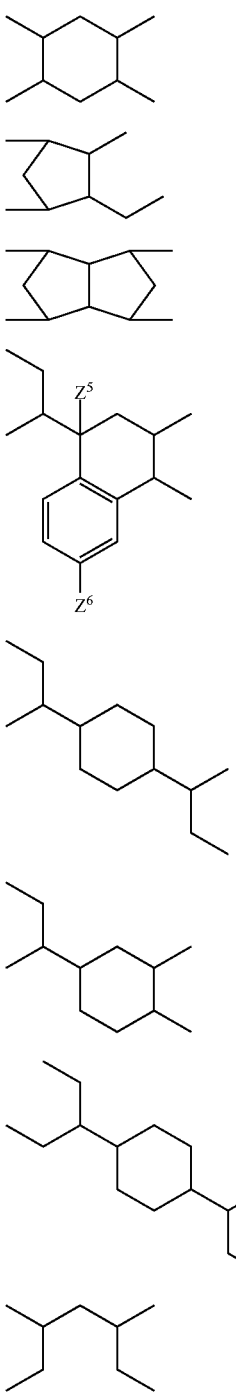

wherein $Z^1$ to $Z^4$ are each independently at least one selected from the group consisting of a hydrogen atom, a methyl group, a chlorine atom and a benzene ring, and $Z^5$ and $Z^6$ are each independently a hydrogen atom or a methyl group.

7. The liquid crystal display device according to claim 1, wherein the liquid crystal alignment treating agent comprises at least one generating agent selected from the group consisting of a photo-radical generating agent, a photo-acid generating agent and a photo-base generating agent.

8. The liquid crystal display device according to claim 1, wherein the liquid crystal alignment treating agent comprises a compound having at least one structure selected from the group consisting of structures represented by the following formula [b-1] to formula [b-8]:

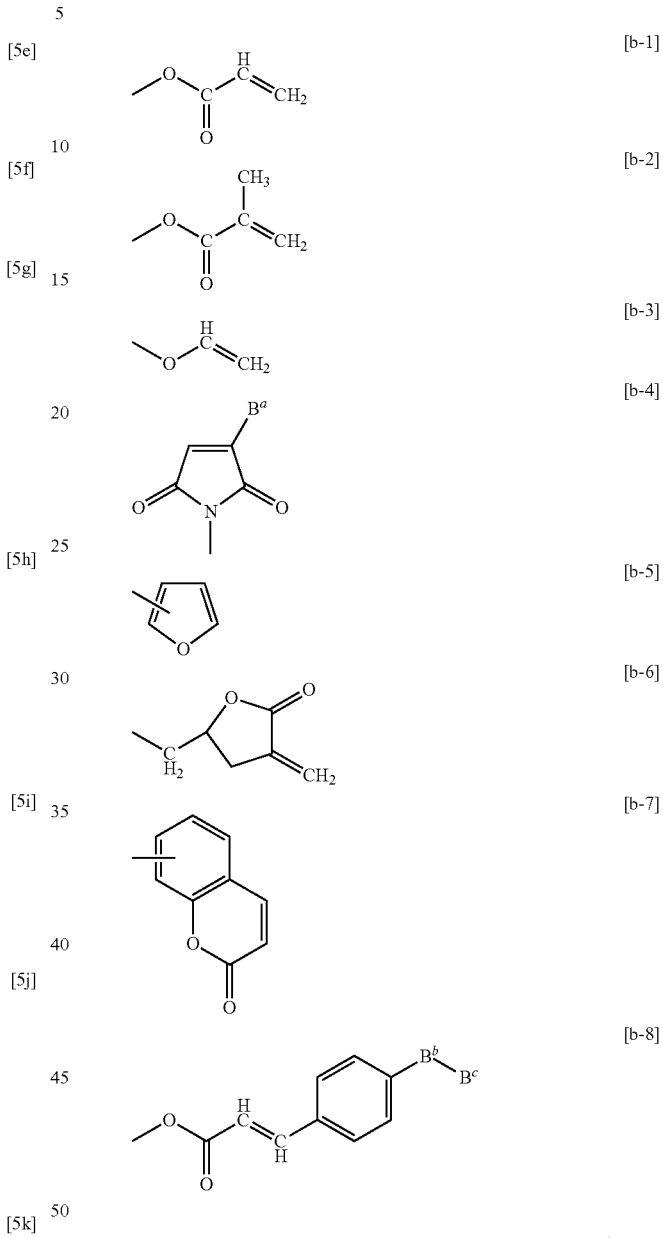

wherein $B^a$ is a hydrogen atom or a benzene ring, $B^b$ is at least one cyclic group selected from the group consisting of a benzene ring, a cyclohexane ring and a heterocyclic ring, and $B^c$ is at least one selected from the group consisting of a $C_{1-18}$ alkyl group, a $C_{1-18}$ fluorinated alkyl group, a $C_{1-18}$ alkoxy group and a $C_{1-18}$ fluorinated alkoxy group.

9. The liquid crystal display device according to claim 1, wherein the liquid crystal alignment treating agent comprises a compound having at least one substituent selected from the group consisting of an epoxy group, an isocyanate group, an oxetane group, a cyclocarbonate group, a hydroxy group, a hydroxyalkyl group and a lower alkoxyalkyl group.

10. The liquid crystal display device according to claim 1, wherein the liquid crystal alignment treating agent comprises at least one solvent selected from the group consisting of 1-hexanol, cyclohexanol, 1,2-ethanediol, 1,2-propanediol, propylene glycol monobutyl ether, ethylene glycol monobutyl ether, dipropylene glycol dimethyl ether, cyclohexanone, cyclopentanone and solvents represented by the following formula [D1] to formula [D3]:

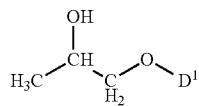

[D1]

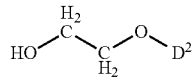

[D2]

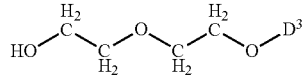

[D3]

wherein $D^1$ is a $C_{1-3}$ alkyl group, $D^2$ is a $C_{1-3}$ alkyl group, and $D^3$ is a $C_{1-4}$ alkyl group having 1 to 3 carbon atoms.

11. The liquid crystal display device according to claim 1, wherein the liquid crystal alignment treating agent comprises at least one solvent selected from the group consisting of N-methyl-2-pyrrolidone, N-ethyl-2-pyrrolidone and γ-butyrolactone.

12. The liquid crystal display device according to claim 1, wherein the substrates of the liquid crystal display device are glass substrates or plastic substrates.

* * * * *